United States Patent
Anton

(10) Patent No.: US 9,290,132 B2
(45) Date of Patent: Mar. 22, 2016

(54) MOTOR VEHICLE INTEGRATED CARRIER RACK AND STORAGE SYSTEM

(71) Applicant: Mark A. Anton, Newport Beach, CA (US)

(72) Inventor: Mark A. Anton, Newport Beach, CA (US)

( * ) Notice: Subject to any disclaimer, the term of this patent is extended or adjusted under 35 U.S.C. 154(b) by 34 days.

(21) Appl. No.: 14/214,407

(22) Filed: Mar. 14, 2014

(65) Prior Publication Data

US 2014/0263513 A1    Sep. 18, 2014

Related U.S. Application Data

(60) Provisional application No. 61/803,101, filed on Mar. 18, 2013, provisional application No. 61/801,951, filed on Mar. 15, 2013.

(51) Int. Cl.
| *B60R 9/10* | (2006.01) |
| *B60R 9/06* | (2006.01) |
| *B60R 9/08* | (2006.01) |

(52) U.S. Cl.
CPC ... *B60R 9/06* (2013.01); *B60R 9/08* (2013.01); *B60R 9/10* (2013.01); *Y10S 224/924* (2013.01)

(58) Field of Classification Search
CPC .......... B60R 9/06; B60R 9/10; Y10S 224/924
USPC ................................................. 224/497, 924
See application file for complete search history.

(56) References Cited

U.S. PATENT DOCUMENTS

| 4,369,902 | A | * | 1/1983 | Lampeas .................. B60R 9/06 224/311 |
| 4,676,414 | A |   | 6/1987 | Deguevara |
| 4,746,263 | A | * | 5/1988 | Cook ....................... B60P 1/549 212/303 |
| 5,190,195 | A |   | 3/1993 | Fullhart et al. |
| 5,460,304 | A |   | 10/1995 | Porter et al. |
| 5,695,103 | A |   | 12/1997 | Duvernay et al. |
| 5,820,004 | A |   | 10/1998 | Lane |
| 6,752,302 | B2 | * | 6/2004 | Anton ....................... B60R 9/06 224/517 |
| 7,121,597 | B2 | * | 10/2006 | Chuang .................... B60R 9/06 224/489 |
| 7,213,731 | B1 |   | 5/2007 | Kolda |
| 8,302,829 | B2 | * | 11/2012 | Lee ......................... B60R 9/06 224/488 |
| 8,418,902 | B2 | * | 4/2013 | Cha ......................... B60R 9/10 224/488 |
| 9,120,429 | B2 | * | 9/2015 | Lungershausen ......... B60R 9/06 |
| 9,145,095 | B2 | * | 9/2015 | Hubacher ................ B60R 9/10 |
| 9,174,584 | B1 | * | 11/2015 | Cha ......................... B60R 9/10 |
| 2010/0001029 | A1 | * | 1/2010 | Tai .......................... B60R 9/06 224/499 |

FOREIGN PATENT DOCUMENTS

WOPCT/US2014/0297155    8/2014

* cited by examiner

*Primary Examiner* — Justin Larson
(74) *Attorney, Agent, or Firm* — One LLP

(57) ABSTRACT

An integrated carrier rack and storage system for vehicles is provided. Generally, the system includes a receiving unit, installed in a motor vehicle that receives a carrier bar device. The system further includes an immobilizing system attached carrier bar and various attachment units which facilitate in transportation and storage. The integrated carrier rack and storage system is user friendly and may be applied to any motor vehicle to carry an assortment of items and store them using the same system.

20 Claims, 69 Drawing Sheets

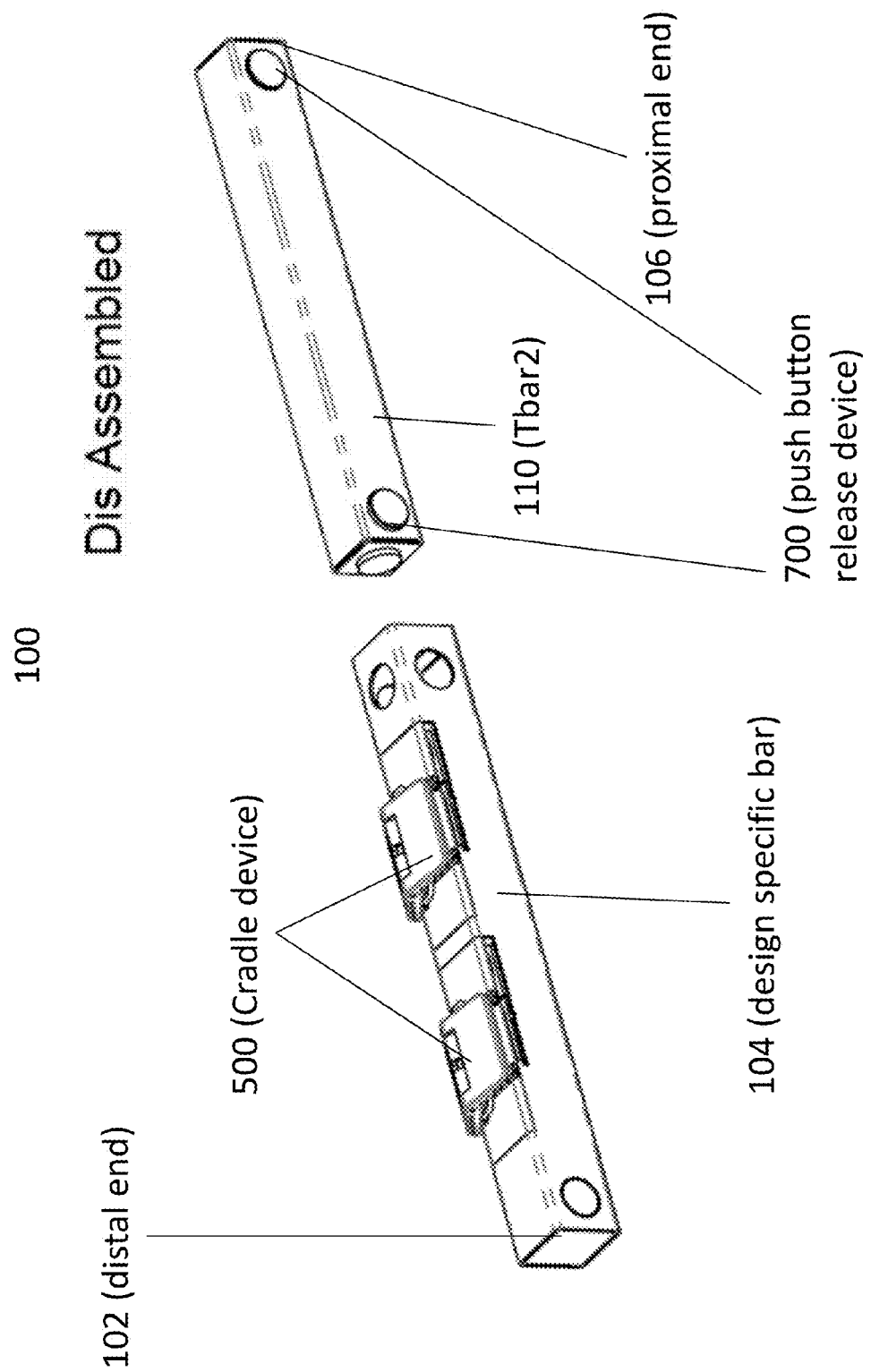

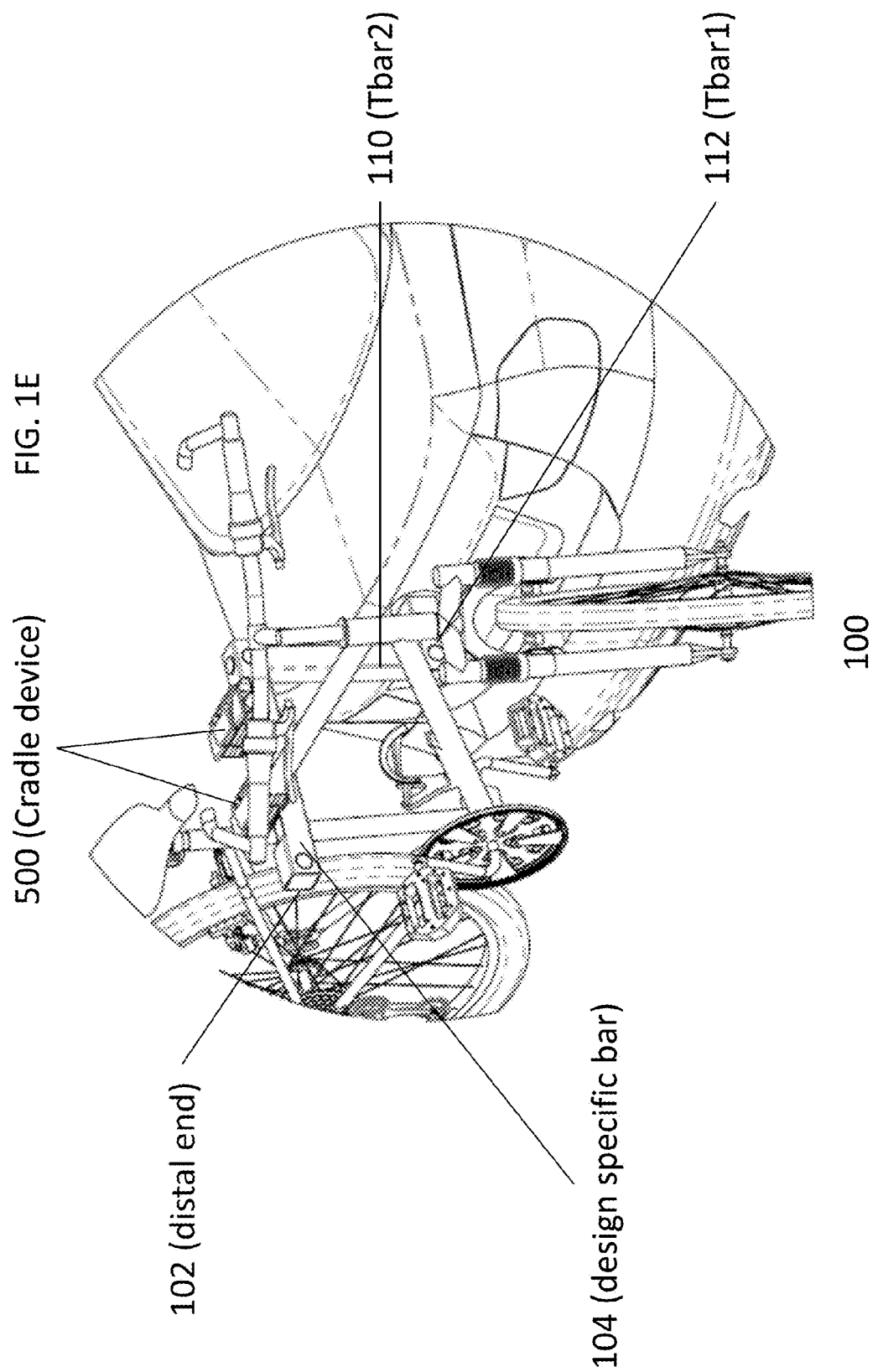

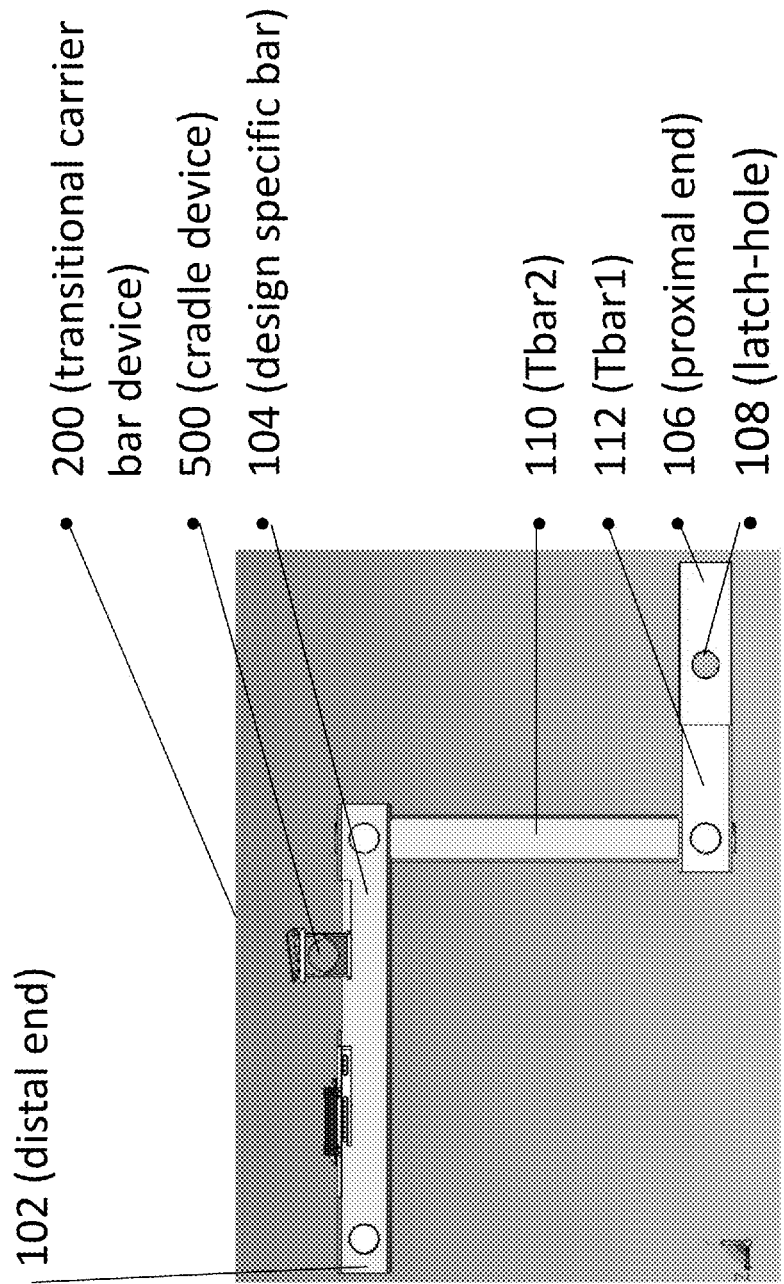

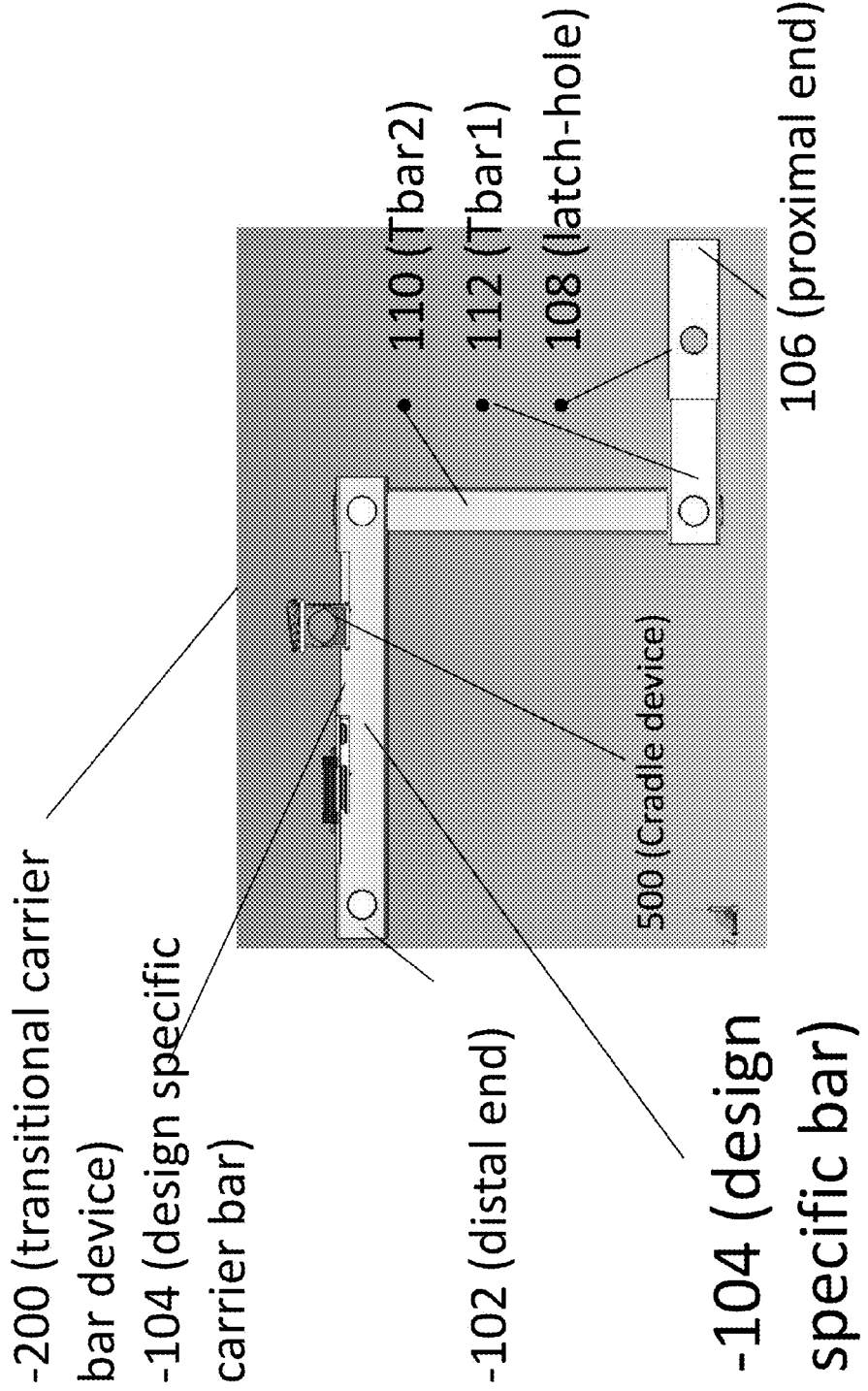

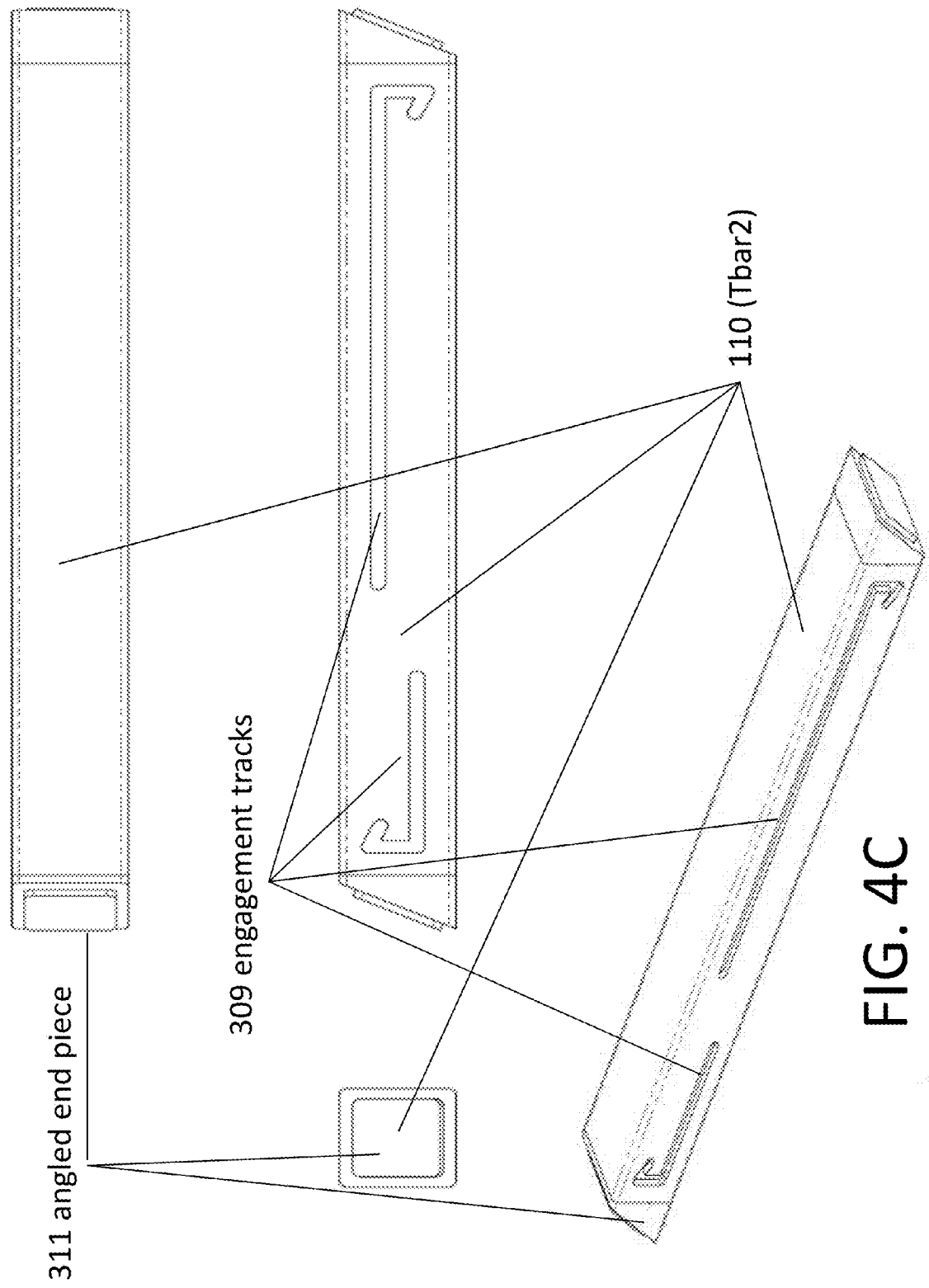

- 1360 (cradle latch)
- 1310 (Upper support part)
- 1320 (upper engaging part)
- 1360 (Horizontal hole)
- 1330 (lower engaging part)
- 1340 (lower support part)
- 1350 (wire)

- 1311 (pin)
- 1360 (cradle latch)
- 1310 (Upper support part)
- 1320 (upper engaging part)
- 1360 (Horizontal hole)
- 1330 (lower engaging part)
- 1340 (lower support part)

- 1311 (pin)
- 1350 (wire)
- 1362 Latch support
- 1360 (cradle latch)
- 1310 (Upper support part)
- 1320 (upper engaging part)
- 1360 (Horizontal hole)
- 1330 (lower engaging part)
- 1340 (lower support part)

- 1360 (cradle latch)
- 1310 (Upper support part)
- 1320 (upper engaging part)
- 1360 (Horizontal hole)
- 1330 (lower engaging part)
- 1340 (lower support part)
- 1350 (wire)

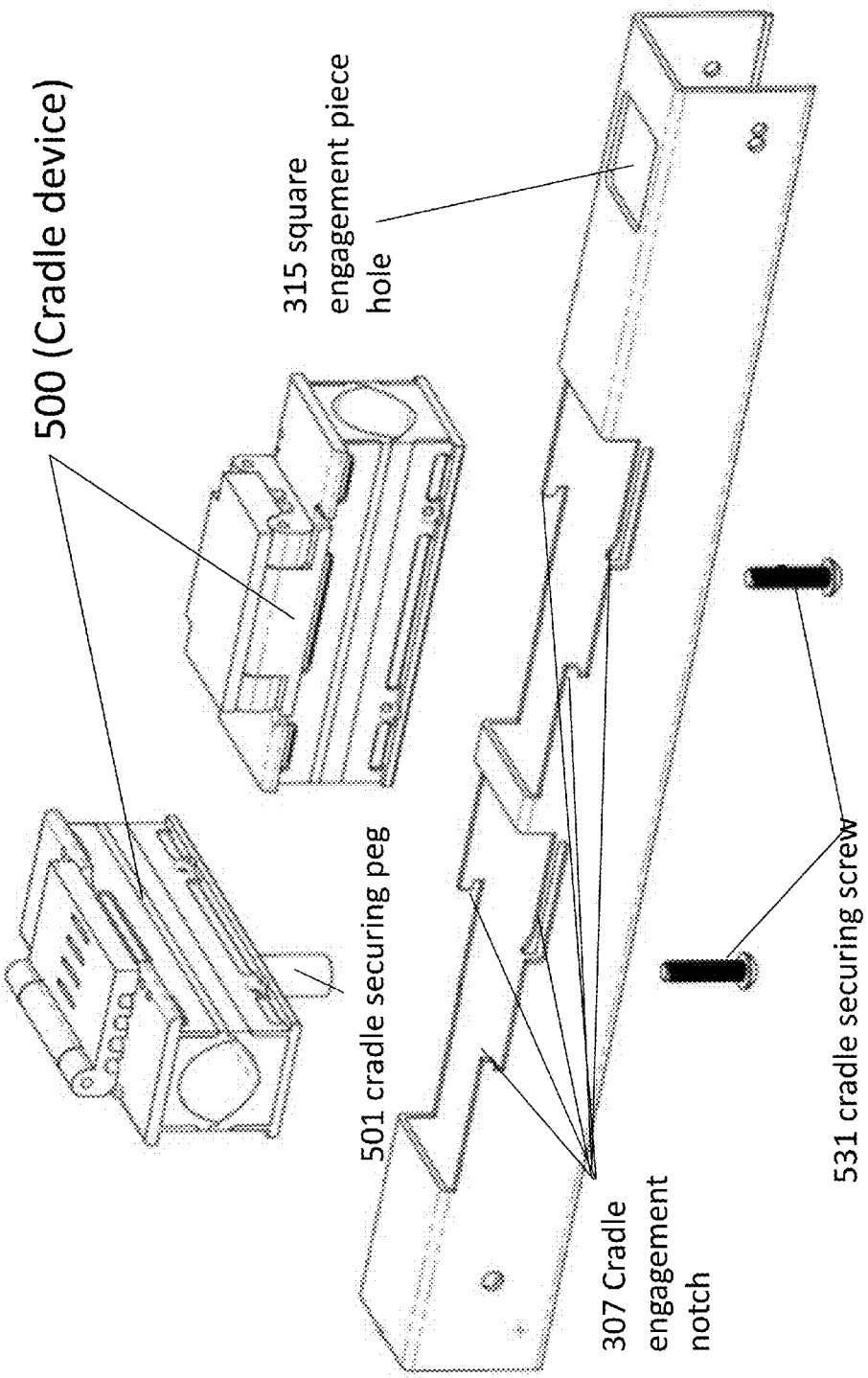

200 (transitional carrier bar device)
108 (latch-hole)
104 (design specific carrier bar)
500 Cradle
102 (distal end)
315 square engagement piece hole

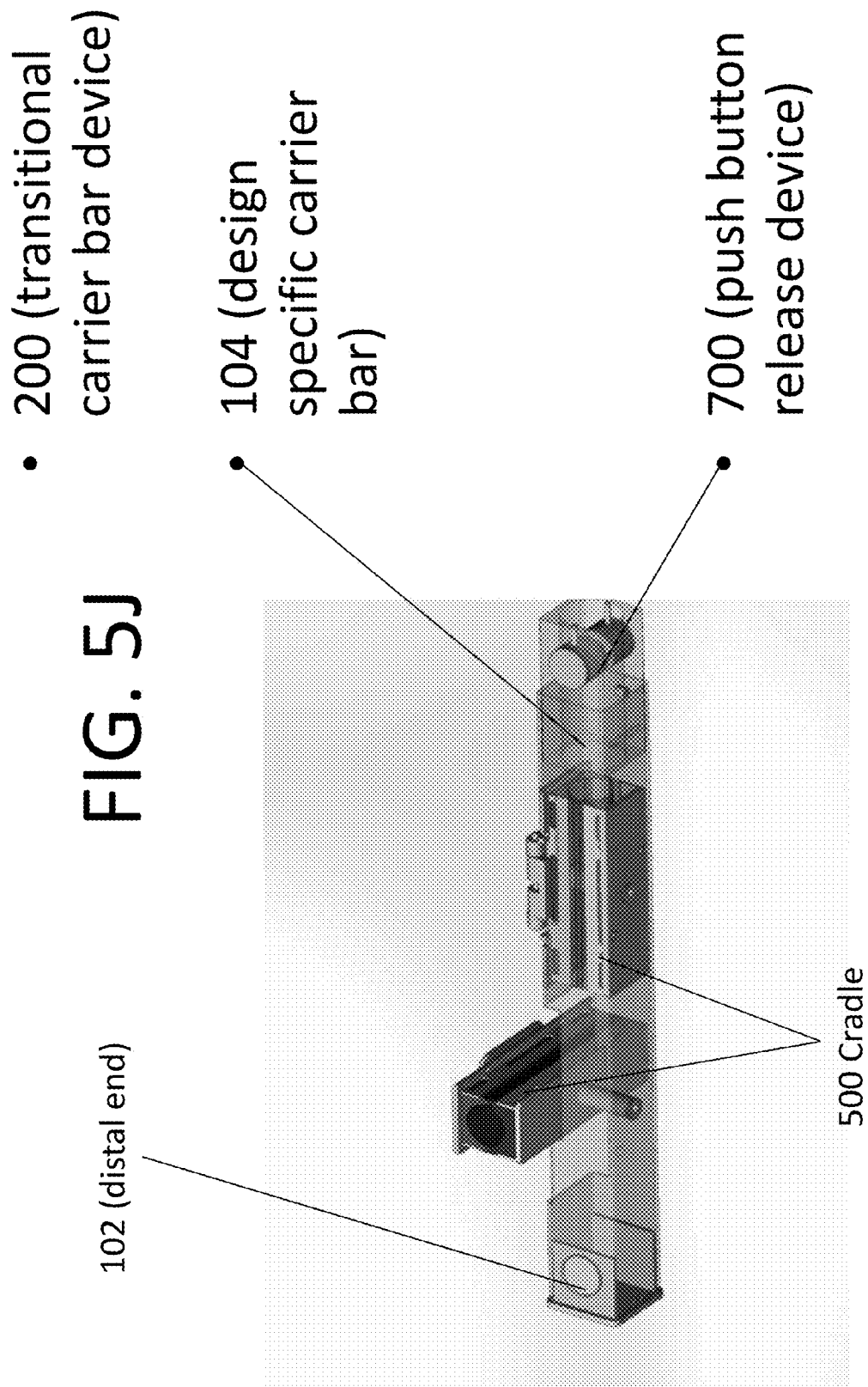

- 200 (transitional carrier bar device)
- 104 (design specific carrier bar)
- 106 (proximal end)
- 108 (latch-hole)
- 112 (Tbar1)
- 700 (push button release device)
- 102 (distal end)
- 500 Cradle

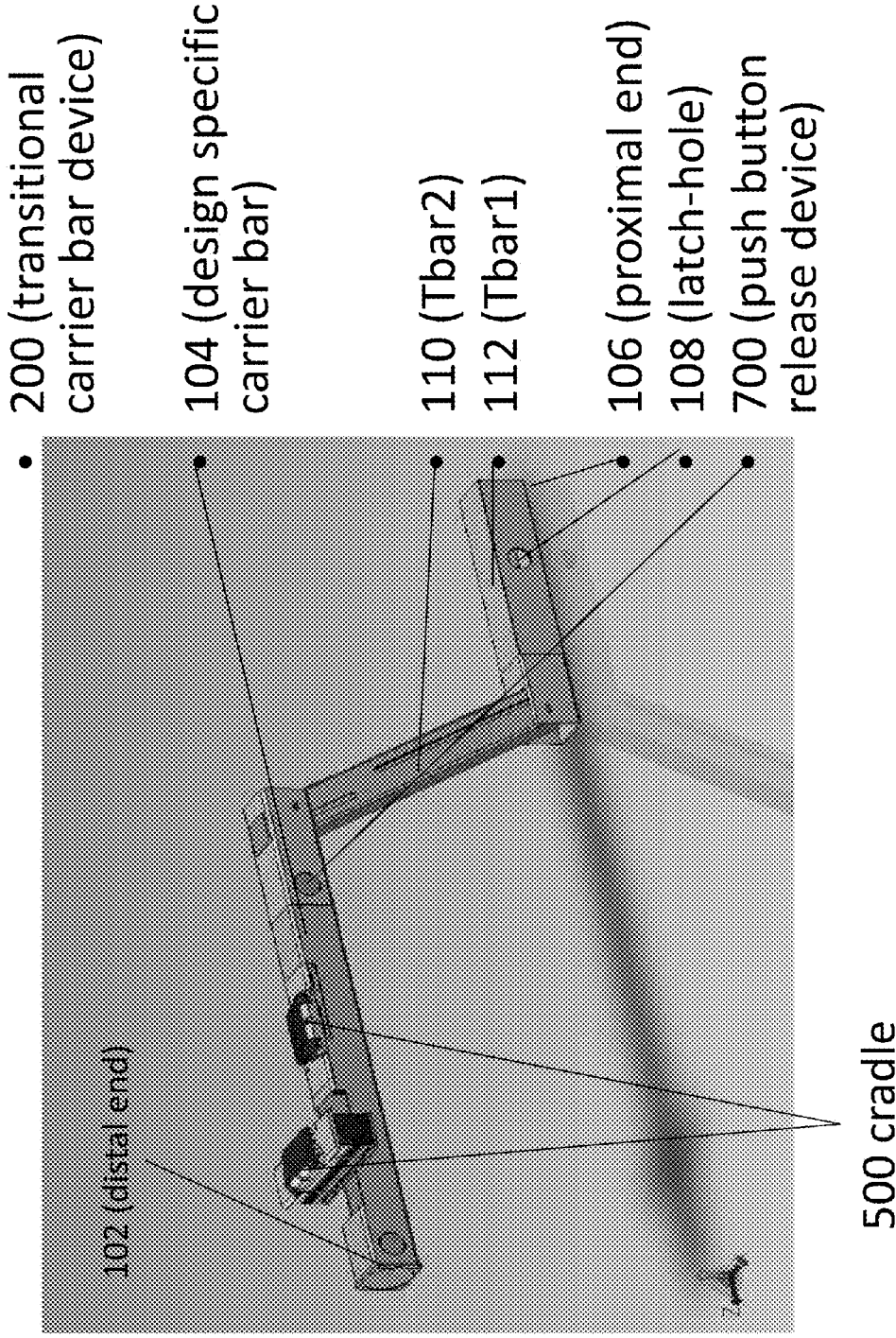

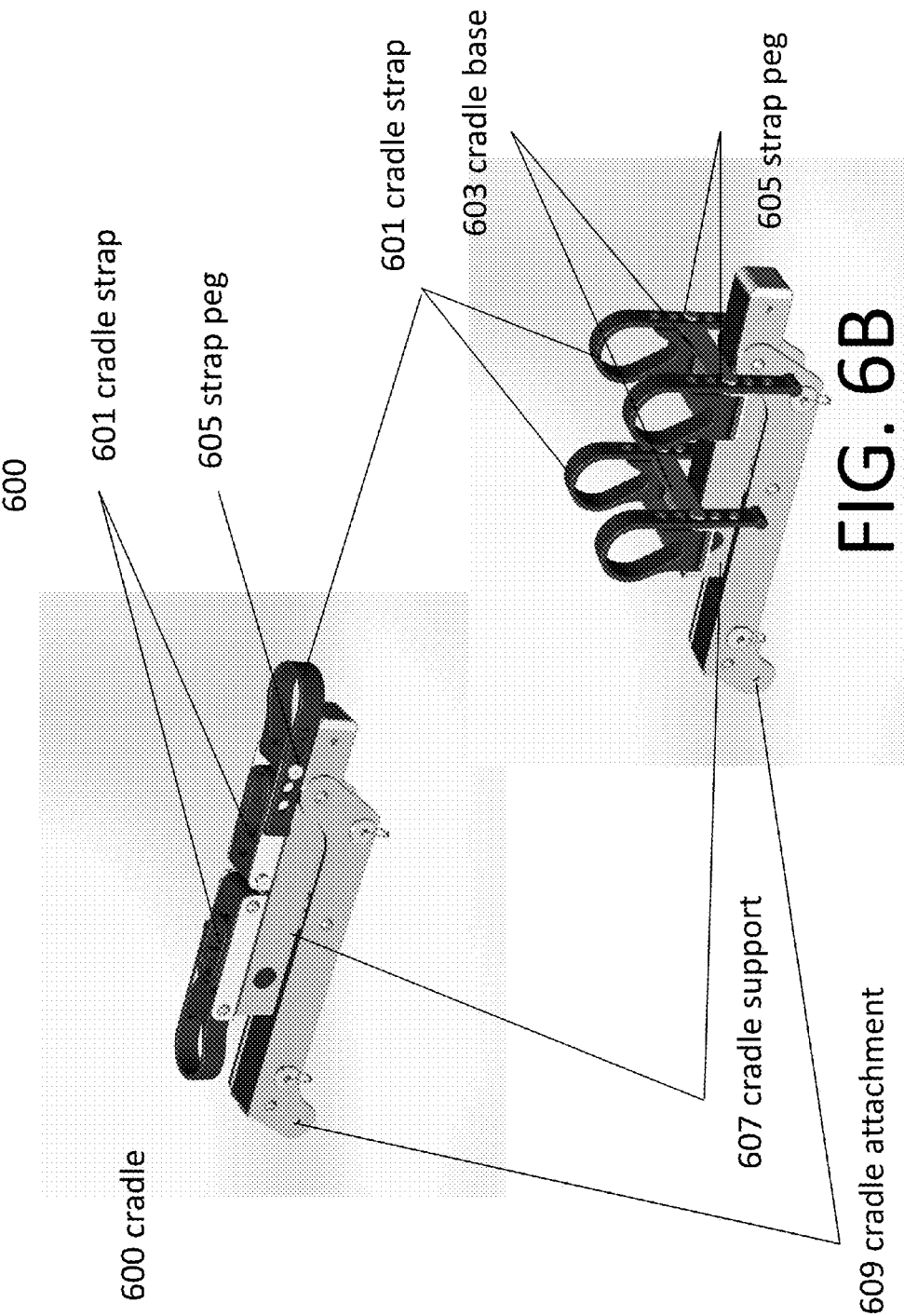

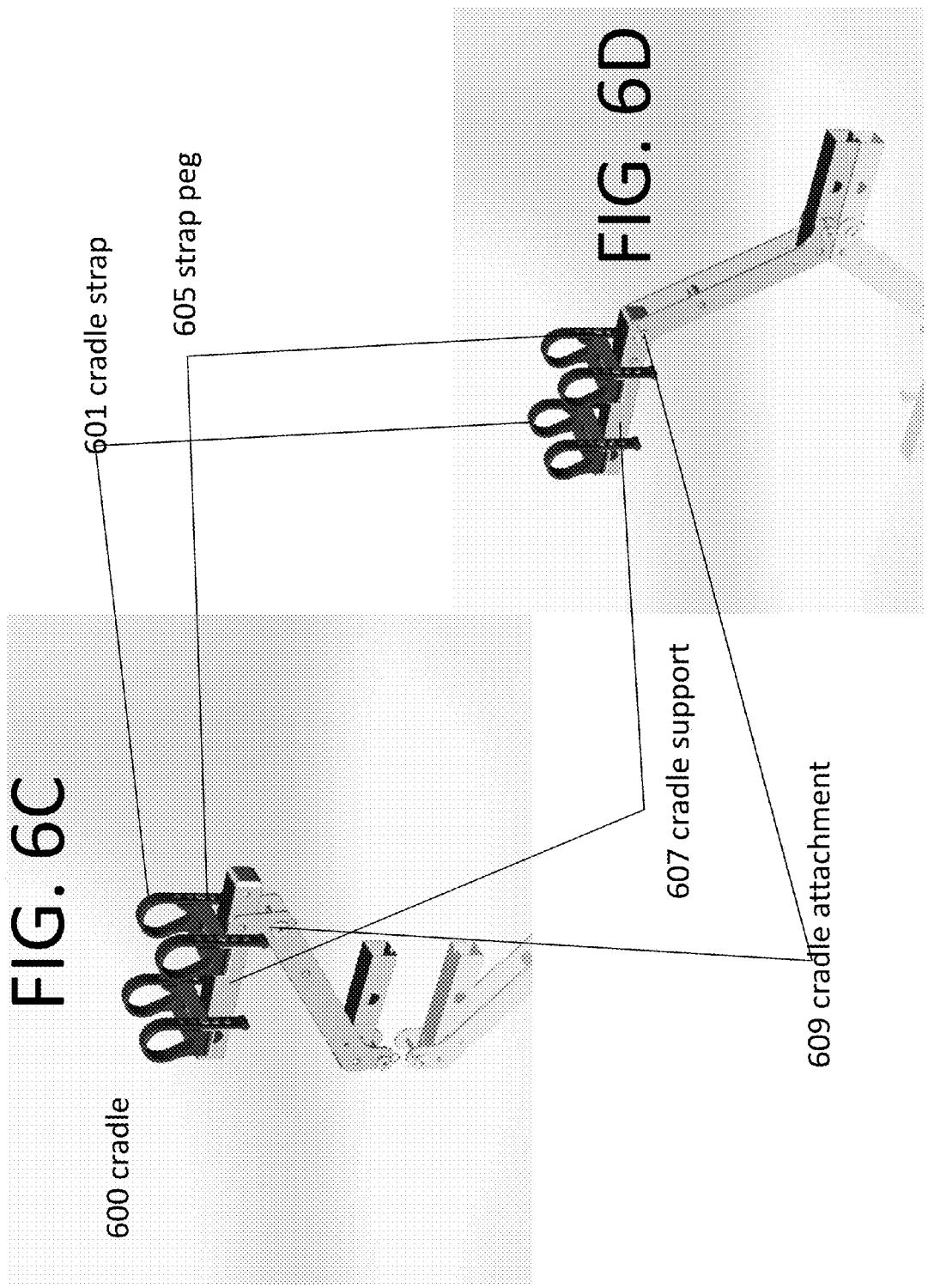

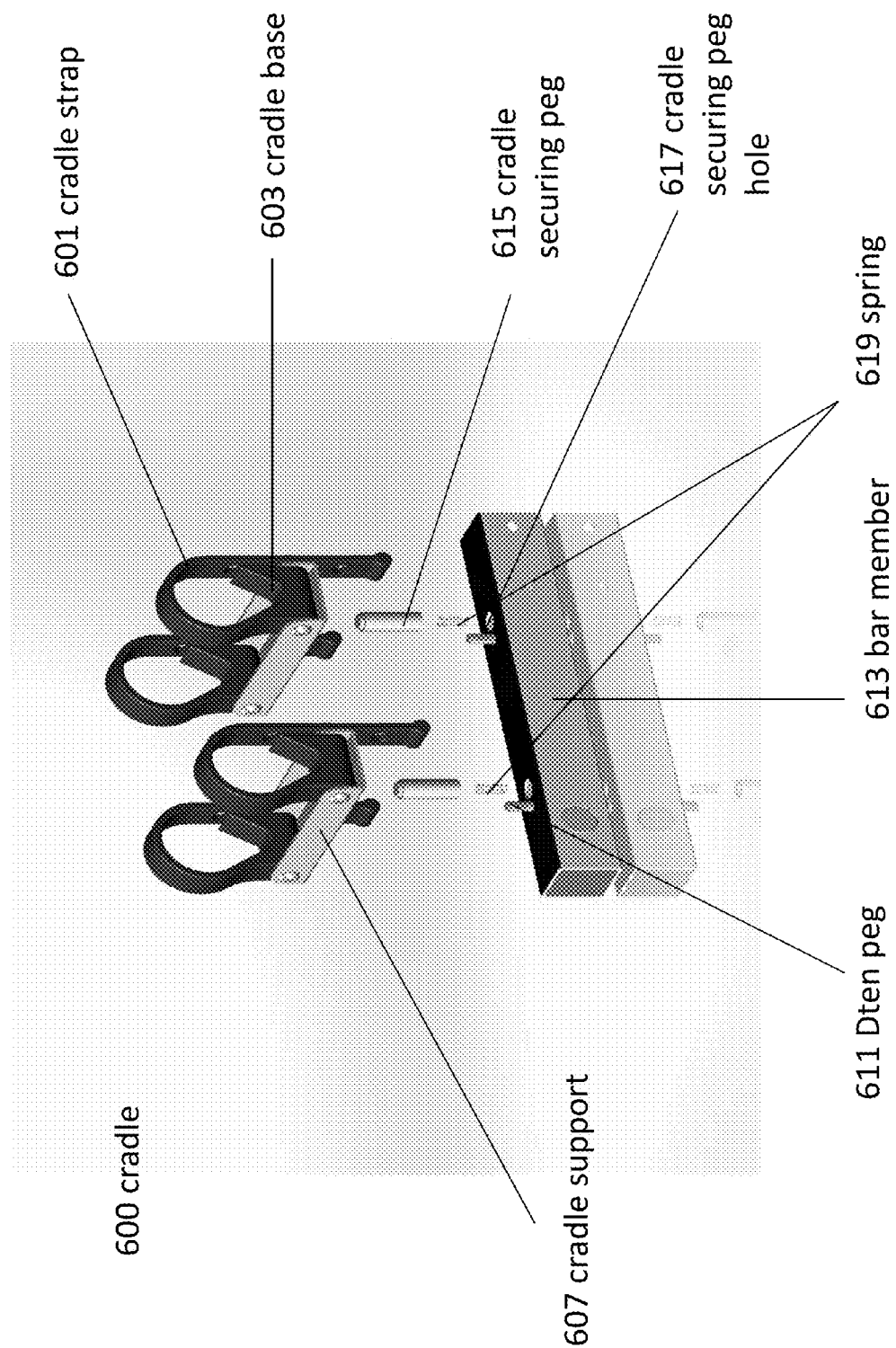

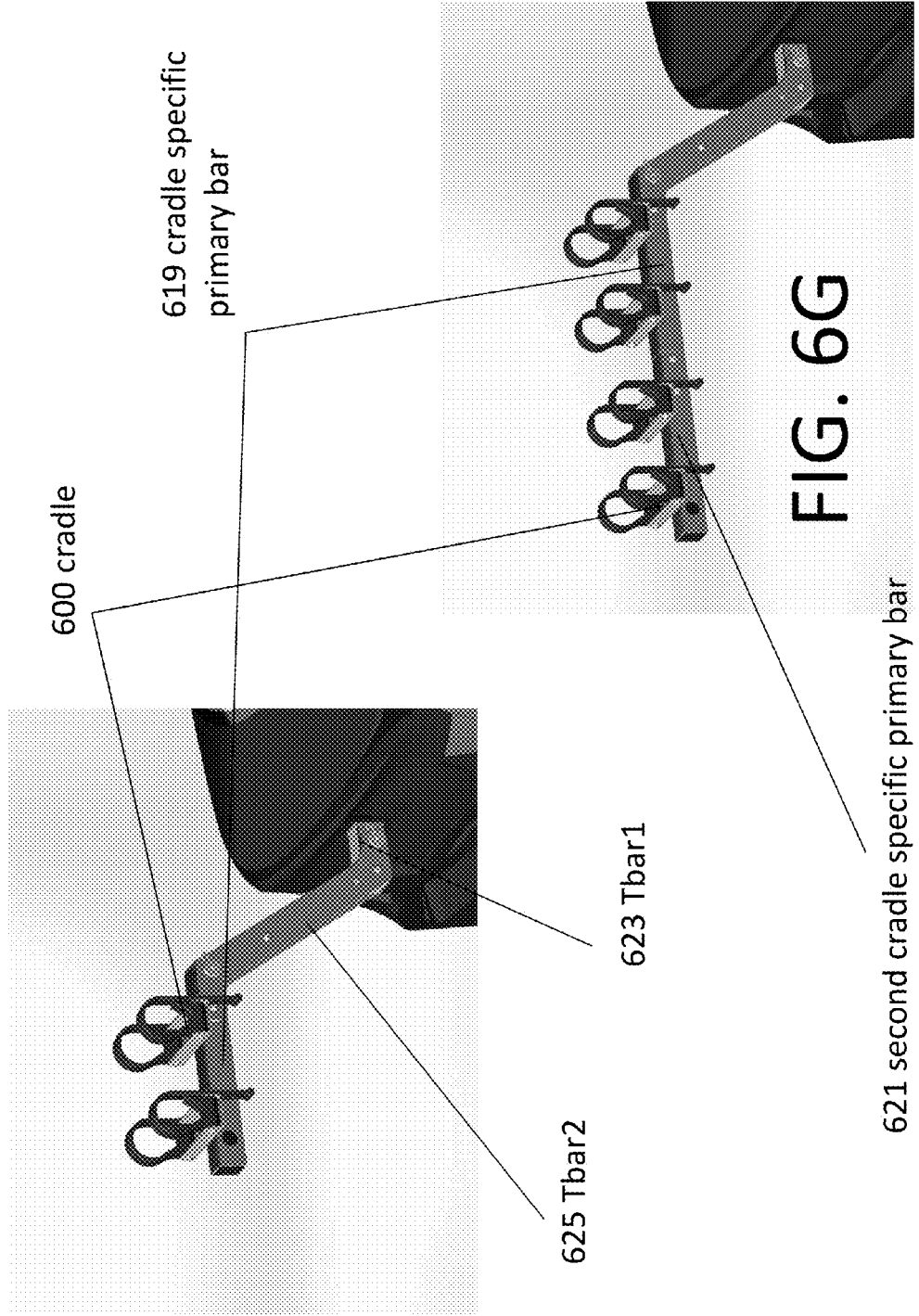

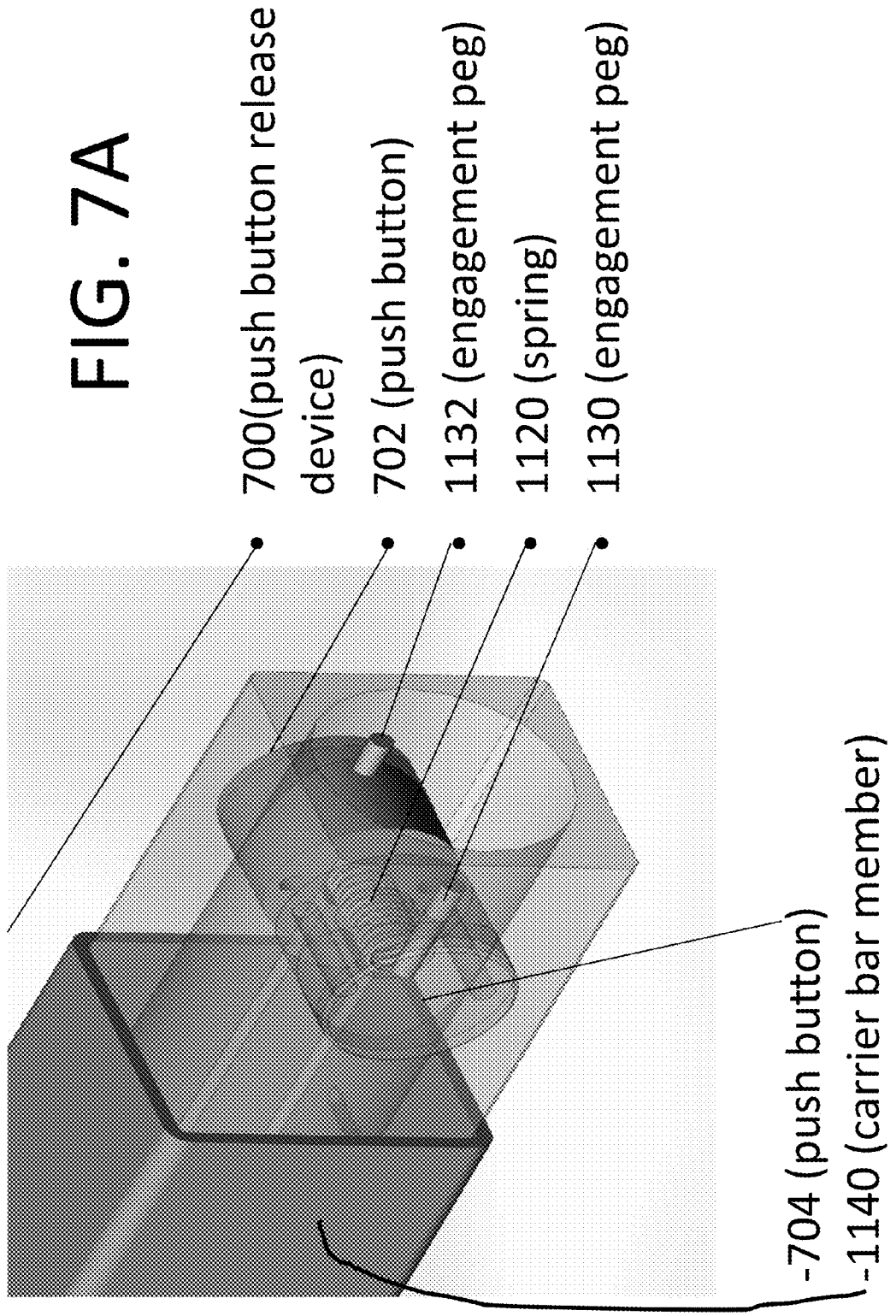

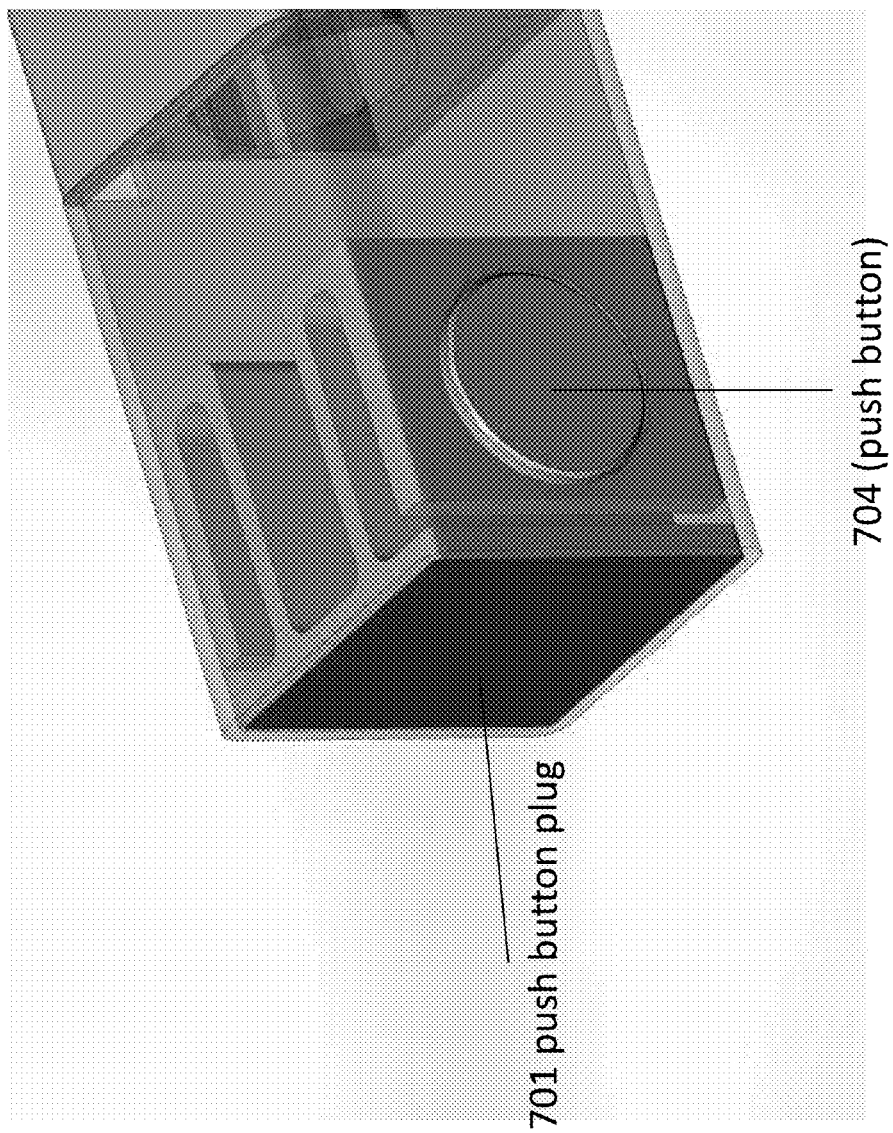

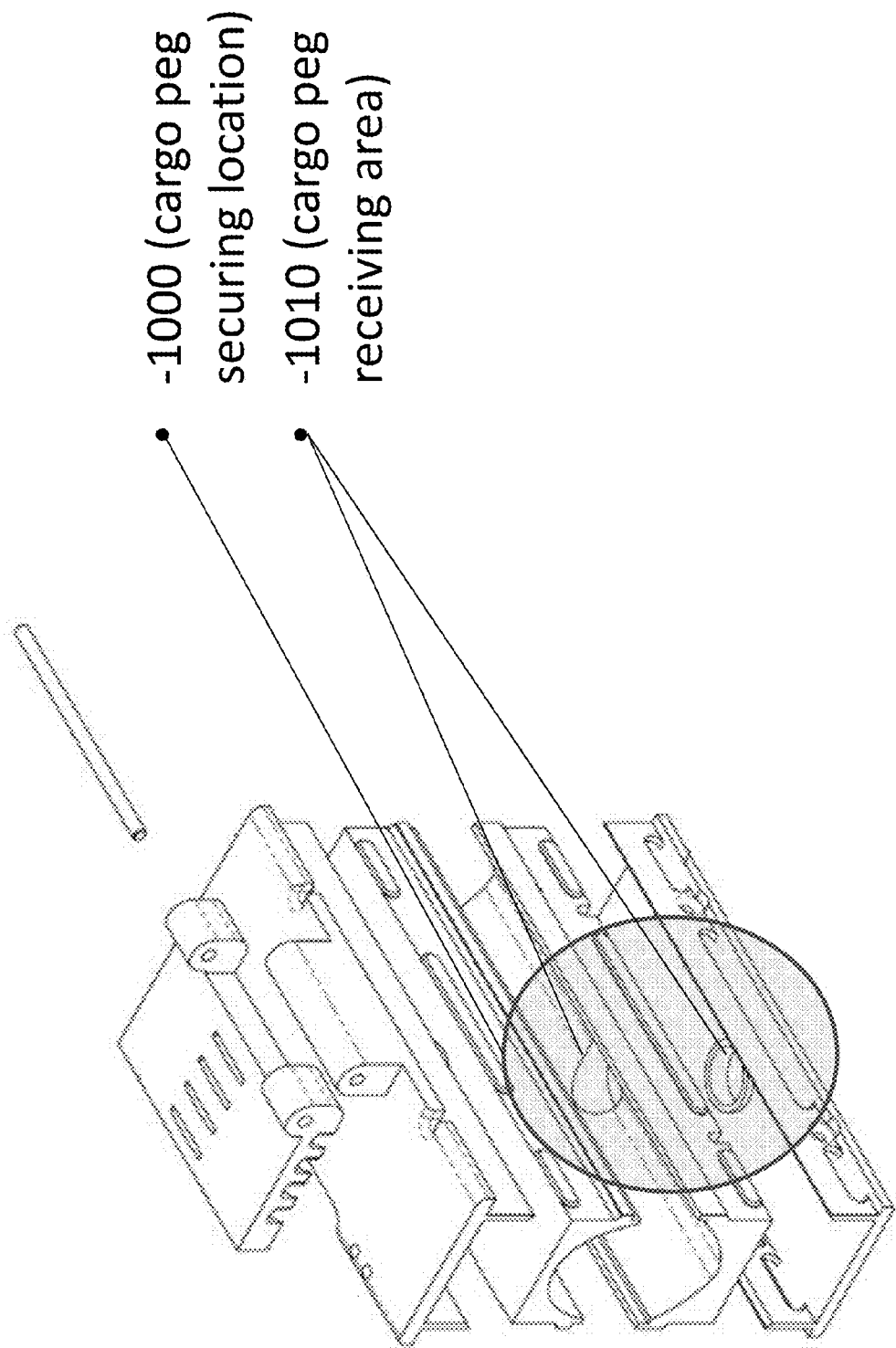

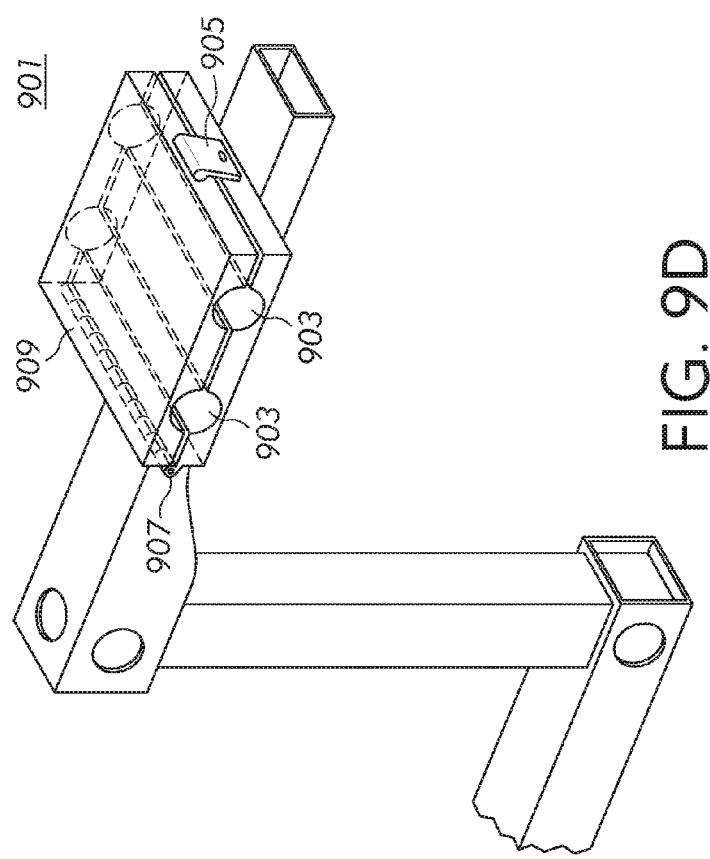
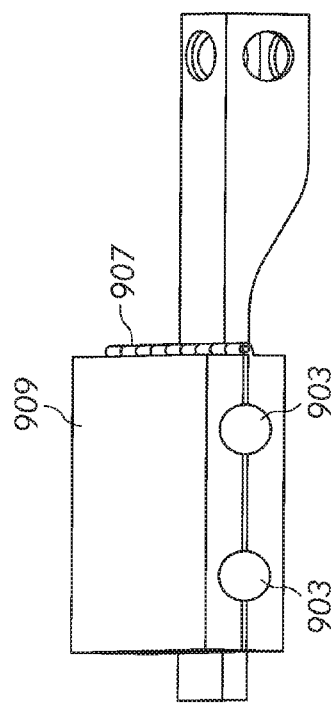
FIG. 9D
FIG. 9E

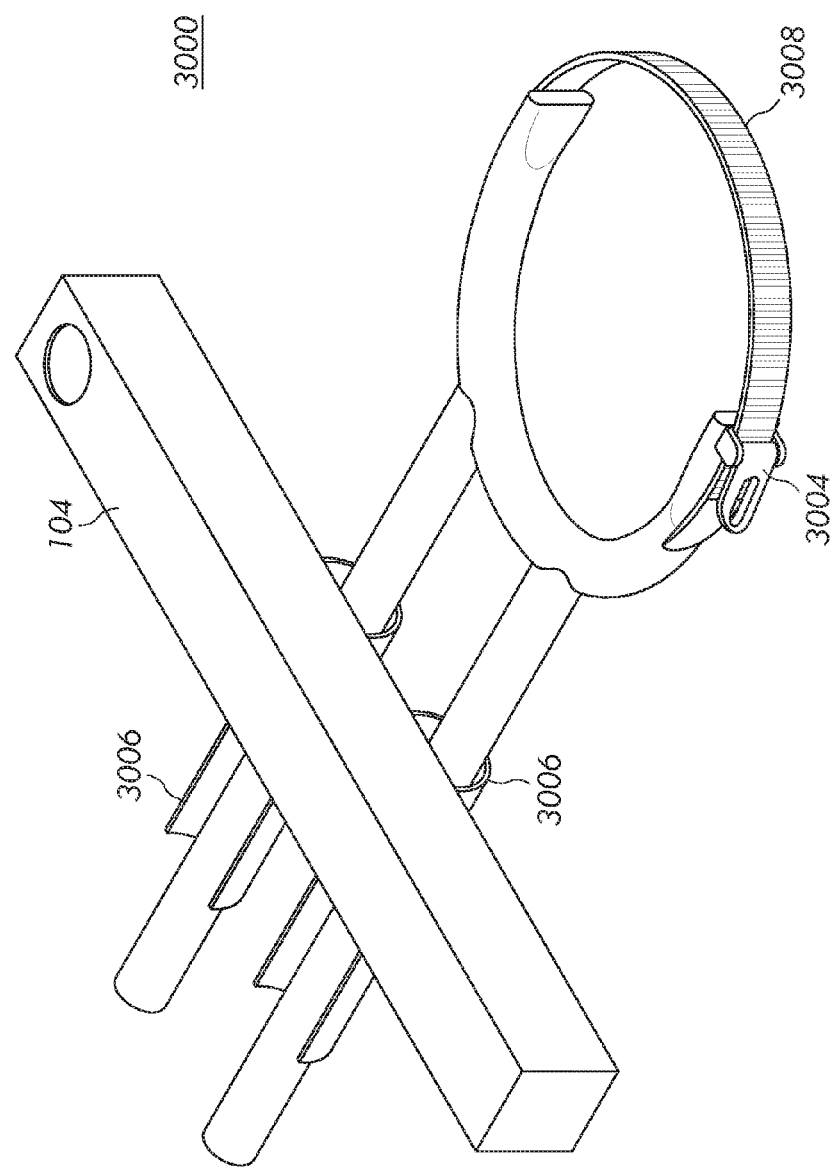

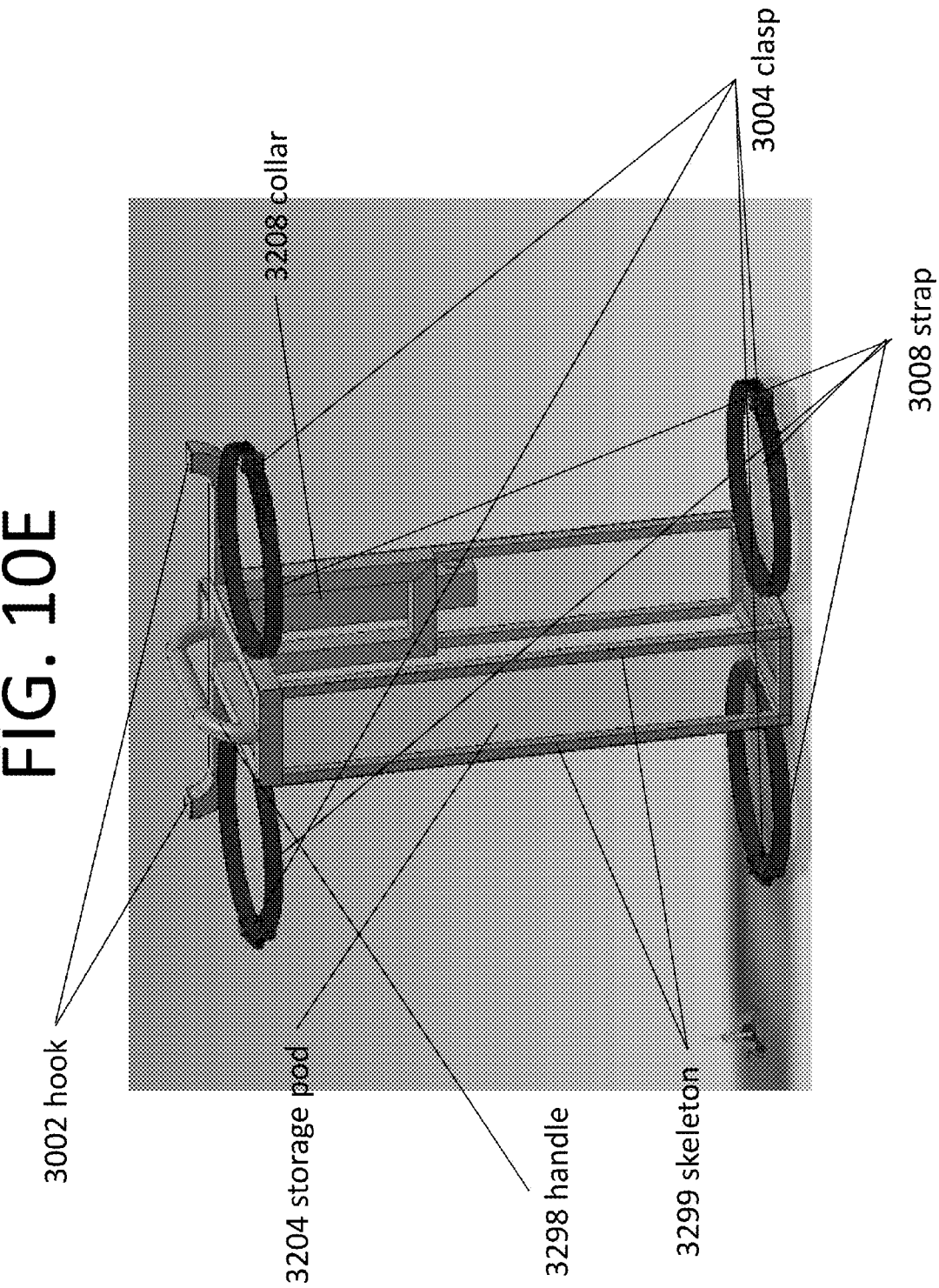

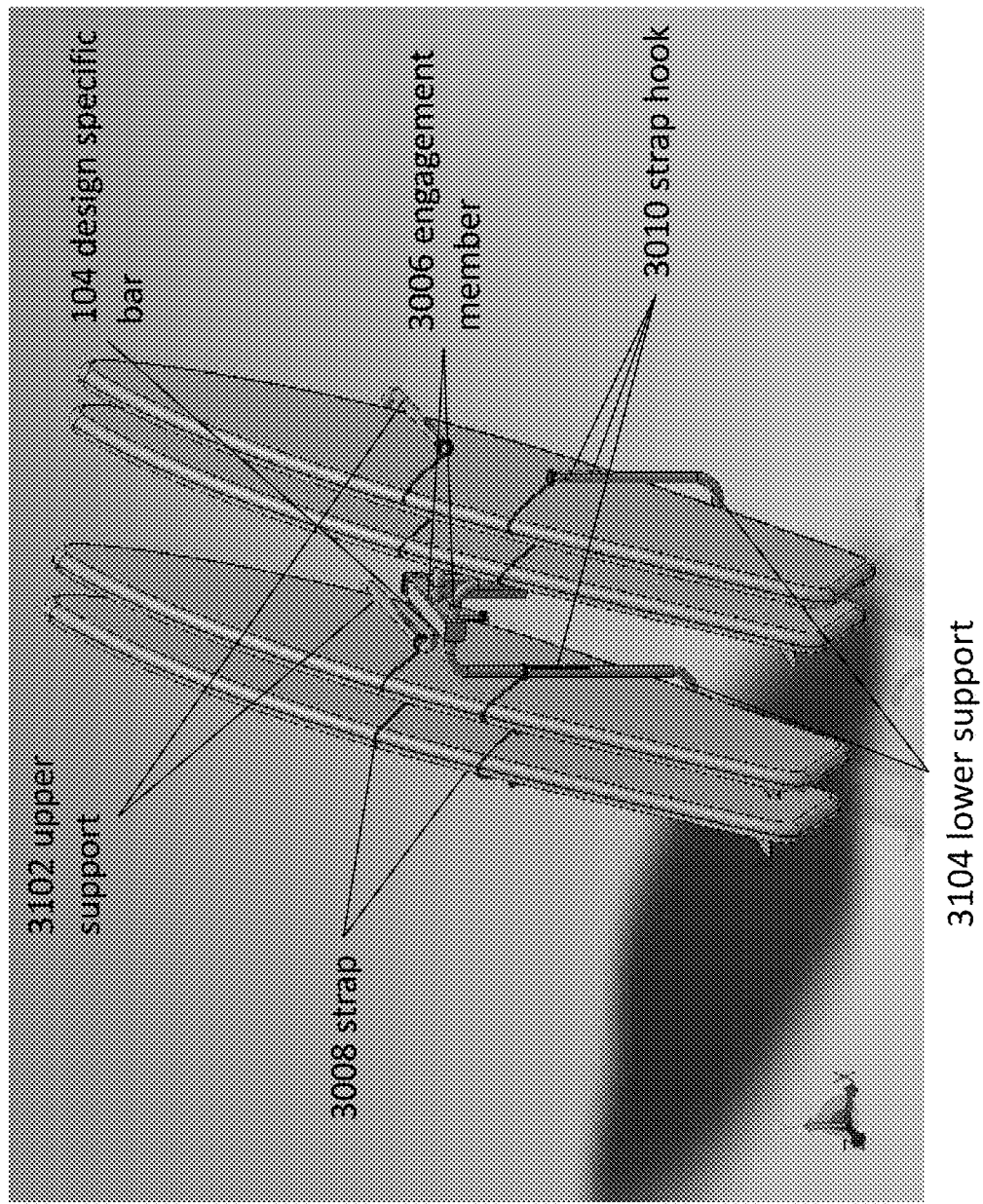

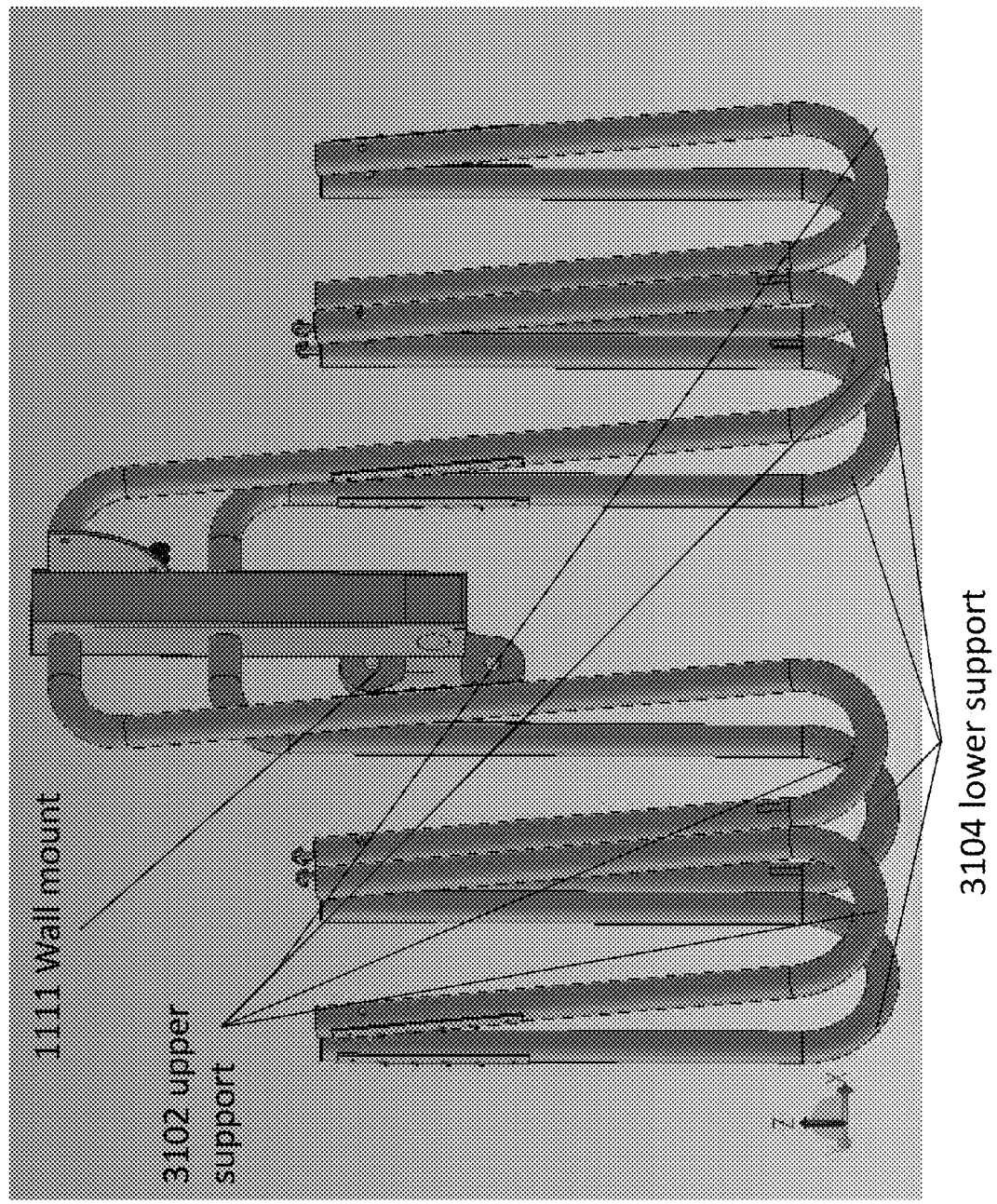

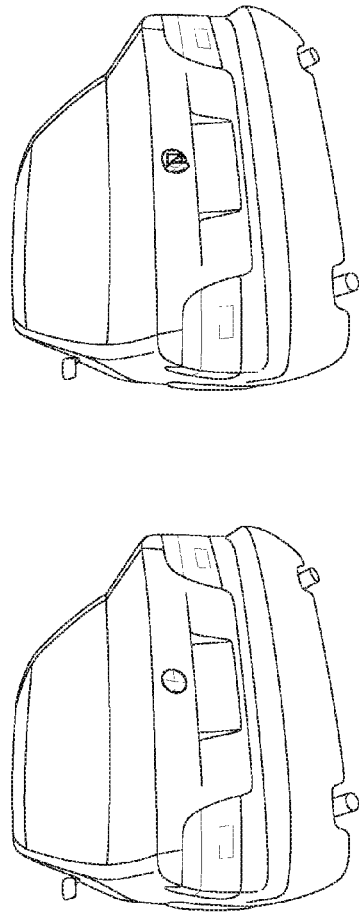
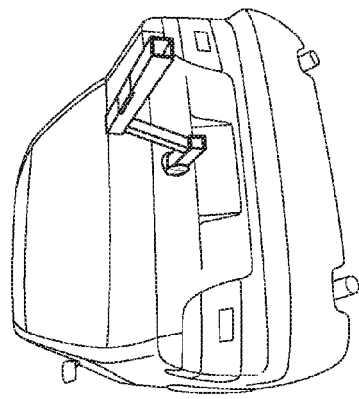
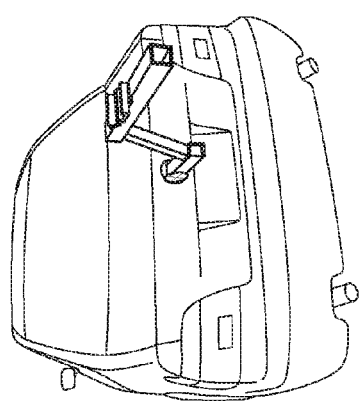
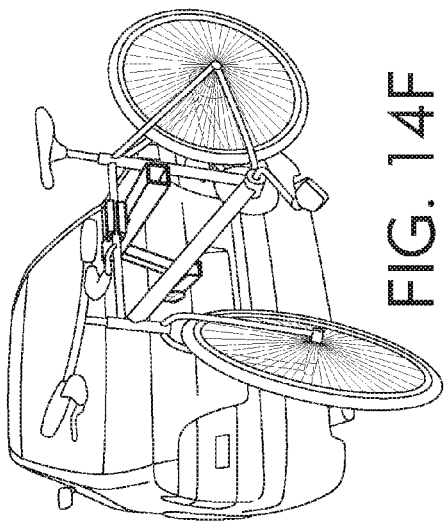
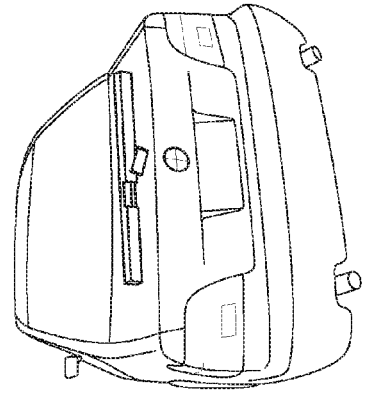
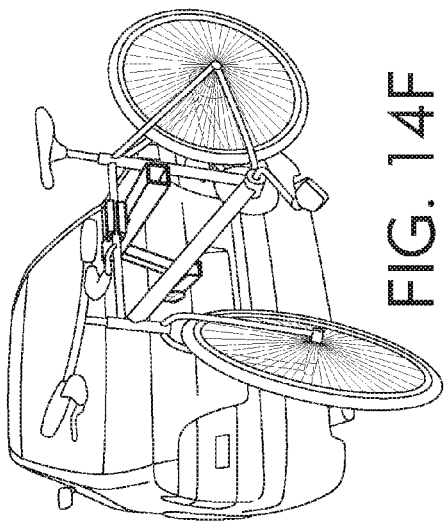

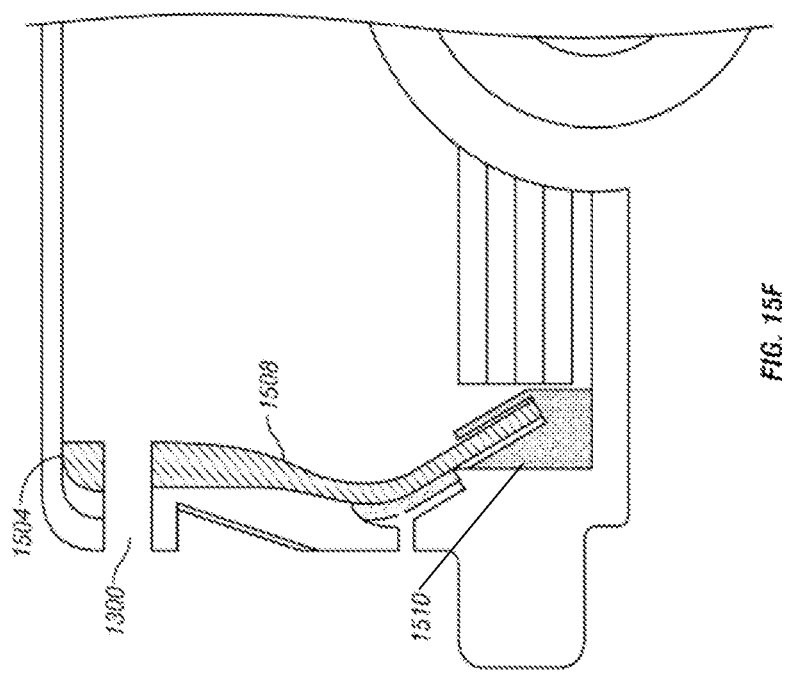

MOTOR VEHICLE INTEGRATED CARRIER RACK AND STORAGE SYSTEM

CROSS-REFERENCE TO RELATED APPLICATIONS

The present application claims priority to U.S. Provisional Application No. 61/801,951 filed Mar. 15, 2013 and U.S. Provisional Application No. 61/803,101 filed Mar. 18, 2013 which are hereby incorporated by reference in their entirety.

FIELD

The subject matter described herein relates generally to carrier rack and storage systems for motor vehicles, and more particularly to carrier rack systems that are integrated into a motor vehicle—carrier rack and storage systems that are designed to carry and store items such as bicycles, skis, snowboards, surfboards, wave boards, wheelchairs, scooters, luggage, fishing gear, accessories, and others.

BACKGROUND

Present carrier rack systems for motor vehicles, such as cars, trucks, vans, minivans, sports utility vehicles (SUV's), and motor homes, generally involve a system of multiple straps attached onto the vehicle, a system attached to a universal hitch, a system attached to a roof, or a system attached to a bumper. These systems are cumbersome, heavy, and difficult to store at home or in the vehicle when the systems are not in use. Additionally, these systems may not be adaptable to all types of vehicles, and when some of these systems are attached, they often make it difficult to access the trunk or doors. These systems are susceptible to theft and may scratch and damage the vehicle when attached and used.

In the case of systems involving multiple straps, these systems are complicated to attach onto the vehicle and may loosen with use over time. In the case of systems attached to the roof, these systems create wind resistance when the car is moving and are difficult to access. For carrier systems that are attached to bumpers, these systems damage the sensitive bumper mechanism and have limited supportability. For trailer hitch systems, the systems are heavy and difficult to attach, detach, and store.

Additionally, organization and storage space is important for people from all walks of life. Improved organization and storage saves time when preparing for activities. It saves space in a home garage, basement, storage garage or shed, closet, office, home, room or any other place things are stored. It may also help prevent injuries which can occur from tripping, falling, dropping, knocking over unstable items, or other accidental or unintentional actions. Likewise it may save money because when items fall they may be individually harmed in the form of dents, breaks, chips or other damage or may dent, break, chip, or damage items which they collide with such as motor vehicles.

Accordingly, an improved carrier rack and storage system for motor vehicles would be desirable.

SUMMARY

The present invention is directed to carrier rack and storage systems for motor vehicles, and more particularly to carrier rack and storage systems that are integrated into motor vehicles at the time of vehicle manufacture or after production (retrofitting).

In accordance with one aspect of the present invention, a carrier rack system is integrated into a portion of a motor vehicle with a rear wall, such as a tailgate of a pickup truck, a trunk lid of a car, a rear license plate wall, or a rear door of a minivan or sports utility vehicle, having an inside and outside. The system generally includes a receiving unit, having rear and forward ends, integrated into the rear wall, an immobilizing system attached to the receiving unit, and/or a carrier bar attached to the receiving unit. The receiving unit may be positioned such that the rear end is directed toward the back of the vehicle and forms an engaging structure in the rear wall that can be aesthetically hidden from view with a cover or cap.

The carrier bar can generally be universal, meaning it can be attached to any vehicle with a receiving unit and can have any attachments placed on the carrier bar to carry a variety of items. The carrier bar is generally lightweight, easily stored in the vehicle when not in use, and easily attachable to the receiving unit when use is desired. When in use, the carrier bar will not damage the paint on the vehicle. Also, supportability is improved with the carrier because it can be positioned at an optimum level on the vehicle, providing ample distance from the ground when an item or storage pod is attached to the carrier bar and providing less stress to a person's back when the person is loading the item or storage pod onto the carrier bar. The invention is advantageous in that it provides a lightweight and easy to use carrier rack and storage system that can be integrated into motor or other vehicles. The invention is further advantageous in that it will not damage or scratch the vehicle. The invention is yet further advantageous in that it provides a simplistic storage system in which all items for a particular activity are kept together and may be easily taken along when going to an activity and stored when returning from the activity.

In accordance with another aspect of the invention, the receiving unit described above is integrated into a portion of a vehicle having a side wall, such as a side of a truck bed, a side door, a side of a trunk lid, or other side panel of a vehicle. Interior walls are also contemplated.

In accordance with another aspect of the invention, the receiving unit described above is integrated into a portion of a motor vehicle having a front end, such as a front end of a bus, motor home, van, truck, SUV, or minivan.

In accordance with another aspect of the invention a storage system is provided which allows a user to easily transport and store items associated with a particular activity in a convenient compartment or compartmentalized pod. This provides simplicity in storing commonly used items for one activity, ease of transport, and ease of storage in any location necessary including in the home, office, garage, basement, closet, on a wall, or in or on virtually any other location desired.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

U.S. Pat. No. 6,752,302 by Anton et al., patented Jun. 22, 2004 is hereby incorporated by reference in its entirety.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 1A shows a dis-assembled example of a transitional carrier bar device in accordance with the present invention.

FIG. 1E shows a fully assembled example of a transitional carrier bar device in accordance with the present invention that is inserted into a receiver device in the rear of a motor vehicle and is securely holding and supporting a bicycle.

FIGS. 2A-2D are side and perspective views of an exemplary transitional carrier bar device in accordance with the present invention.

FIG. 4C shows an example of middle transitional carrier bar with angular locking pieces in accordance with the present invention.

FIGS. 6A-G are views of other embodiments of a cradle device in accordance with the present invention.

FIG. 7A is a view of a push button release device in accordance with the present invention.

FIG. 7B is a view of another embodiment of a push button release device in accordance with the present invention.

FIG. 8 is a view of a cargo peg securing location in accordance with the present invention.

FIGS. 9D-E are views of wheelchair support extension embodiments in accordance with the present invention.

FIG. 10D is a view of an example embodiment of a golf bag support device in accordance with the present invention.

FIG. 10E is a view of an example embodiment of a "golf pod"—a combination golf bag support device and storage pod in accordance with the present invention.

FIGS. 11D-F are views of an example embodiment of board support device expansions in accordance with the present invention.

FIG. 11J-L are views of example embodiments of a collapsed surfboard storage device in accordance with the present invention.

FIG. 14A is a view of the rear of a vehicle in accordance with the present invention.

FIG. 14B is a view of the rear of a vehicle with the emblem support device open in accordance with the present invention.

FIG. 14C is a view of the rear of a vehicle with the transitional carrier bar device inserted into the emblem support device in accordance with the present invention.

FIG. 14D is a view of the rear of a vehicle with the transitional carrier bar device detached and telescopically collapsed in accordance with the present invention.

FIG. 14E is a view of the rear of a vehicle with the cradle device attached to the transitional carrier bar device and the transitional carrier bar device attached into the emblem support device according to the present invention.

FIG. 14F is a view of the rear of a vehicle with the cradle device holding a bicycle and attached to the transitional carrier bar device and the transitional carrier bar device attached into the emblem support device according to the present invention.

FIGS. 15A-F are views of the secondary support structure attached inside the trunk or rear of a vehicle in accordance with the present invention.

DETAILED DESCRIPTION

Figure 1B:
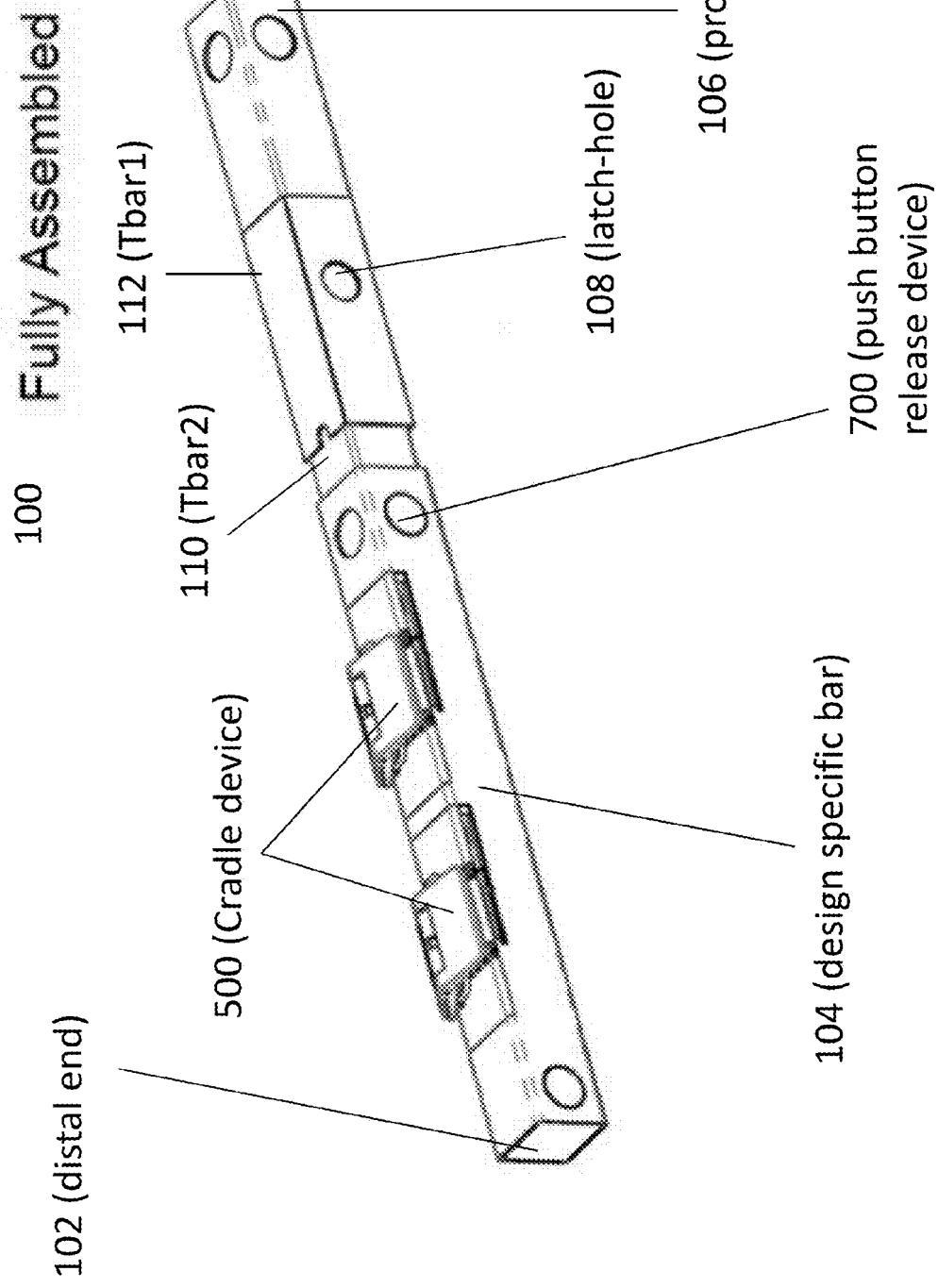
FIG. 1B shows a fully assembled example of a transitional carrier bar device in accordance with the present invention.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

Turning to FIG. 1A, a dis-assembled example of a transitional carrier bar device in accordance with the present invention is shown.

Dis-assembled carrier bar device 100 shows two cradle device 500's in design specific bar 104. Distal end 102 of dis-assembled carrier bar device 100 is shown at the opposite end of the figure from proximal end 106 of the dis-assembled carrier bar device 100. Tbar 2 110 inserts into design specific bar 104 and in some embodiments attachment is secured by push button release device 700.

Turning to FIG. 1B, a fully assembled example of a transitional carrier bar device in accordance with the present invention is shown.

FIG. 1B is similar to FIG. 1A but not identical. In FIG. 1B, push button release device 700 is engaged with design specific bar 104. Tbar 2 is a male type member at both ends which is engaged with Tbar 1 112 using another push button release device 700. Tbar 1 in turn has latch-hole 108 and proximal end 106.

Figure 1C:
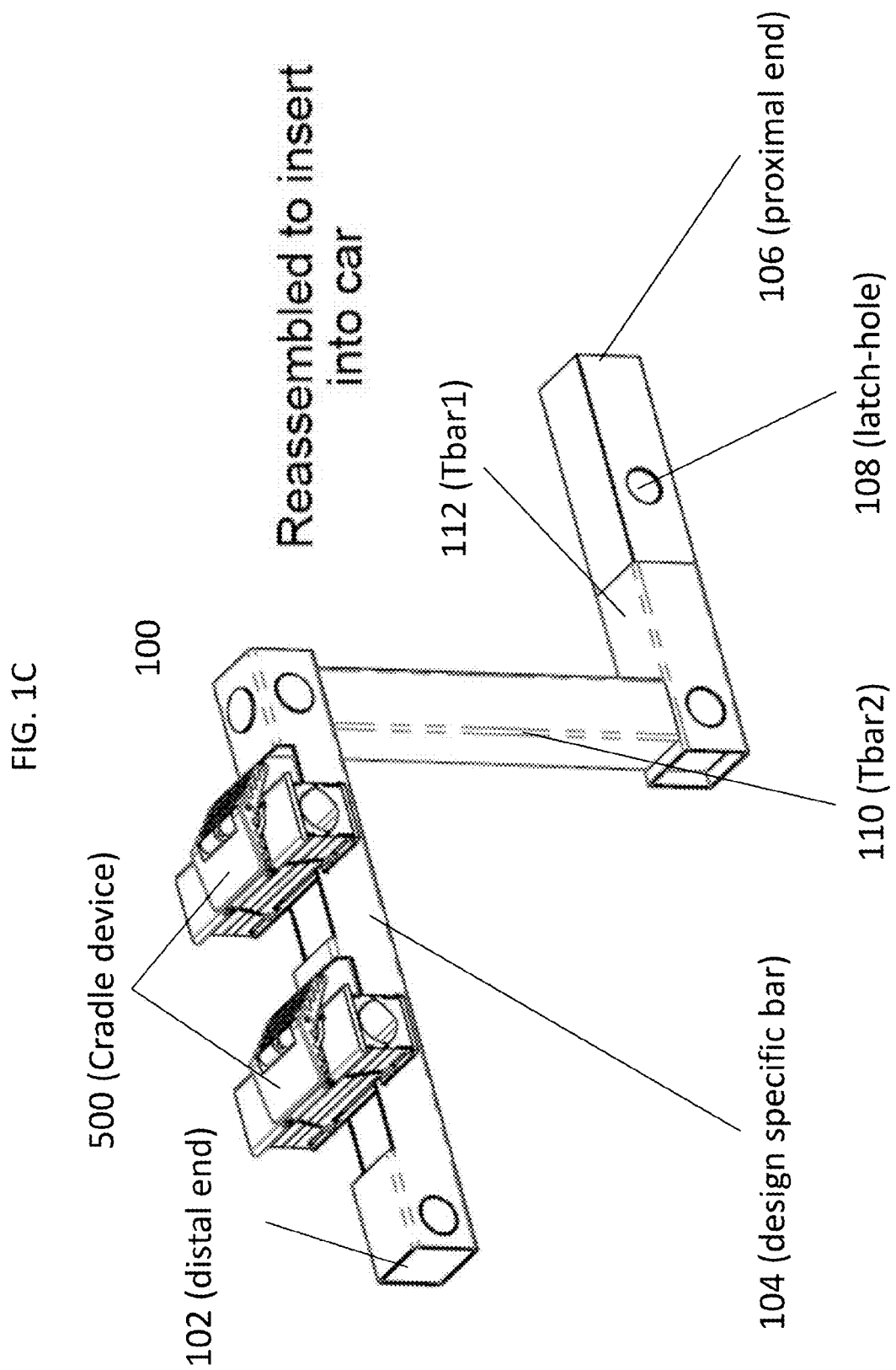
FIG. 1C shows a fully assembled example of a transitional carrier bar device in accordance with the present invention that ready for insertion into a motor vehicle.

Turning to FIG. 1C, a fully assembled example of a transitional carrier bar device in accordance with the present invention that ready for insertion into a motor vehicle is shown.

In FIG. 1C, Tbar 2 110 is connected at ninety-degree angles (perpendicular) to Tbar 1 112 and design specific bar 104. Cradle device 500's are extended and ready to clasp, grasp, or otherwise hold items such as horizontal bars or members. More on the mechanics of extending cradle device 500's will be discussed below regarding FIG. 5.

Figure 1D:
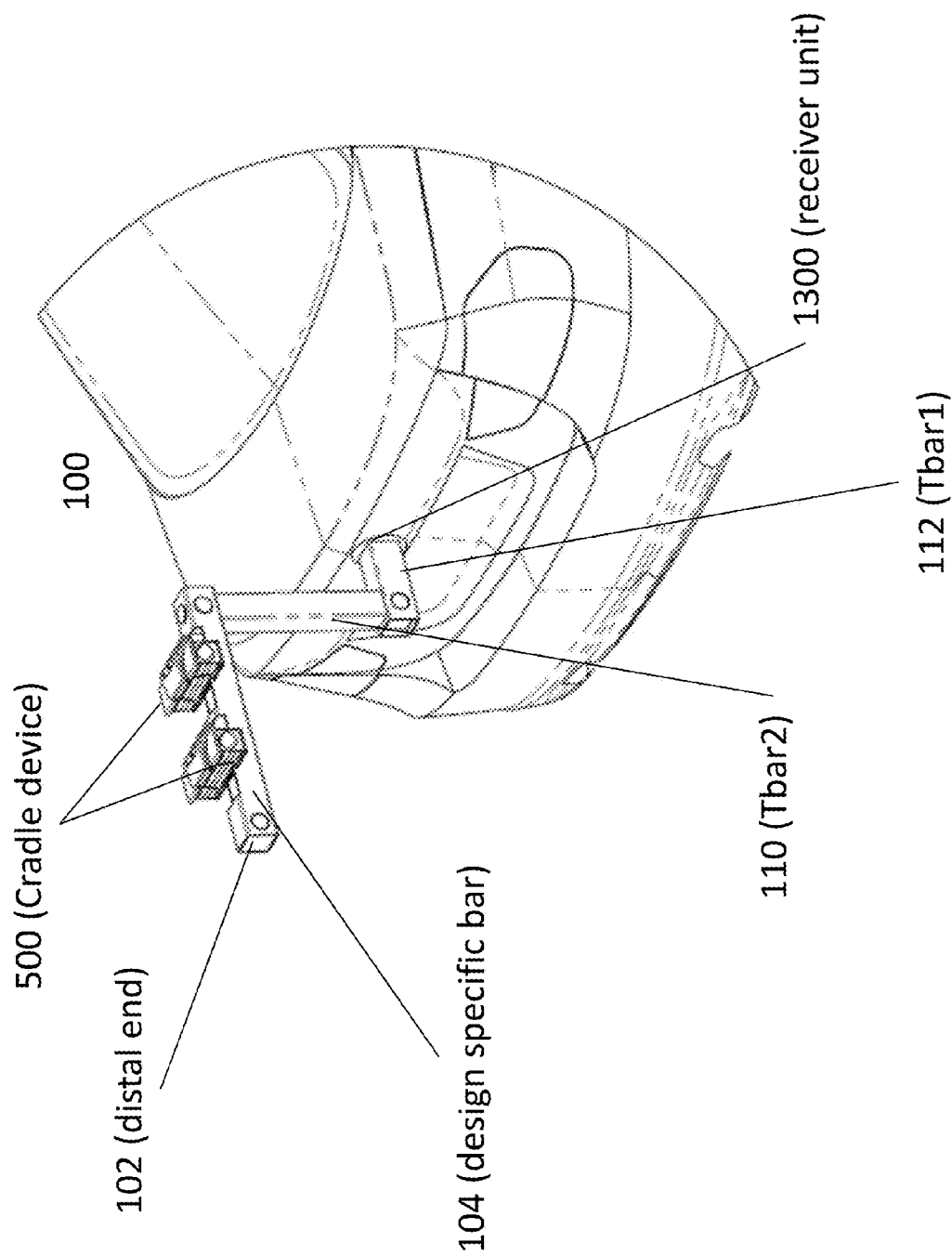
FIG. 1D shows a fully assembled example of a transitional carrier bar device in accordance with the present invention that is inserted into a receiver device in the rear of a motor vehicle.
Figure 2B:
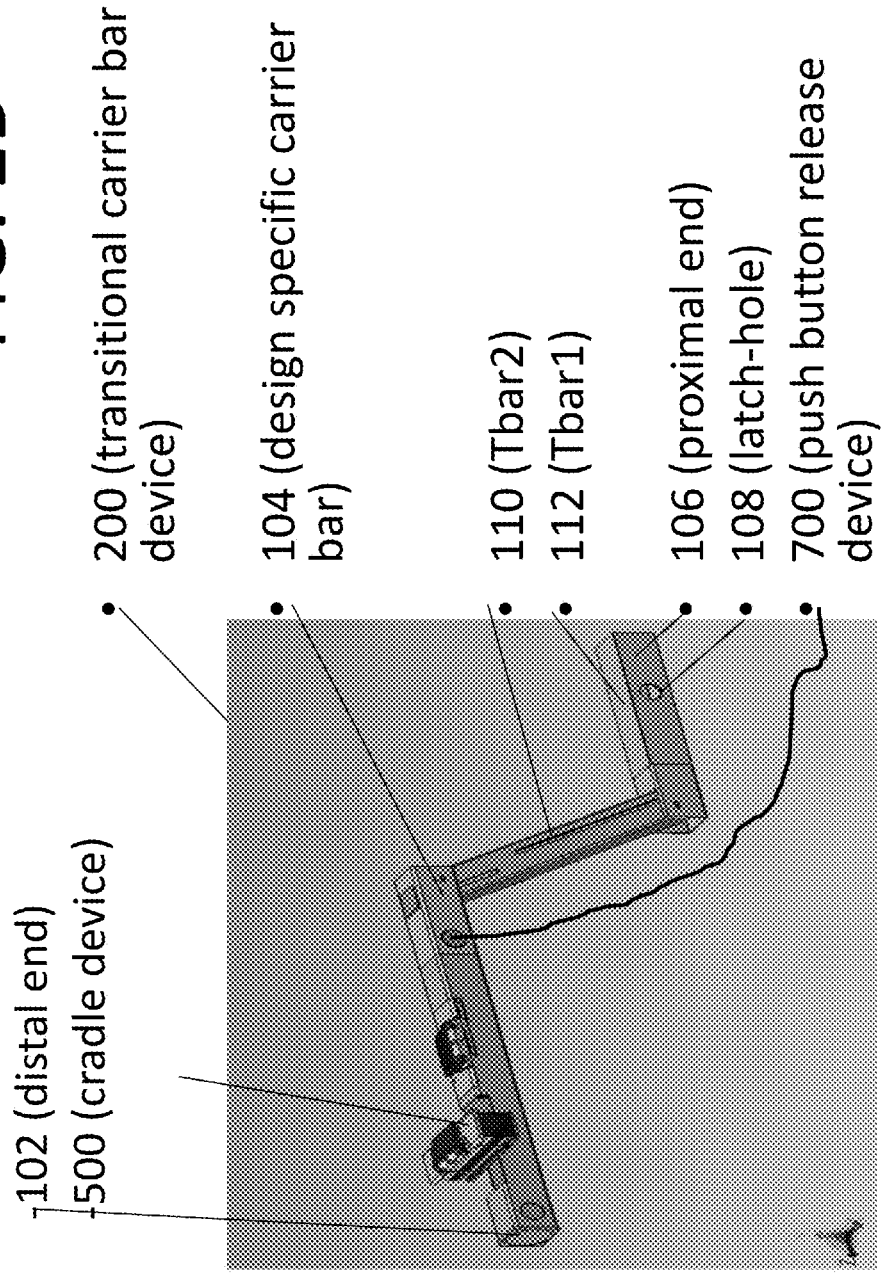
Figure 2C:
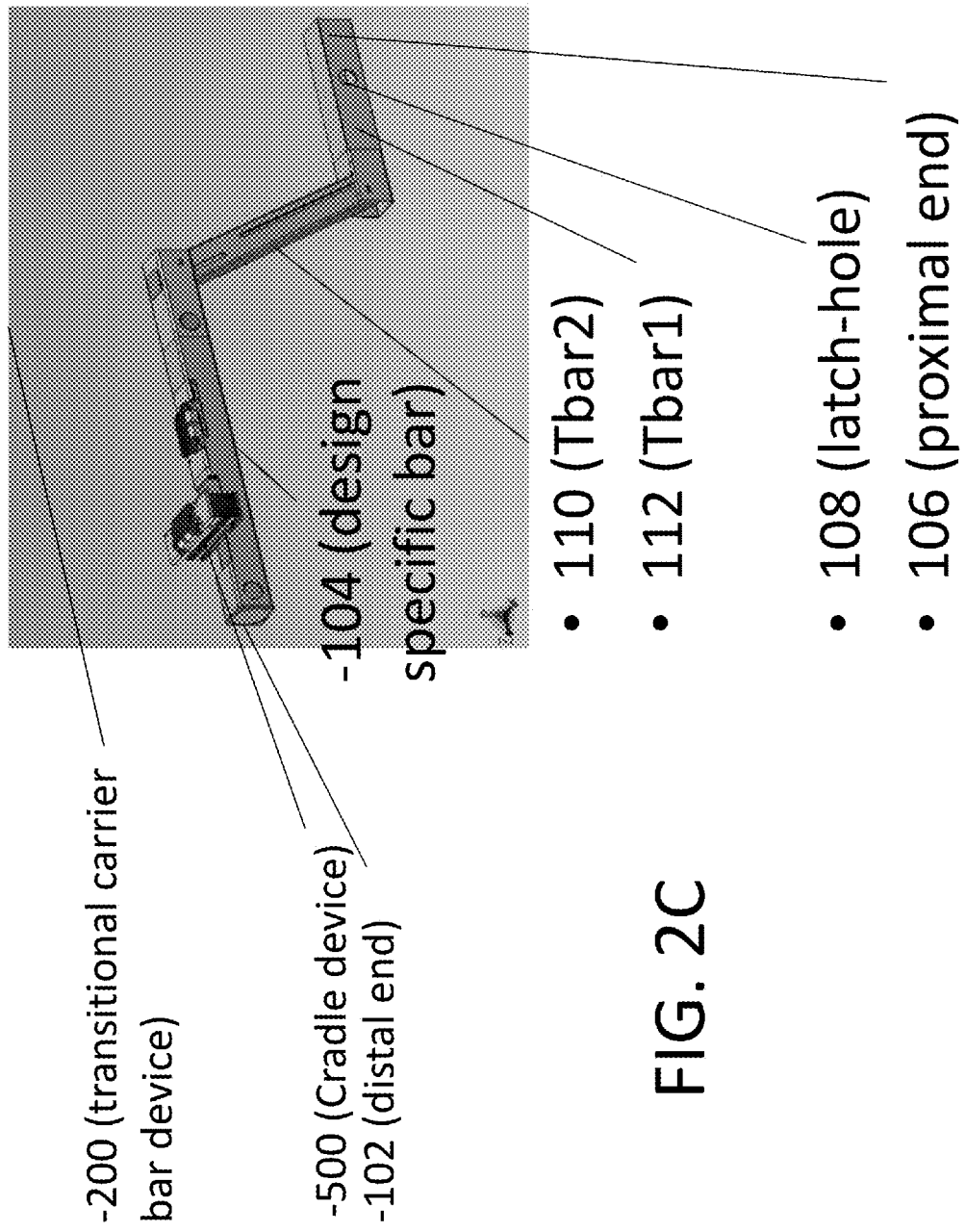

Turning to FIG. 1D, a fully assembled example of a transitional carrier bar device in accordance with the present invention that is inserted into a receiver device in the rear of a motor vehicle is shown.

In FIG. 1D, Tbar 1 110 is inserted into receiver unit 1300 in the rear of a vehicle and secured for transporting cargo.

Turning to FIG. 1E, a fully assembled example of a transitional carrier bar device in accordance with the present invention that is inserted into a receiver device in the rear of a motor vehicle and is securely holding and supporting a bicycle is shown.

In FIG. 1D, one cradle device 500 is shown supporting a bicycle while a second cradle device 500 is extended but not supporting anything while transitional carrier bar device 100 is attached to the rear of a vehicle.

Turning to FIGS. 2A, 2B, 2C, 2D, a transitional carrier bar device 200 is provided in order to allow for attachment or integration of cargo specific carrier bars 1250. Transitional carrier bar device 200 has numerous components in the example embodiment including proximal end 106, Tbar 1 112, Tbar 2 110, design specific carrier bar 104, cradle device 500, latch-hole 108 and distal end 102.

In the example embodiment proximal end 106 of transitional carrier bar device 200 is attached to receiver 1300 at a height which allows for specific cargo carrying with optimal ground clearance. Alternatively, transitional carrier bar device 200 may attach to traditional vehicle hitch systems.

Transitional carrier bar device 200 in some embodiments is a single bar. In alternative embodiments, such as the one portrayed, transitional carrier bar device 200 is expandable and collapsible by telescoping, folding, or other means. Expansion of transitional carrier bar device 200 is provided for adequate height allowance for cargo specific requirements, such as golf bags which are typically tall and may require a higher carrying point in order to provide adequate ground clearance during transportation. In collapsed form, transitional carrier bar device 200 is capable of storage within the vehicle trunk, rear or other convenient location in the vehicle. Transitional carrier bar device 200 may in some embodiments have movable parts and the movable parts may be tethered to one or multiple other movable or stationary parts in operation and/or in storage.

Transitional carrier bar device 200 has a hollow interior in the example embodiment however it may also have a solid or semi-solid interior. The interior region may also be reinforced with struts, T-beams, I-beams or other reinforcing members. These structures generally provide additional structural support for the device and may be application specific depending on the cargo to be supported by the device. The cross section of transitional carrier bar device may be square, oval, circular, polyhedron, or other shapes and may have modified edges, corners, angles, or semi-circular dimensions.

Transitional carrier bar device 200 in the example embodiment integrates cradle 500 by a temporary attachment. As such, cradle 500 is detachable from transitional carrier bar device 200 as required by the user. Temporary attachment is generally easily detached and may involve only a single or a few simple steps for detachment. Alternatively, cradle 500 may be permanently or semi-permanently affixed transitional carrier bar device 200. Examples of permanent affixation include welding or fusing. Permanent affixation may occur during initial manufacturing in creating a single device. Examples of semi-permanent affixation may include multi-step processes for detachment of transitional carrier bar device 200 and cradle 500.

In the example embodiment transitional carrier bar device 200 has three portions, Tbar 1 112, Tbar 2 110, and design specific bar 104. As previously described, transitional carrier bar device 200 has telescoping features in the example embodiment. Other embodiments exist in which transitional carrier bar device 200 has folding or other collapsing features. In some embodiments transitional carrier bar device 200 is a single bar.

In the example embodiment Tbar 1 112 is the proximal end 106 of transitional carrier bar device 200 and inserts into receiver 1300 to form a connection. The connection is formed by insertion of spring-loaded metal latch 1307 into latch-hole 108. Distal end of Tbar 1 112 allows for telescoping of Tbar 2 110 in a first configuration and in a second configuration provides support for locking Tbar 2 110 into a carrying configuration. Carrying configuration in some embodiments is cargo specific and as such one or more carrying configurations may be possible.

In some embodiments rather than members or sections such as Tbar 1 112, Tbar 2 110 and design specific bar 104 attaching as shown in the drawings, there may be additional parts that allow for stair-stepping combinations of the above members or sections as necessary to elongate transitional carrier bar device 100 to carry more cargo or storage pods.

Distal end of Tbar 2 110 allows for telescoping of design specific bar 104 in a first configuration and in a second configuration provides support for locking design specific bar 104 into a carrying configuration. Carrying configuration is cargo specific and as such one or more carrying configurations are possible. Design specific bar 104 has one or more connection points which provide positions to lock cradle 500 into place. As previously mentioned, other configurations are contemplated which may not require telescoping and may have Tbar 1 112, Tbar 2 110, and design specific bar 104 in alternative configurations such as Design specific bar 104 being perpendicular to Tbar 2 110 or others. Tbar 1 112, Tbar 2 110, and Design specific bar 104 in the example embodiment can telescope within one another and into receiver 1300 in the rear of vehicle.

Telescoping features as described above provide for Tbar 1 112, Tbar 2 110, and design specific bar 104 to be collapsed into a smaller structure. Other words exist which may describe telescoping including nesting. In the example embodiment, Tbar 1 112, Tbar 2 110, and design specific bar 104 are of such dimensions that one slides into another and the combination slides into the third. Generally this means that Tbar 1 112 slides into Tbar 2 110 and then combination of Tbar 1 112 and Tbar 2 110 slides into design specific bar 104. Other configurations exist in which Tbar 1 112 may slide over Tbar 2 110 and then Tbar 2 110 may slide over design specific bar 104. Alternatively, combinations of each configuration exist.

Various engagement or connection means also exist, which provide locking structures so that transitional carrier bar device 200 is locked into a desired configuration such as collapsed or fully expanded for supporting cargo. These may include pins, buttons, clasps, bars, pegs, or others with associated holes, grooves, slots, or others. Additional structures may also be used to control the engagement/disengagement or connection/release of the elements including buttons, locks, keys, levers, or others. In some embodiments more than one structure may be used.

Dimensions of Tbar 1 112, Tbar 2 110, and design specific bar 104 are contemplated that provide support to one or multiple types and/or shapes of cargo. In some embodiments the dimensions of one or more of Tbar 1 112, Tbar 2 110, and/or design specific bar 104 may be shorter or longer and/or wider or thinner and in the embodiments the connection or engagement between portions of transitional carrier bar device 200 are compatible with each other.

In the example embodiment, cradle 500 is attached to design specific bar 104 of transitional carrier bar device 200. Cradle 500 may be attached to the distal end 102 of transitional carrier bar 200 in some embodiments. In other embodiments, cradle 500 may be attached above or below transitional carrier bar 200. Cradle 500 may be attached so that the lengthwise orientation of transitional carrier bar device 200 is perpendicular to the lengthwise orientation of transitional carrier bar device 200. Other embodiments exist with multiple cargo specific carrier bars 1250 in addition to cradle 500 are attached to each other and/or transitional carrier bar device 200 at various appropriate configurations such as triangular, square, other polygons, and others. Some embodiments exist in which there may be more Tbar segments or fewer, as required for the specific type of cargo.

In some embodiments Tbar 1 112, Tbar 2 110 and design specific bar 104 have cam-locking rods extending through their walls and engaging with corresponding structures in the associated interior wall area of the adjoining segment. There are also corresponding slits, grooves, and other receiving structures which are used for engaging segments in some embodiments. Deeper holes may engage pins to lock segments in place in relation to other segments which in some embodiments are at ninety degree angles. Levers may pull the pins out to disengage in some embodiments.

In some embodiments design specific bar 104 is shorter than Tbar 2 110 and/or Tbar1 112 and has a male structure on its distal end which may insert into a female structure on the proximal end of other carrier bars which may be specifically designed for a single type or class of cargo.

Push button release device 700 (further described below in this application) to allow for interlocking of the pieces Tbar 1 112, Tbar 2 110, and design specific carrier bar 104. Alternatively, other structures may be used to secure the connection between the pieces including locks, pins, latches, or others.

In some embodiments, plastic, Polytetrafluoroethylene (PTFE), Polyoxymethylene or other materials are used to aid sliding and snugness properties during telescoping and/or in locked positions between parts of transitional carrier bar device 200.

In some embodiments in which distal end 102 of transitional carrier bar 200 is the terminus of all structures attached to the vehicle, a signaling device is attached at distal end 102 of transitional carrier bar device 200. Alternatively, in embodiments in which cradle 500 is the terminus of all structures attached to the vehicle, a signaling device is attached at distal end of cradle 500. This may include a passive red reflector and/or an active or illuminated red light reflector or other color as required by traffic laws. In the active or illuminated red light reflector embodiments, the red light reflector is hard wired or alternatively wirelessly turned on and off. Additionally, an attachment for a real or digital license plate is provided in some embodiments.

In some embodiments external support for transitional carrier bar device 200 is required and may be done so with external support rods which extend to the rear panel. These external support rods may have engaging mechanisms in some embodiments and in other embodiments external support rods may not have engaging mechanisms.

Figure 3A:
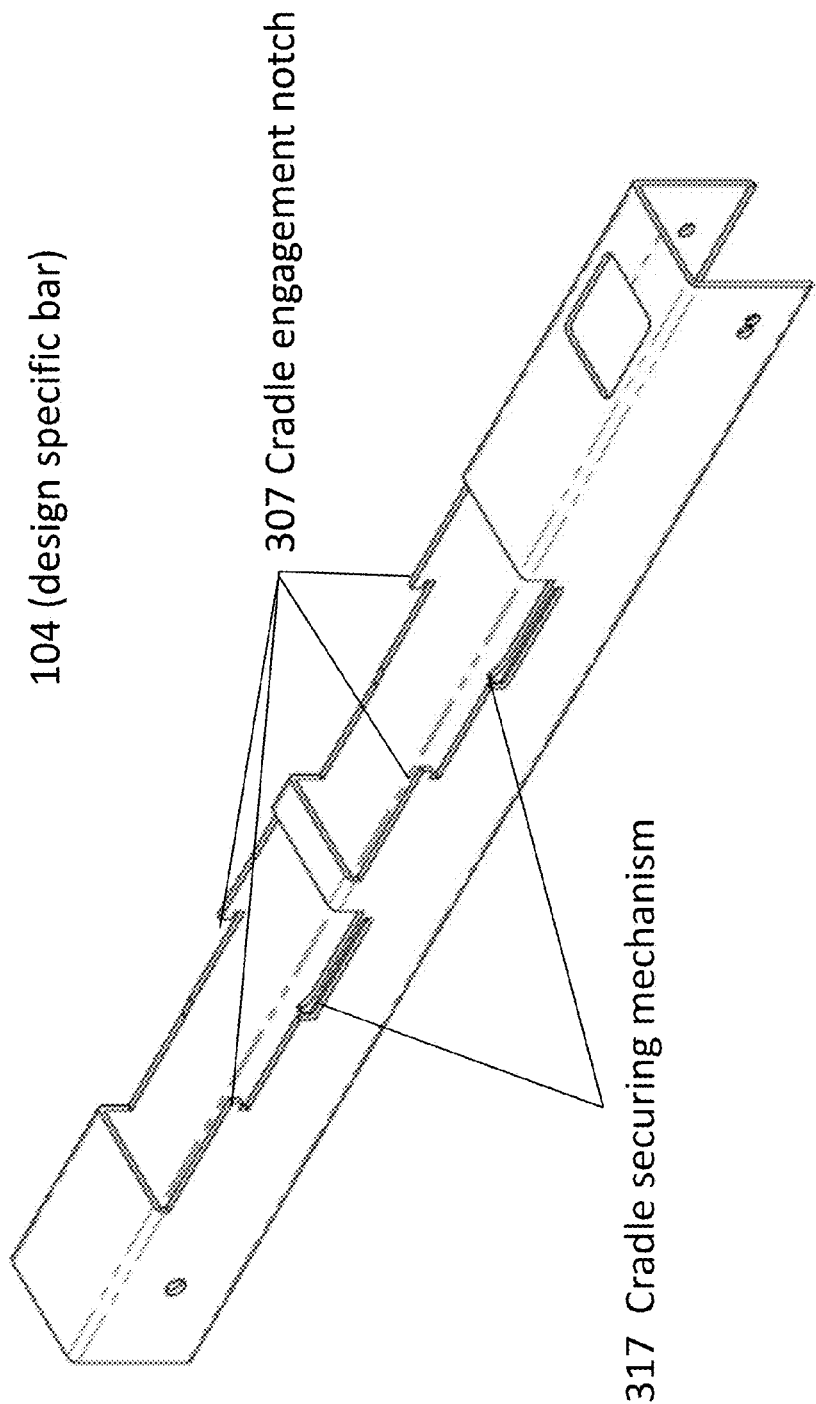
FIG. 3A shows a view of a portion of design specific bar with notches and locking mechanisms to engage and hold a cradle device in accordance with the present invention.

Turning to FIG. 3A a view of a portion of design specific bar with notches and locking mechanisms to engage and hold a cradle device is shown.

In FIG. 3A cradle engagement notch 307*s* are provided in order to help secure cradle device 500*s* in place. Cradle securing mechanism 317*s* are also provided and allow for an additional securing position for cradle device 500s. In some embodiments cradle securing mechanism 317s may be phlanges that are located on the side of the bar and are slidable to engage and secure cradle device 500s or disengage as appropriate.

Figure 3B:
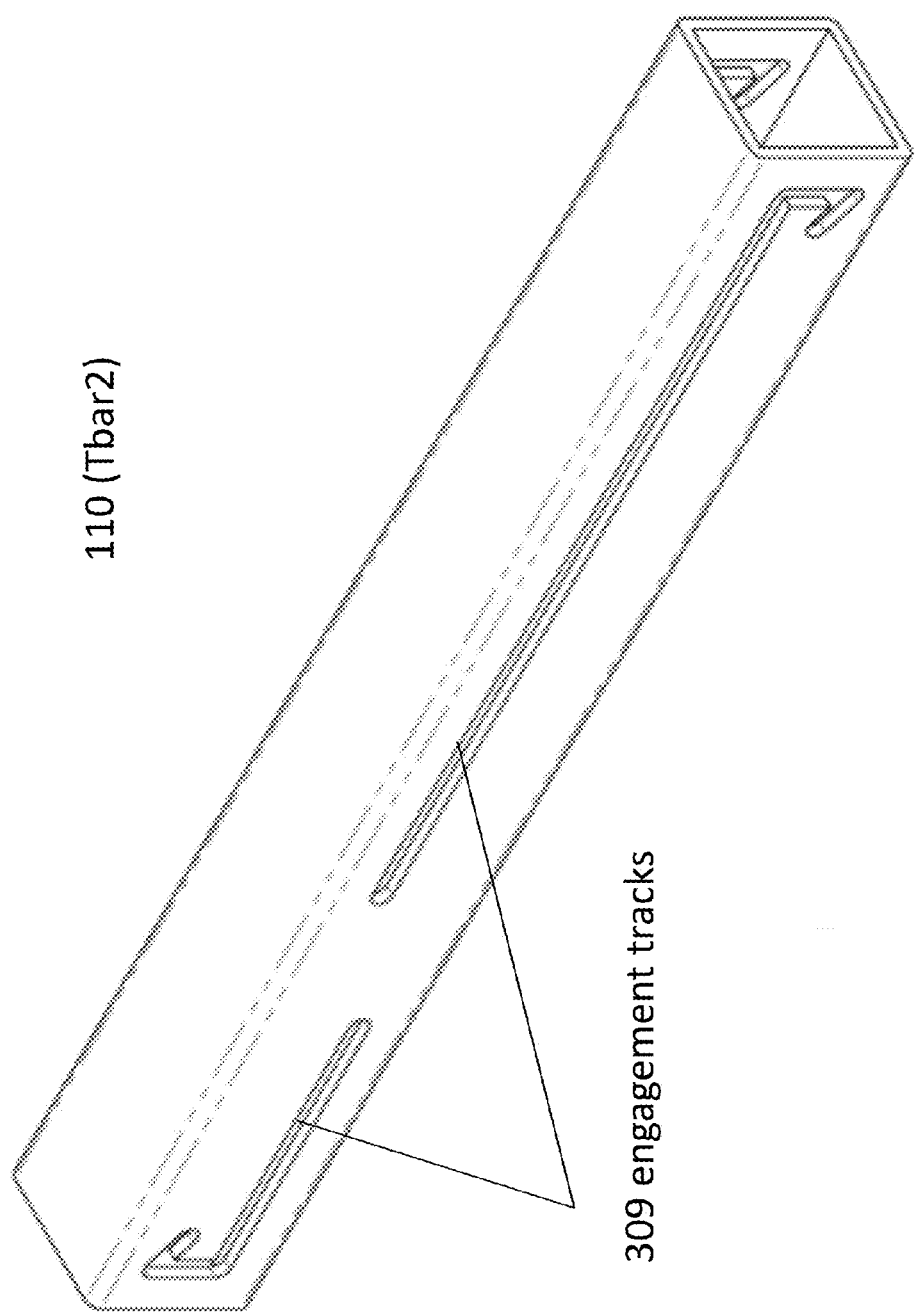
FIG. 3B shows a view of a portion of Tbar 2 including engagement tracks to engage interior structures of other members for collapsing or expanding and a transitional carrier bar device locking in place.

Turning to FIG. 3B a view of a portion of Tbar 2 including engagement tracks to engage interior structures of other members for collapsing or expanding and a transitional carrier bar device locking in place is shown.

Engagement tracks 309 may have chamfered edges to provide for ease of use. Engagement tracks 309 may be in appropriate configurations but generally engage members on the interior or exterior of adjoining members in order to secure Tbar 2 110 to Tbar 1 112 and design specific bar 104s.

Figure 3C:
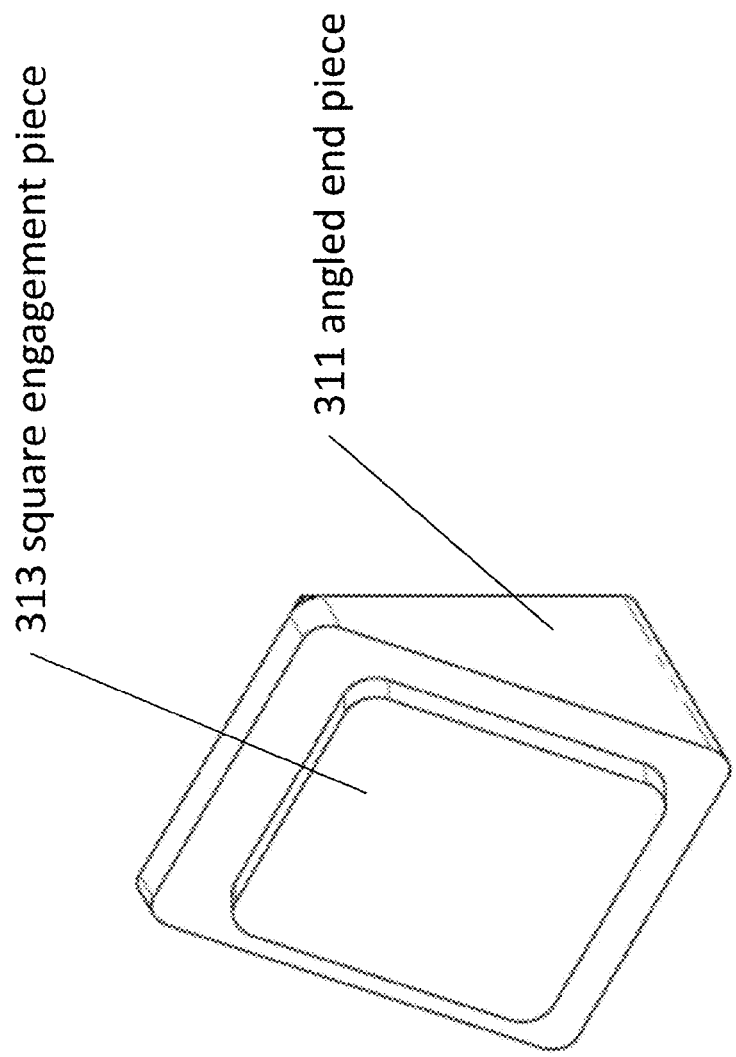
FIG. 3C shows an angled end piece with an engagement piece for use in angled embodiments of a transitional carrier bar device in accordance with the present invention.

Turning to FIG. 3C, a view of an angled end piece with an engagement piece for use in angled embodiments of a transitional carrier bar device is shown.

Angled end piece 311 may be attached in some embodiments to the end of bar members of transitional carrier bar device in order to provide angled configurations for transitional carrier bar devices. Square engagement piece 313 fits snugly into square engagement piece hole 315 (as shown in the next figure) in order to maintain a locked configuration.

Figure 3D:
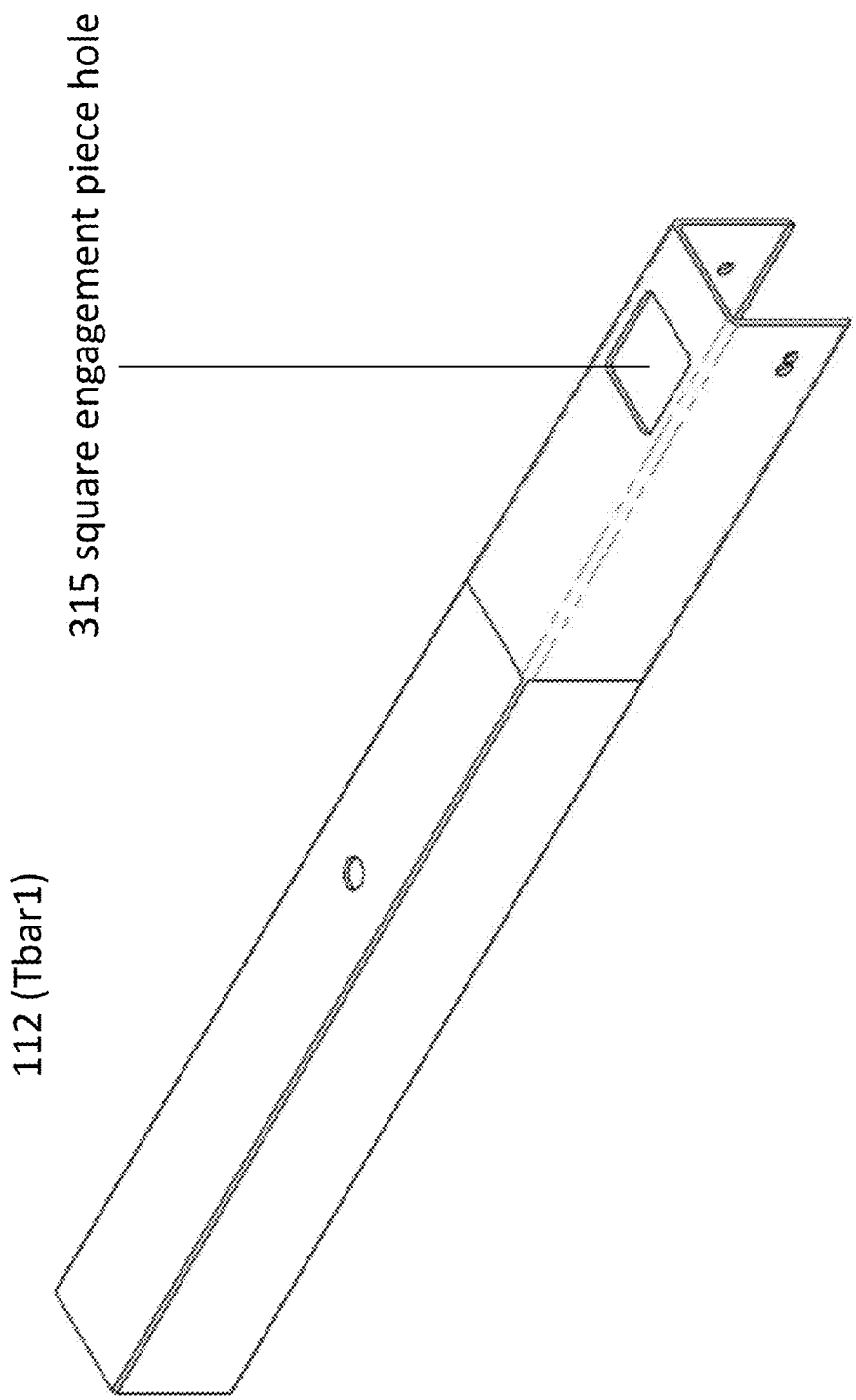
FIG. 3D shows a bottom view of a Tbar 1 with a square engagement piece hole for locking with a square engagement piece in accordance with the present invention.

Turning to FIG. 3D, a bottom view of a Tbar 1 with a square engagement piece hole for locking with a square engagement piece in accordance with the present invention is shown.

In the example embodiment square engagement piece hole 315 is provided in Tbar 1 112 in order to provide a location to secure square engagement piece 313s as shown in the previous figure.

Figure 3E:
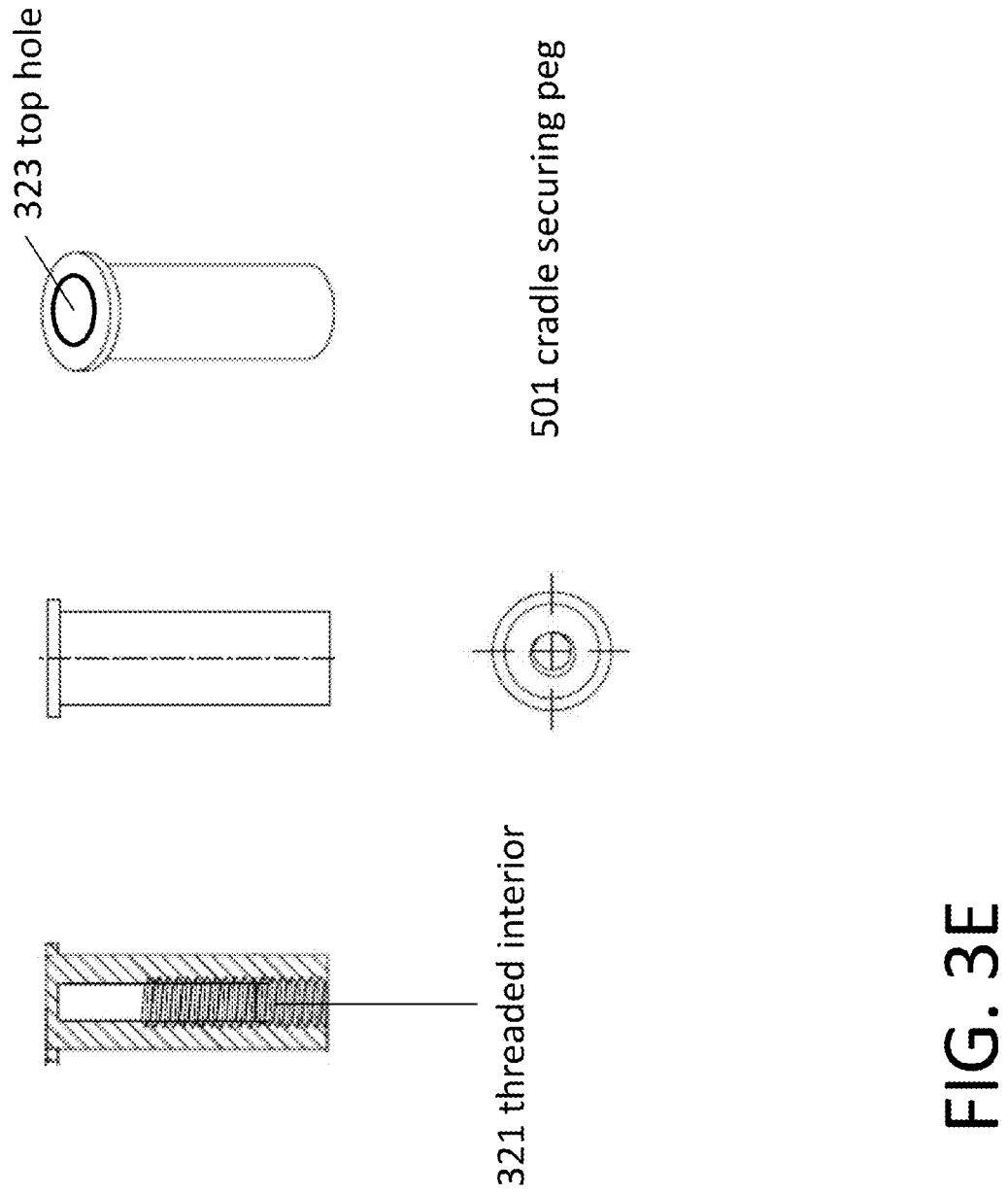
FIG. 3E shows a cradle securing peg with a threaded interior and a hole recess for a cargo carrying peg in accordance with the present invention.

Turning to FIG. 3E, a cradle securing peg with a threaded interior and a hole recess for a cargo carrying peg in accordance with the present invention is shown.

Cradle securing peg 501 in the example embodiment has top hole 323 that may be operable to receive cargo securing peg attached to a particular piece of cargo or carrying bar that fits into cradle 500s. In an example embodiment cargo securing peg 501 may fit into cargo peg receiving area 1010 (as shown in FIG. 5E). Cradle securing peg 501 in the example embodiment also has a threaded interior 321 so as to provide engagement with cradle securing screw 531 (as shown in FIG. 5G).

Figure 4A:
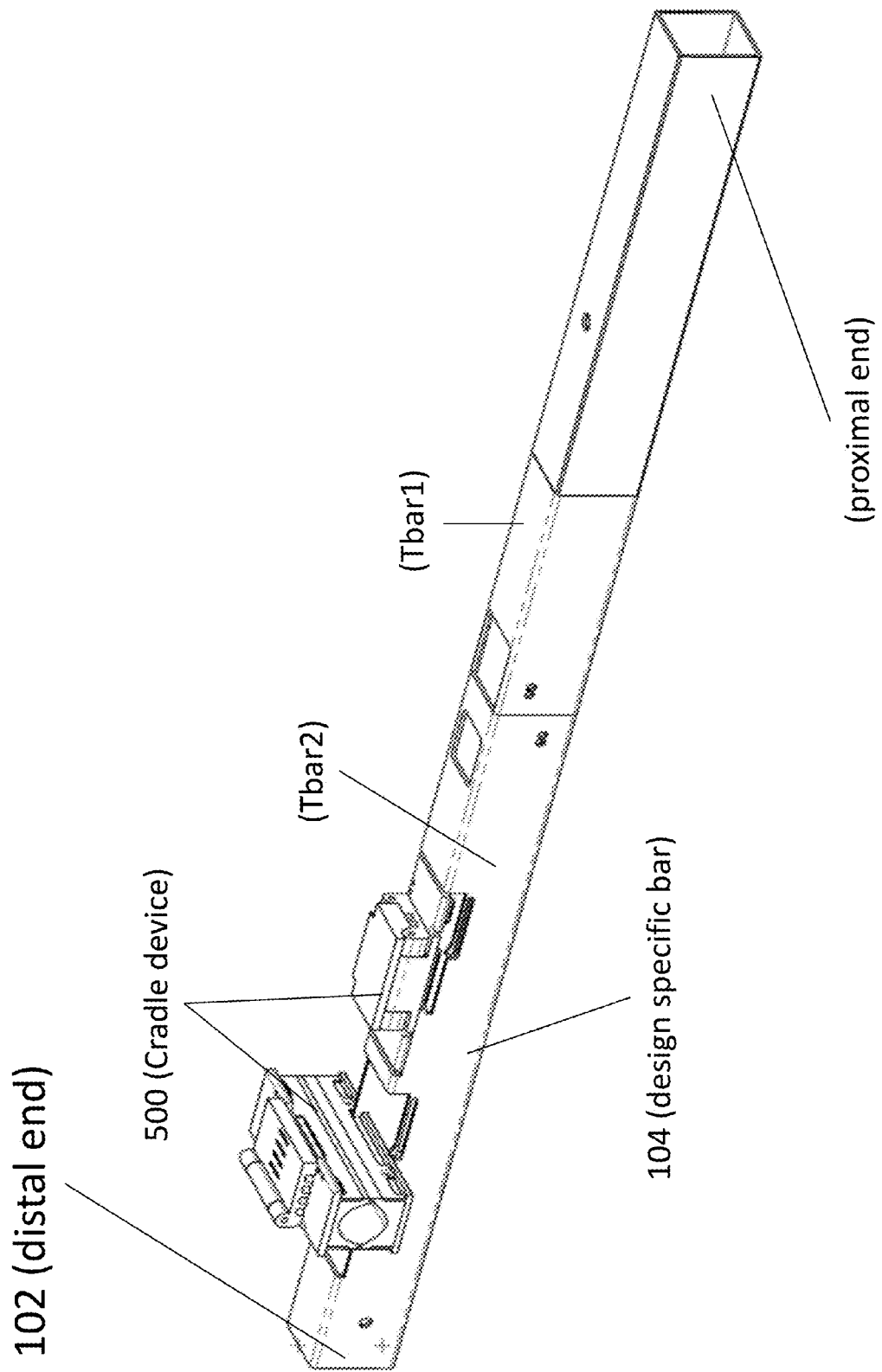
FIG. 4A shows a partially collapsed example of a transitional carrier bar device in accordance with the present invention with one cradle device extended and one stored.

Turning to FIG. 4A, a partially collapsed example of a transitional carrier bar device in accordance with the present invention with one cradle device extended and one stored is shown.

Figure 4B:
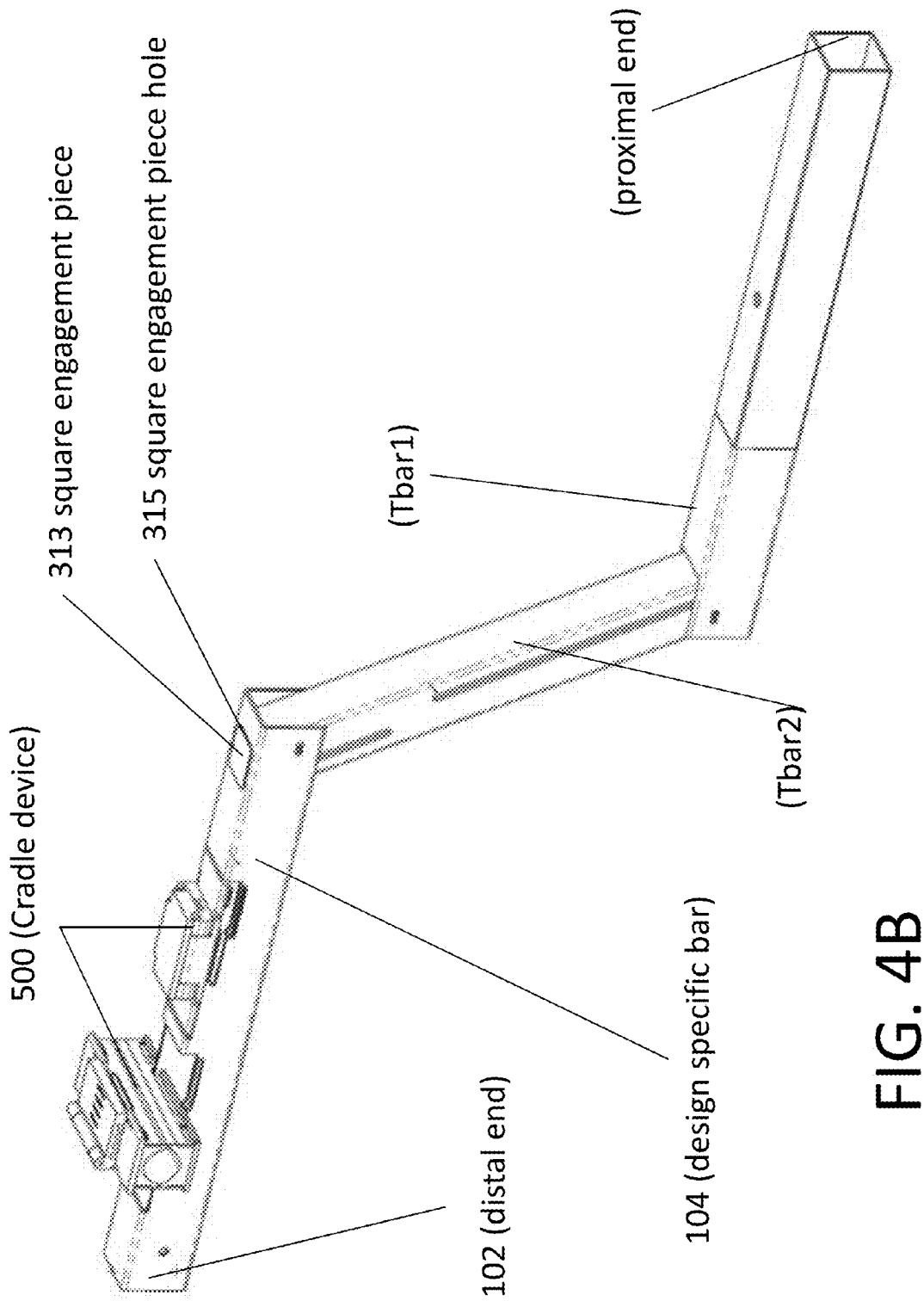
FIG. 4B shows a fully extended and locked example of a transitional carrier bar device in accordance with the present invention with one cradle device extended and one stored.

Turning to FIG. 4B, a fully extended and locked example of a transitional carrier bar device in accordance with the present invention with one cradle device extended and one stored is shown. In the example embodiment square engagement piece 313 can be seen in square engagement piece hole 315 and provides for angular configuration.

Turning to FIG. 4C, an example of middle transitional carrier bar with angular locking pieces in accordance with the present invention is shown.

Angled end piece 311 of Tbar 2 110 is shown in addition to engagement tracks 309.

Figure 5A:
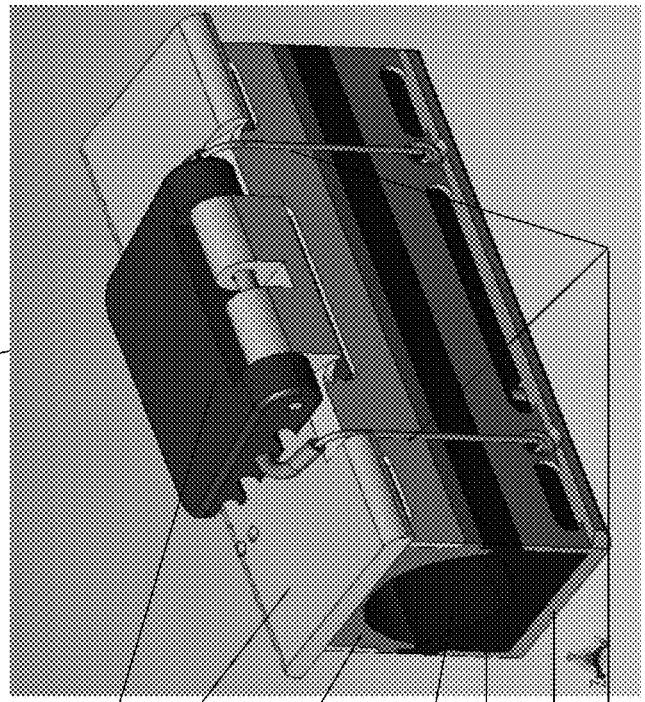
FIGS. 5A-D, G-L are views of some embodiments of a cradle device in accordance with the present invention.

Turning now to FIG. 5A, a particular embodiment of cradle 500 is shown. In this embodiment, cradle 500 is provided to support horizontal bar of bicycle and the structure is called a cradle device 500. In the example embodiment, horizontal bar of bicycle is parallel to the ground surface when the bicycle is in a normal, upright position as shown in FIG. 14F. In other embodiments, horizontal bar of bicycle may not be parallel with the ground surface but may still be substantially horizontal. In such other embodiments, horizontal hole 1360 and the components which surround and support it will have an appropriate angle to match that of the substantially horizontal bar. In some embodiments a locking mechanism may hold cradles in place so they will not disengage if held upside-down.

In FIG. 5A, cradle device 500 is shown which is made of an upper and lower cradle portion. Upper cradle portion is made of two parts, an upper engaging part 1320 and upper support part 1310. Lower cradle portion is made of two parts, a lower engaging part 1330 and lower support part 1340. These elements may alternately be manufactured as single piece combinations, such as an upper cradle and lower cradle in some embodiments. In the example embodiment, cradle device 500 is fixed directly to design specific bar 104. In alternative embodiments, cradle device 500 is fixed directly to transitional carrier bar device 200. In alternative embodiments, cradle device 500 may be collapsible/expandable into carrier bar such as in FIGS. 5B, 5C, 5D, 5E where cradle device 500 may be rotated ninety degrees and slip into design specific bar 104. In this configuration cradle device 500 is stored completely within design specific bar 104 although in some embodiments some parts or portions of cradle device 500 may be slightly exposed. In these embodiments cradle device 500 is secured to design specific bar 104 by an expandable post that extends from the bottom of cradle device 500 to the top surface of design specific bar 104. This post may be located at cargo-peg securing location 1010 and be hollowed so as to be operable to receive a cargo peg as later described in this application.

In many embodiments lower support part 1340s are "V" shaped which helps stabilization of supported cargo bars.

Dten units, metal phlanges, sliding metal retaining pins, or others are used to secure cradle in the rotated ninety degrees position described above.

In other embodiments, cradle 500 may be telescopically collapsible into design specific bar 104 or transitional carrier bar device 200. Multiple cradle devices 500 may also be used in alternative embodiments and fixed in multiple configurations as required by particular cargo dimensions. Multiple design specific bars 104 may be required in certain embodiments and are compatible with each other.

Upper support part 1310 and lower support part 1340 are attached by wires 1350 and in other embodiments, straps. Various locking means may be used in order to lock upper cradle portion and lower cradle portion in place and engage cargo in a stationary position. In the example embodiment wires 1350 is attached to a side of upper cradle portion which does not open with a bead, wire looped around holes in the metal, and fixed to itself. Alternatively the two ends a single wire 1350 may be attached to each other via a groove in the bottom of lower support part. Wires 1350 are flexible in some embodiments. In some embodiments straps are substituted for wires 1350. Straps are used in some embodiments with ratcheting mechanisms. In some embodiments multiple straps may be used and may be configured as appropriate including around a support post of cradle 500. Pin 1311 may be used to secure cradle latch 1360 to upper support part 1310 in some embodiments.

A cradle latch 1360 at the top of upper cradle portion is used to secure wires 1350 at the top surface of cradle 500. Cradle latch 1360 has fingertip aides in some embodiments to assist with user grip.

Each of upper support part 1310 and lower support part 1340 has vertical metal portions which hold upper engaging part 1320 and lower engaging part 1330 in place respectively. In some embodiments upper engaging part 1320 is fixed to upper support part 1310 and lower engaging part 1330 is fixed to lower support part 1340.

In some embodiments lower engagement part 1330 may have a varied construction such as a "V" shaped engagement support surface allowing for better holding and reduced swaying, in addition to having cargo-specific peg engagement.

Upper engaging part 1320 and lower engaging part 1330 in the example embodiment are made of rubber. In alternative embodiments they may be made of plastic, metal, or other materials and may include a variety of anti-slip coatings or gripping bumps, grooves or other surfaces. Upper engaging part 1320 and lower engaging part 1330 may be flexible in some embodiments in order to better provide grip on a horizontal bar and may be compatible with horizontal bars with different diameters and circumferences.

In the example embodiment, horizontal hole 1360 in cradle device 500 is parallel to the rear wall of the vehicle as shown in use in FIG. 14F. Cradle device 500 is locked in operational configuration by wires 1350.

In some embodiments manual bicycles of approximately twenty-five pounds are supported. In some embodiments electric bicycles of fifty to seventy-five pounds are supported. In some embodiments the horizontal bar of the bicycle needs to be two and a half feet above the ground in order to provide a one foot clearance between the supported bicycle and the ground. In some embodiments the bicycle midline needs to be more than eight inches from the vehicle bumper in order to prevent the bicycle pedals from contacting the vehicle. In some embodiments a tire-tether device is provided in order to prevent the bicycle wheel or wheels from turning during transportation. For storage purposes, ends of the tire-tether device may attach to each other to aid in simplifying storage.

Figure 5B:
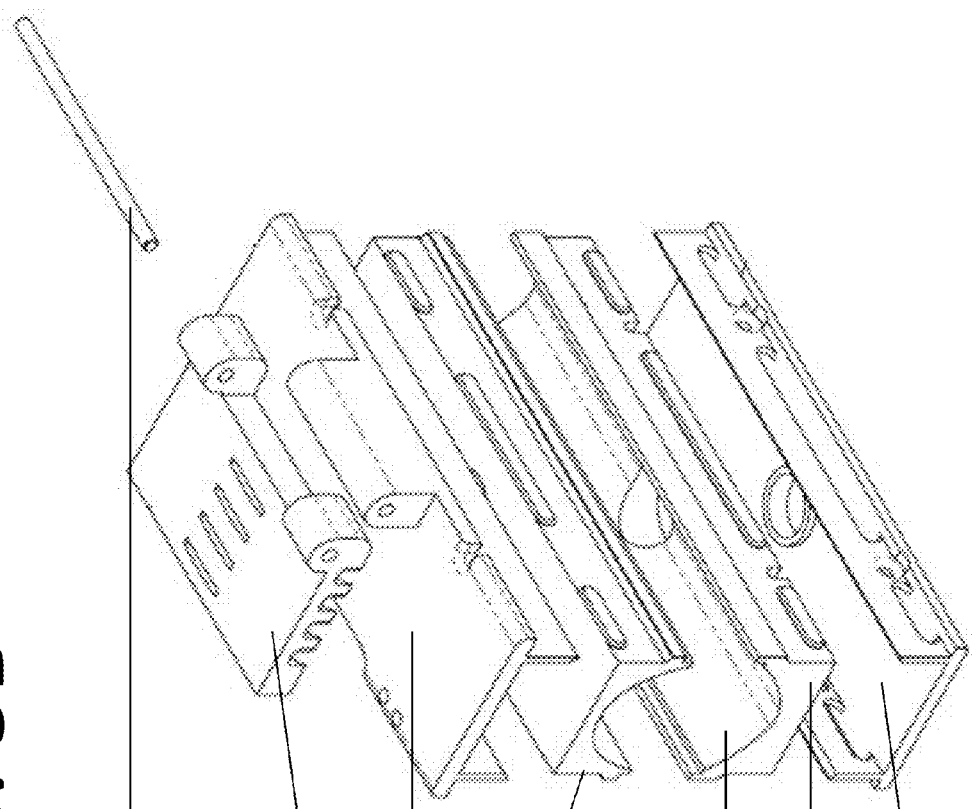

Turning to FIG. 5B an exploded view of cradle 500 is shown.

Figure 5C:
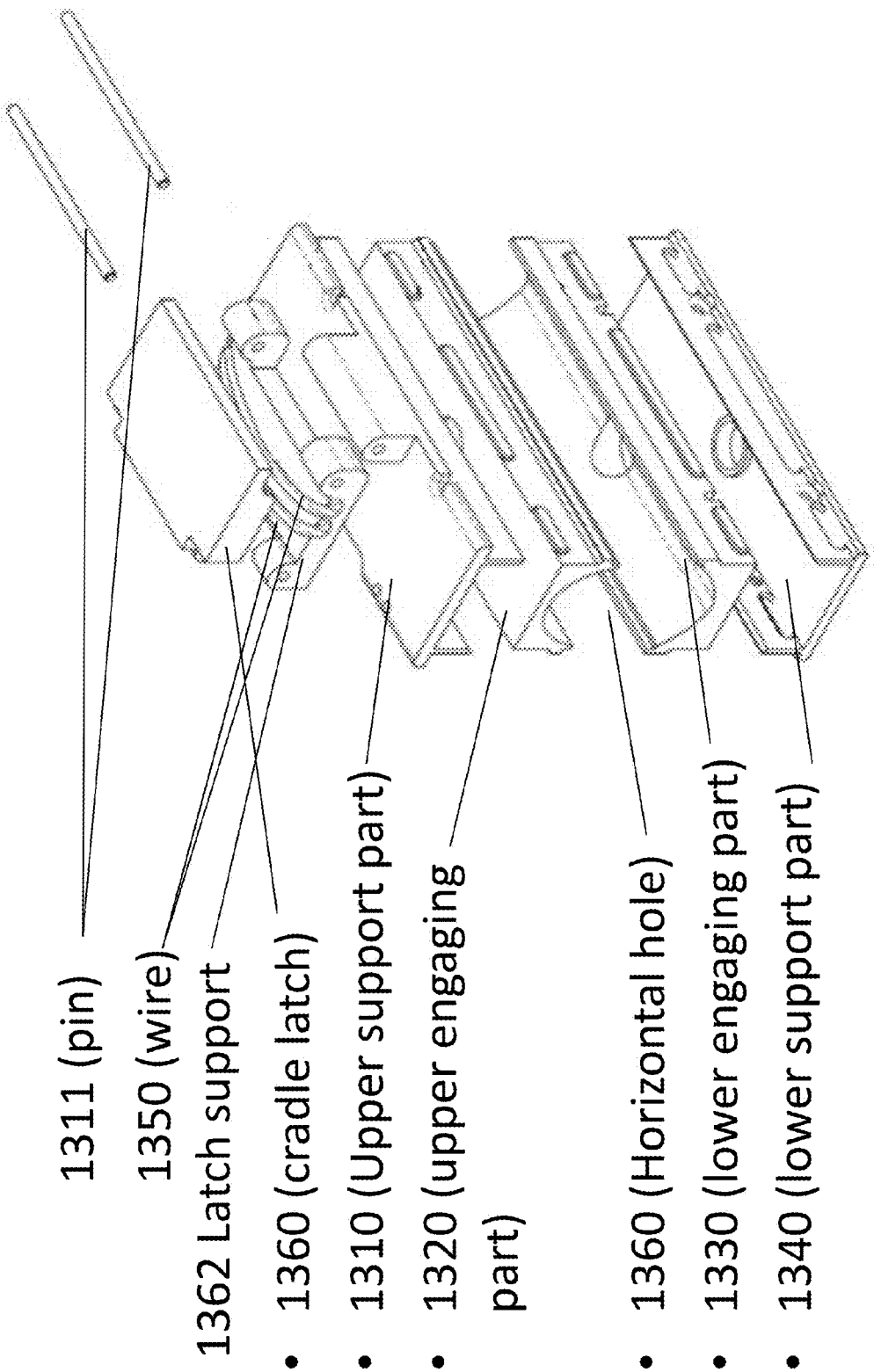

Turning to FIG. 5C, an exploded view of another embodiment of cradle 500 is shown. In the example embodiment cradle latch 1360 locks with latch support 1362 and wires 1350.

Figure 5D:
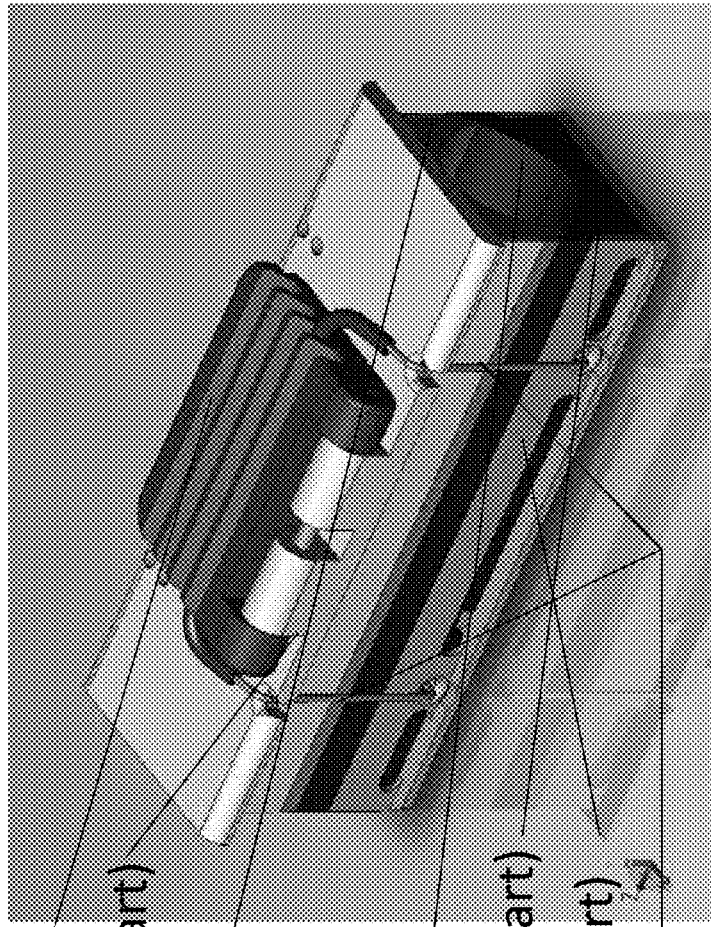
Figure 5E:
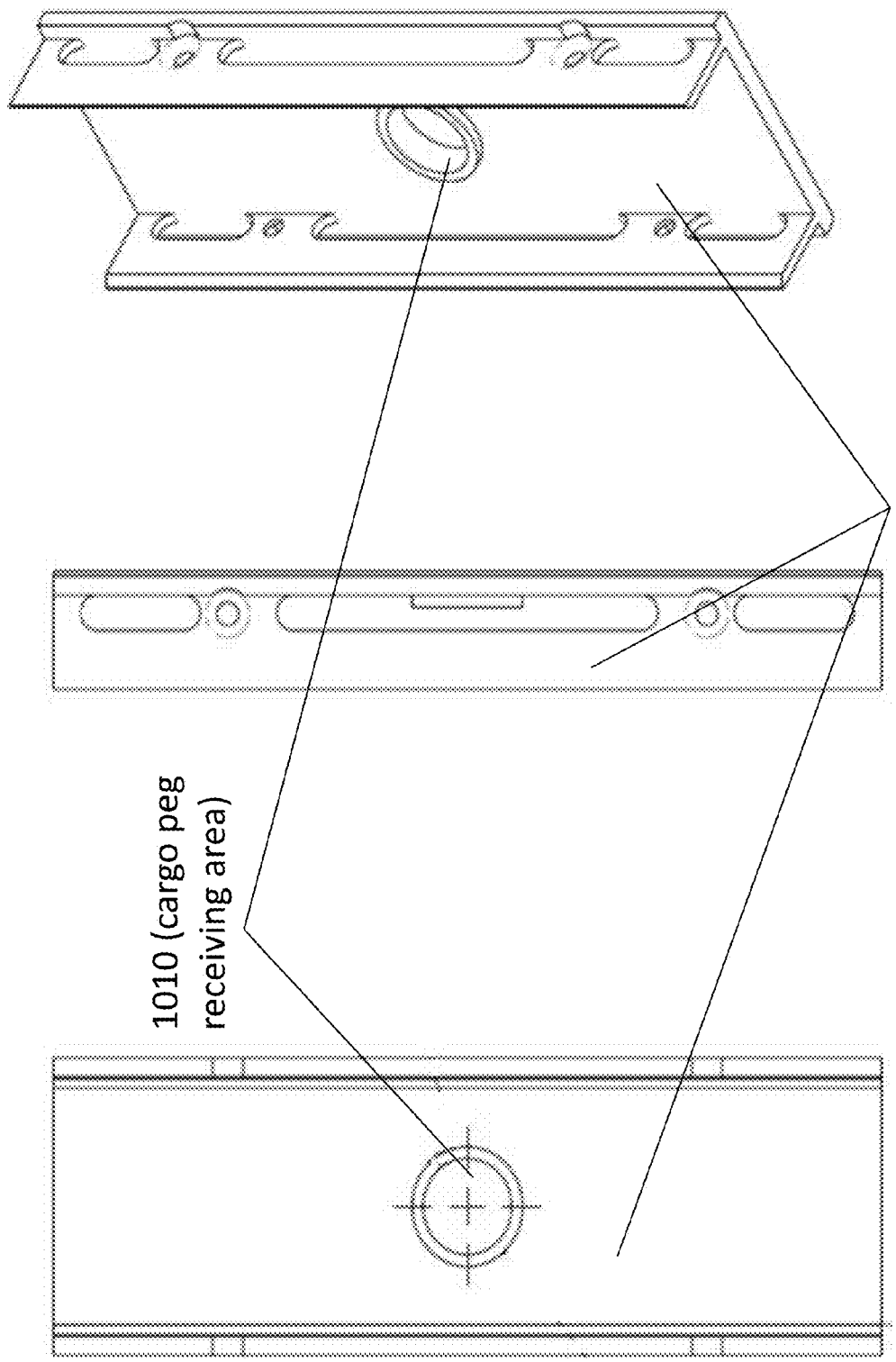
FIGS. 5E-F are component views of the upper and lower portions of cradle device in accordance with the present invention.

Turning to FIG. 5D, an example embodiment of cradle 500 is shown with a cradle latch 1360 that faces upward while in a locked position.

Turning to FIG. 5E, lower support part 1340 of cradle device 500 is shown from different angles.

Figure 5F:
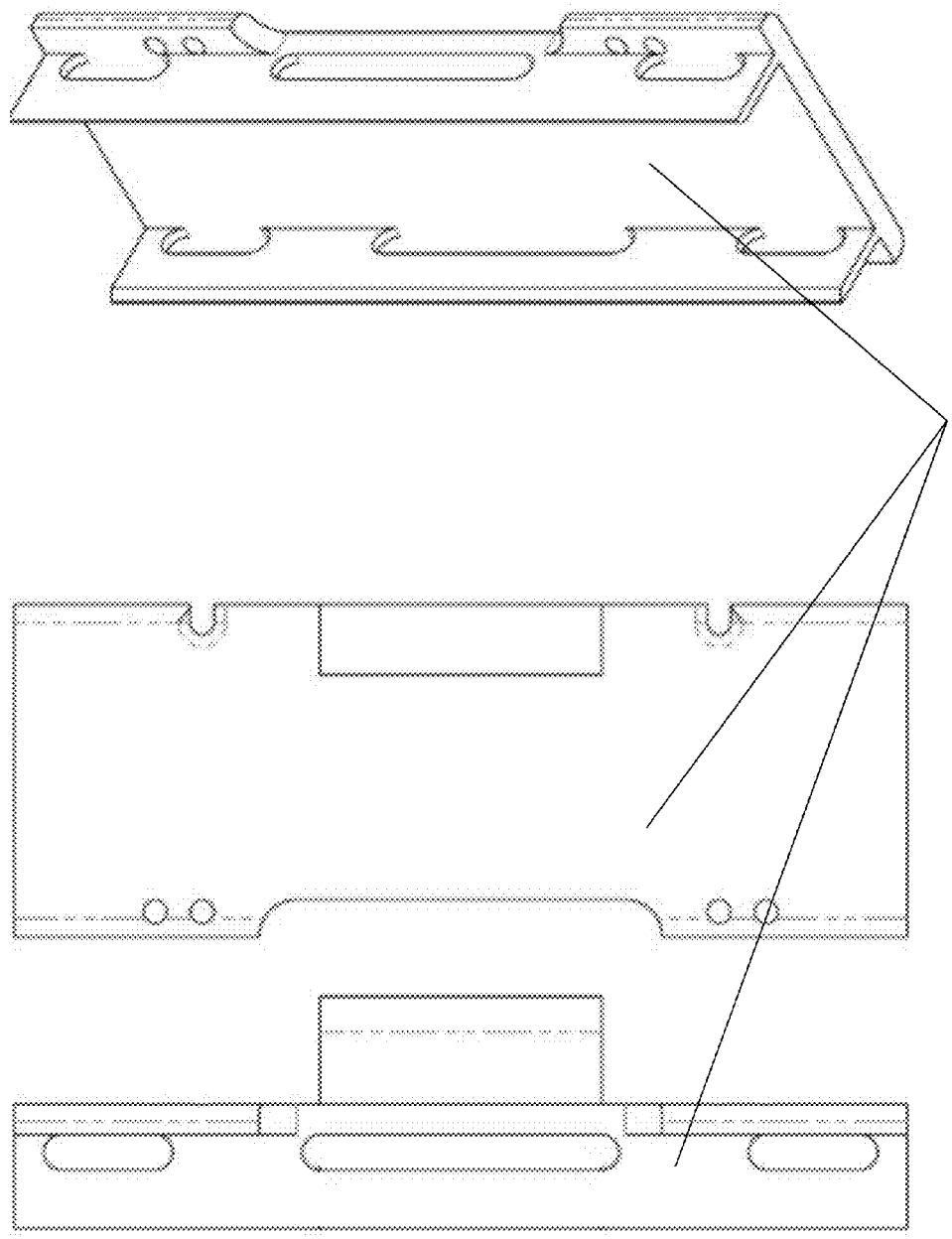

Turning to FIG. 5F, upper support part 1310 of cradle device 500 is shown from different angles Turning to FIG. 5G, an additional embodiment of a transitional carrier bar is shown partially disassembled. Cradle device 500s are capable of being inserted into slots and secured with cradle securing screw 531s screwed into cradle securing peg 501s.

Figure 5H:
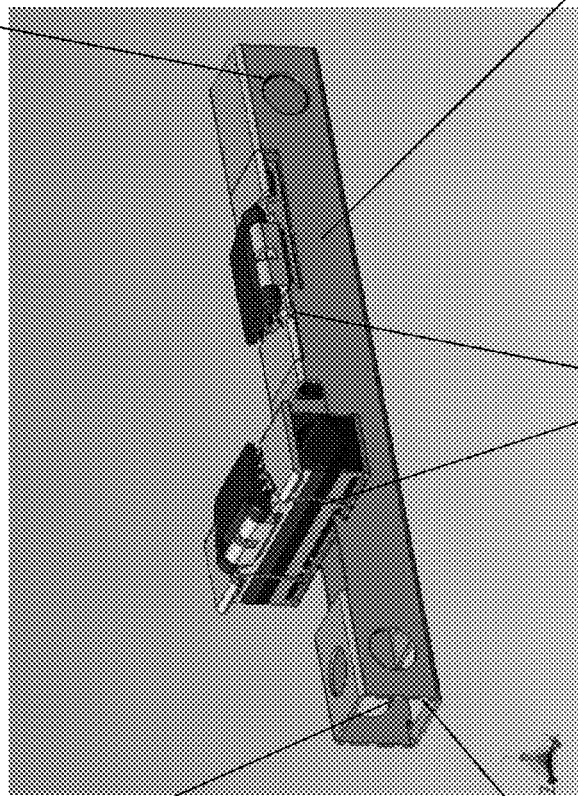
Figure 51:
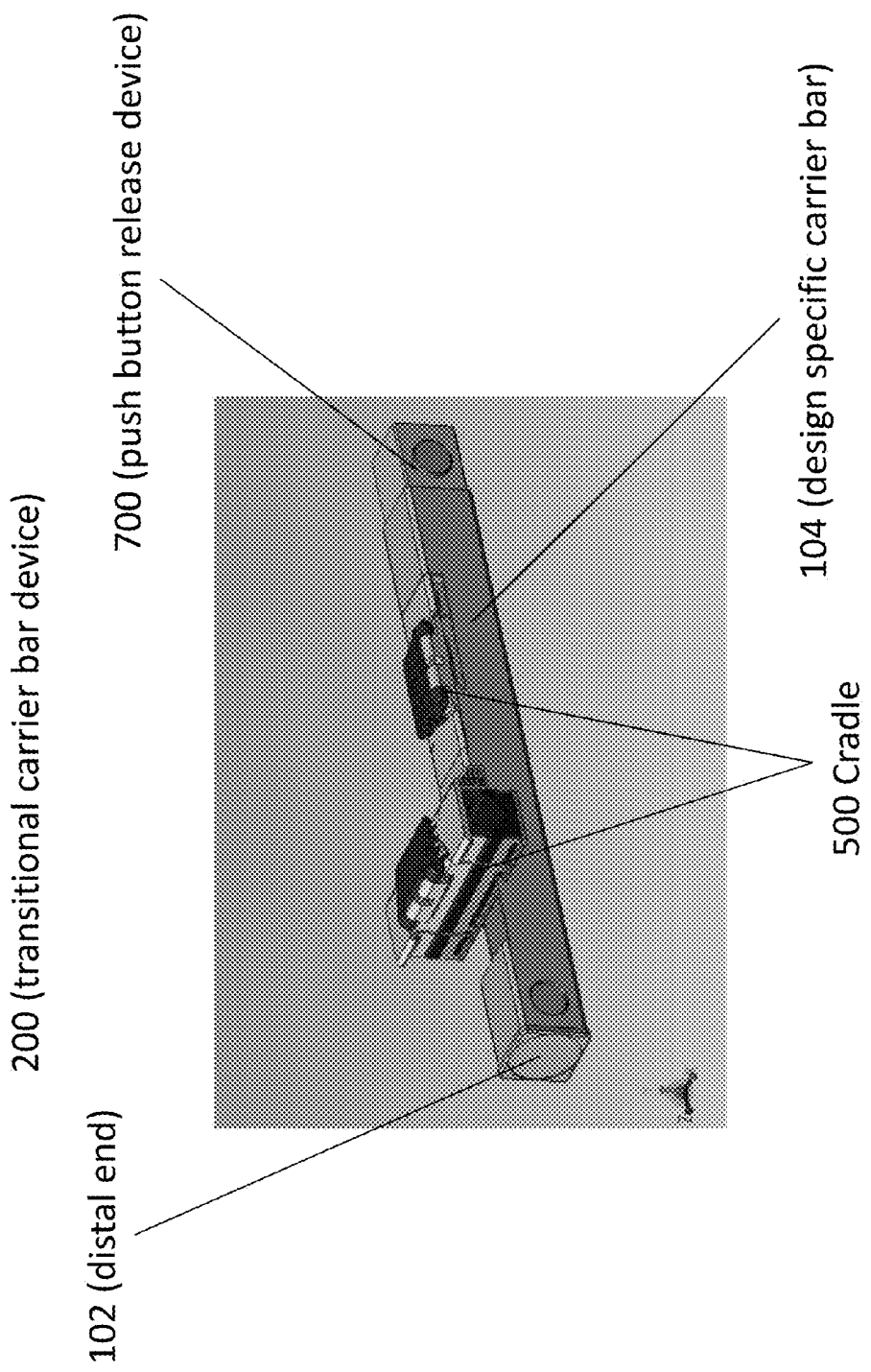

Turning to FIG. 5H, a further embodiment of design specific bar 104 with attached cradle 500 is shown with a female type proximal attachment end and an open distal end which may allow for attachment of a second design specific bar 104.

Turning to FIG. 5I, a further embodiment of design specific bar 104 with a male type push button assembly 700 attached to proximal end is shown.

Turning to FIG. 5J, an alternate perspective of FIG. 5C is shown with see-through walls to show the interior of design specific bar 104.

Figure 5K:
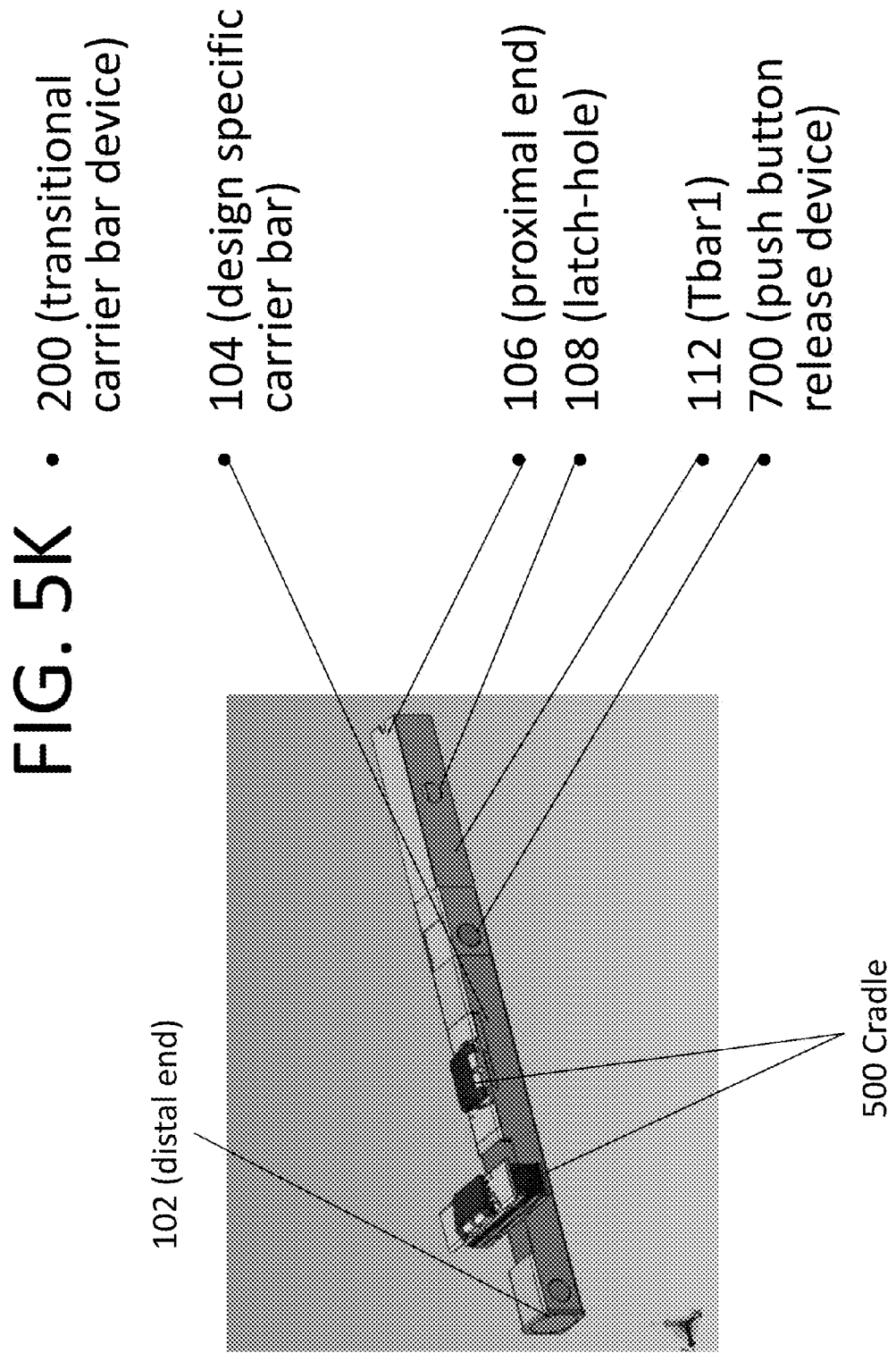

Turning to FIG. 5K, a design specific bar 104 attached to another segment is shown.

Turning to FIG. 5L, a design specific bar 104 attached to another segment is shown in an angular configuration.

Turning to FIGS. 6A-G, views of other embodiments of a cradle device in accordance with the present invention are shown.

In the embodiments shown cradle device 600 operates with two parallel cradle straps 601 attached to cradle base 603 rather than upper support part 1310, upper engaging part 1320, cradle latch 1360, and wire 1350 as in FIGS. 5A-E. Also provided are strap peg 605's which allow for straps to be engaged and securely held in place, even when cargo is being carried.

As shown in FIG. 6A, cradle strap 601's may be folded when not in use to a compact shape in order to accommodate easier storage. Additionally, cradle base 603 may be swiveled on cradle support 607 and locked in a perpendicular or parallel configuration. Parallel being used for storage and perpendicular being used for support.

FIG. 6B shows cradle device 600 in a carrying configuration.

FIGS. 6C and 6D show alternative carrying configurations of cradle device 600 that may be used for carrying particular cargo. In these instances a regular "Z" or extended "Z" configuration are shown.

FIG. 6E shows an exploded view of a cradle device 600, particularly showing attachment and securing members for cradle supports 607. In the example embodiment cradle securing peg 615 may be manufactured as part of cradle support 607 or may be separate. In embodiments where it is separate, it attaches for example using a washer, to cradle support 607. Spring 619's are also provided in some embodiments to provide different mechanical properties.

When moving from a perpendicular to parallel configuration as described above, Dten pegs 611 lock cradle 600 into place (as carrying or storing configurations respectively).

Turning to FIG. 7A, a push button release device 700 is provided in order to allow easy engagement between carrier bar members 1140 such as between Tbar 1 112, Tbar 2 110, Design specific bar 104, or others. Push button release device 700 in the example embodiment is shown as having push buttons 702 and 704 on either side of push button release device 700. When push buttons 702 and 704 are pushed together, spring 1120 is depressed and engagement pegs 1130 and 1132 are moved into a disengaged configuration. Engaged configuration exists in the example embodiment when engagement pegs 1130, 1132 are under normal outward pressure from spring 1120 when push buttons 702, 704 are not engaged. A corresponding passive or active structure, not shown in the FIG. 7A engages with engagement pegs 1130, 1132 to hold carrier bar members 1140 locked in place.

In other embodiments, a key locking mechanism is used to lock carrier bar members 1140 in place and prevent the buttons 702, 704 from being engaged and unlocking the spring 1120. A key locking mechanism of this type may reside within carrier bar members 1140 and may be exposed when needed by exiting the front, rear, or sides of the carrier bar.

FIG. 7B is a view of another embodiment of a push button release device in accordance with the present invention.

FIG. 7B shows a push button plug 701 for insertion into the ends of members of transitional carrier bar.

In embodiments using push buttons, the buttons may be angular so that they only have to be pushed to release (and not to engage). This eases in initial engagement when a user may be lifting and supporting cargo or transitional bars.

Turning to FIG. 8, a cargo-peg securing location 1000 is provided in order to secure cargo with a fixed cargo-peg (not shown). Fixed cargo-peg is attached to cargo by welding, fusing, clamping, or other attachment method. In the example embodiment fixed cargo-peg is attached at the center of gravity of cargo. Fixed cargo-peg is constructed at a standardized size. In the example embodiment, fixed cargo peg is a peg of cylindrical dimensions however alternate dimensions may be used including rectangular peg, square peg, octagonal peg, other polygonal, conical peg, or others. Additionally, fixed cargo peg may also have pass-throughs, holes, notches or secondary pegs so as to provide additional securing structure, compatible with cargo-peg securing location 1000. Multiple cargo-pegs may be used in some embodiments.

Cargo-peg securing location 1000 is compatible with standard size fixed cargo-peg so as to receive fixed cargo-peg and secure it in a fixed position. Securing in a fixed position means fixed cargo-peg would not be able to easily rotate once securing position is engaged. In the example embodiment cargo-peg securing location has a cylindrical dimensioned cargo-peg receiving area 1010 but this may alternately be rectangular, square, octagonal, other polygonal conical, or others as appropriate to be compatible with cargo-peg.

Cargo-peg receiving area 1010 fits snugly around cargo-peg and prevents movement of cargo-peg by rotations, lateral movements, and/or swaying.

Cargo-peg securing location 1000 may also have secondary pegs, pass-throughs, holes, or notches in order to provide additional securing structure. These secondary pegs, pass-throughs, holes, or notches are compatible with cargo-peg which has the corresponding structure for compatibility.

Cargo-peg securing location 1000 may be located in carrier rack system 1 in different appropriate locations. In some embodiments, cargo-peg securing location 1000 and cargo peg receiving area 1010 would be located in cradle 500 and/or cradle device 500.

Figure 9B:
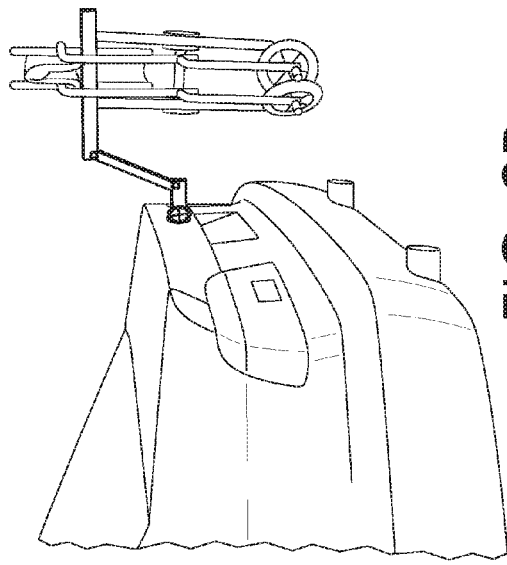
FIGS. 9A-C are views of a wheelchair support extension in accordance with the present invention when attached to a motor vehicle and supporting a wheelchair.
Figure 9C:
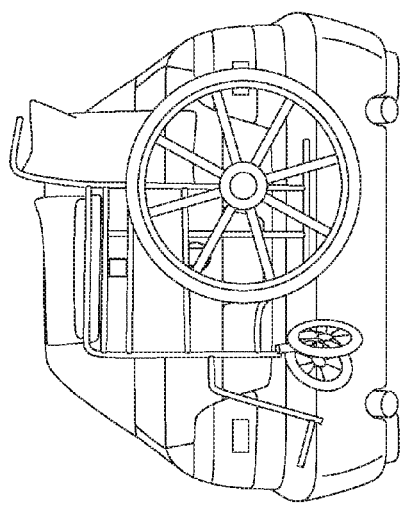
Figure 9A:
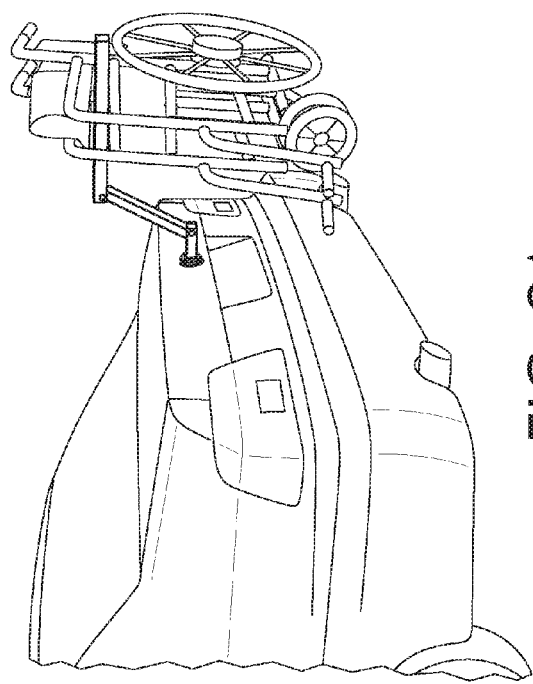

FIGS. 9A-C are views of a wheelchair support extension in accordance with the present invention when attached to a motor vehicle and supporting a wheelchair.

FIGS. 9D-E are views of wheelchair support extension embodiments in accordance with the present invention.

FIGS. 9D-E show wheelchair specific design bar 901 with hole support 903, locking latch 905, and hinge 907 which provides an axis of rotation for upper member 909 to rotate open around. As shown in FIGS. 9A-C, wheelchair arms may be held in hole support 903s when a wheelchair is folded up for transportation.

Figure 10A:
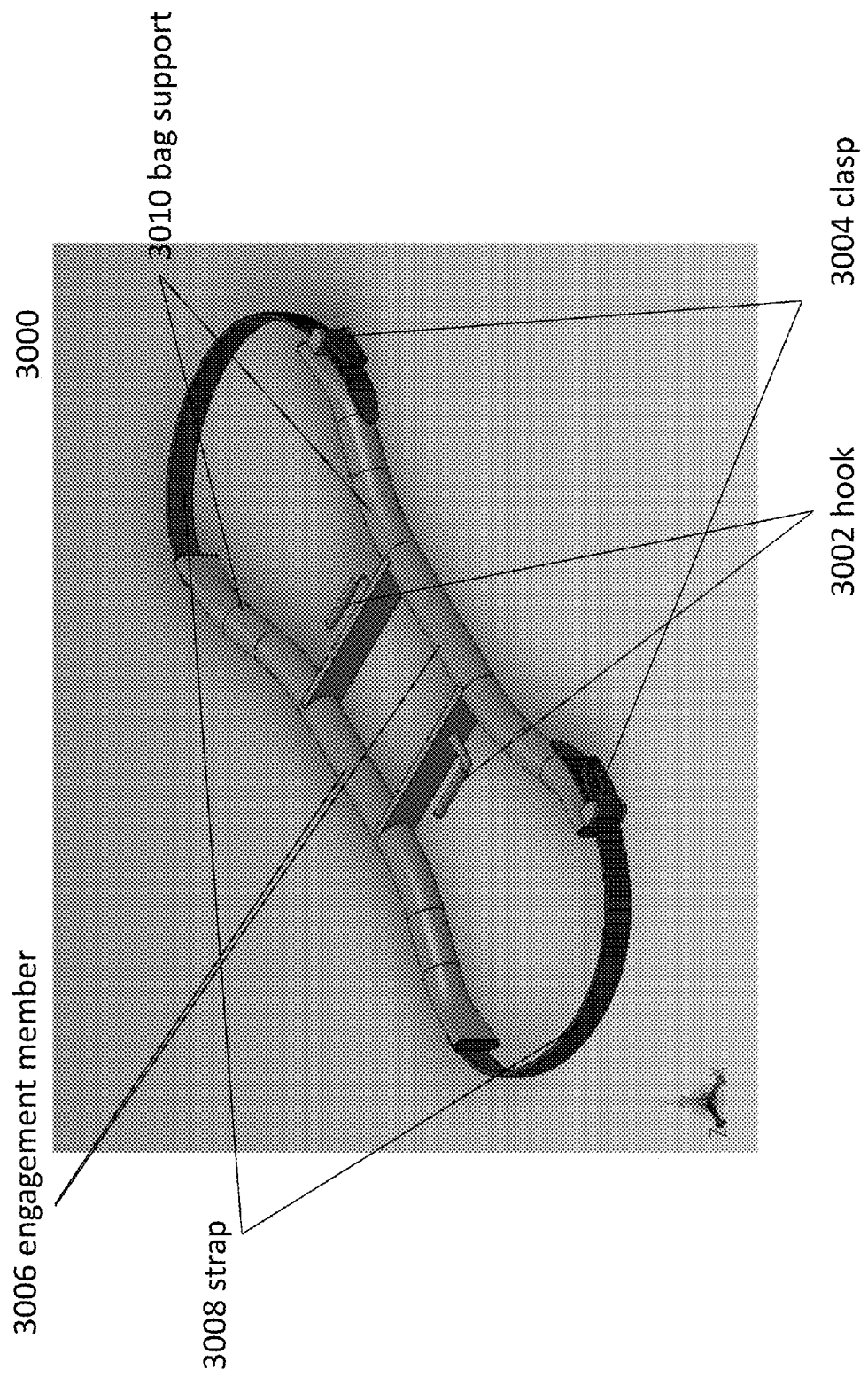
FIG. 10A is a view of a golf bag support device in accordance with the present invention.

Turning to FIG. 10A, a view of a golf bag support device in accordance with the present invention is shown.

Golf bag support device 3000 in the example embodiment shown is made generally of engagement members 3006, bag support 3010, straps 3008, hooks 3002, and clasps 3004.

Engagement members 3006 are generally made so as to be conveniently supported by cradle 500's, especially in a dual cradle 500 setup where the cradles are generally about 5.5" apart.

Bag support 3010 is generally a "V" or "U" shaped band of metal that supports the bag about six inches below its top.

Hook 3002 is located within bag support 3010 in the example embodiment and aids in supporting and immobilizing the bag in a position so as to engage strap 3008 around the bag.

In general, a golf bag (not shown) is made of a fairly soft, textile material. In some cases the top few inches of a golf bag are reinforced by hard plastic. In many cases golf bags have handles for carrying a side of the bag. Golf bag support device 3000 is designed so that a golf bag handle may be placed on hook 3002. In some cases the bottom of the hard plastic reinforcement may rest directly on bag support 3010. Strap 3008 is then wrapped around the soft textile portion of the bag and secured by clasp 3004 on the other side of the bag. In some embodiments clasp 3004 may be a ratcheting clasp that secures indentations of strap 3008.

In some embodiments vertical stabilizing bars (not shown) may extend or swing down from a transitional carrier bar device in order to help further immobilize a golf bag.

Golf bag support device 3000 generally holds the golf bag around two and a half feet from the bottom of the bag so that the bottom of the golf bag is held around one and a half feet above the ground to give clearance. In some embodiments additional golf bag support device 3000's may be attached at the end of an initial golf bag support device 3000.

In some embodiments of the invention soft and hard golf bags may be retrofitted or manufactured with dedicated connecting systems to interface with a transitional bar device. These manufactures or retrofits may in some embodiments involve modifying the structurally strong upper part of a soft golf bag so that connection with a transitional carrier bar device is simplistic with a hook, peg-in-hole, or other simplistic mechanism. The receiving or grasping mechanism on the transitional carrier bar device that matches the one on the golf bag may be in any appropriate location including the sides or rear of a design specific carrier bar.

Typical golf bags with golf clubs inside weigh between twenty and forty pounds.

In some embodiments the handle of a golf bag may be manufactured or retrofitted with a hinge joint at the top of the handle that swings to ninety degrees and may be held in a cradle or otherwise grasped and supported by a transitional carrier bar device.

Figure 10B:
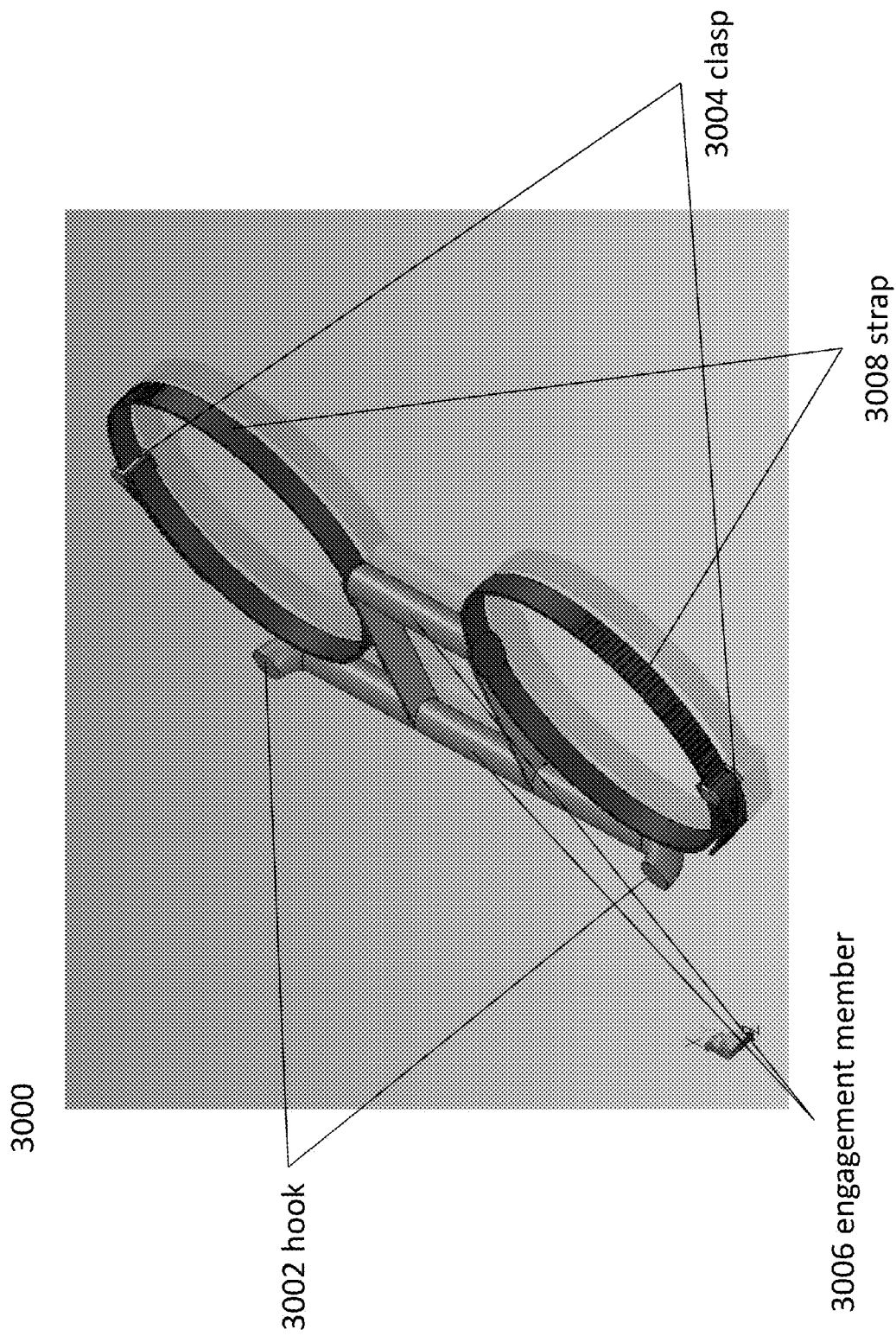
FIGS. 10B-C are views of another embodiment of a golf bag support device in accordance with the present invention with different dimensions and holding hooks.
Figure 10C:
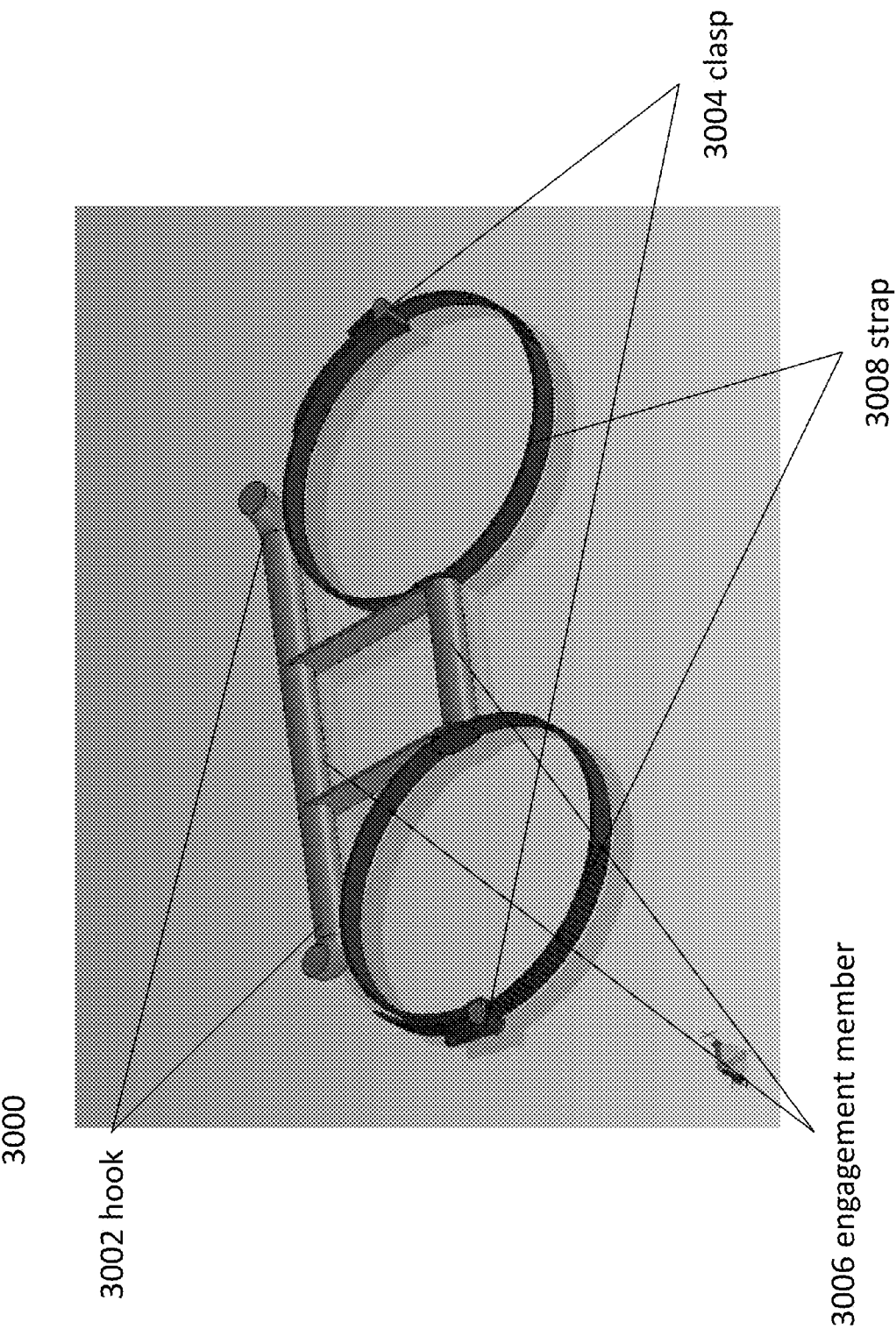

FIGS. 10B-C are views of another embodiment of a golf bag support device in accordance with the present invention with different dimensions and holding hooks.

In FIGS. 10B-C strap 3008 is designed to wrap around the entire golf bag. Hooks 3002 are located outside straps 3008 rather than inside as in the embodiment portrayed in FIG. 10A.

Turning to FIG. 10D, a view of an example embodiment of a golf bag support device in accordance with the present invention is shown.

In FIG. 10D design specific carrier bar 104 is shown as manufactured with engagement members 3006 securely embedded and therefore making a full-time golf bag holder.

FIG. 10E is a view of an example embodiment of a "golf pod"—a combination golf bag support device and storage pod in accordance with the present invention.

In the example embodiment straps 3008 are provided for the top and bottom of a golf bag. Also provided is a storage pod 3204 with a handle 3298 at its top and a collar attached to its skeleton 3299. In the example embodiment storage pod 3204 has clear or see-through walls although in some embodiments they may be opaque. The walls may be made of any appropriate material including PTFE. The walls are held in place by skeleton 3299 which may be made of any appropriate material including plastic, stainless steel, or others. Storage pod in the example embodiment is vertically oriented and rectangular in nature with dimensions of about 5" by 10" by 2'. The storage pod may be used to hold any appropriate golf or other equipment including and not limited to hats, shoes, tees, balls, gloves, and others.

In some embodiments a dedicated design specific bar may include engagement members which are fixed to the design specific bar in any appropriate manner such as welding, screws, brackets, or others.

In some embodiments collar 3208 allows the "golf pod" to be easily removed and stored in a storage location such as a garage or other location. The storage location may have a male member that inserts into the collar and is permanently mounted in the storage location. This provides simplicity and ease in removing and storing all golf related equipment at one time.

In some embodiments the storage pod may have ventilation slots, holes, or other related components. In some embodiments the storage pod may have lids with locking mechanisms that open with a hinge or slide on or off. Locking mechanisms may also be provided in other embodiments at the clasp 3004's or in other locations to secure the golf bag when the owner is away.

Figure 11A:
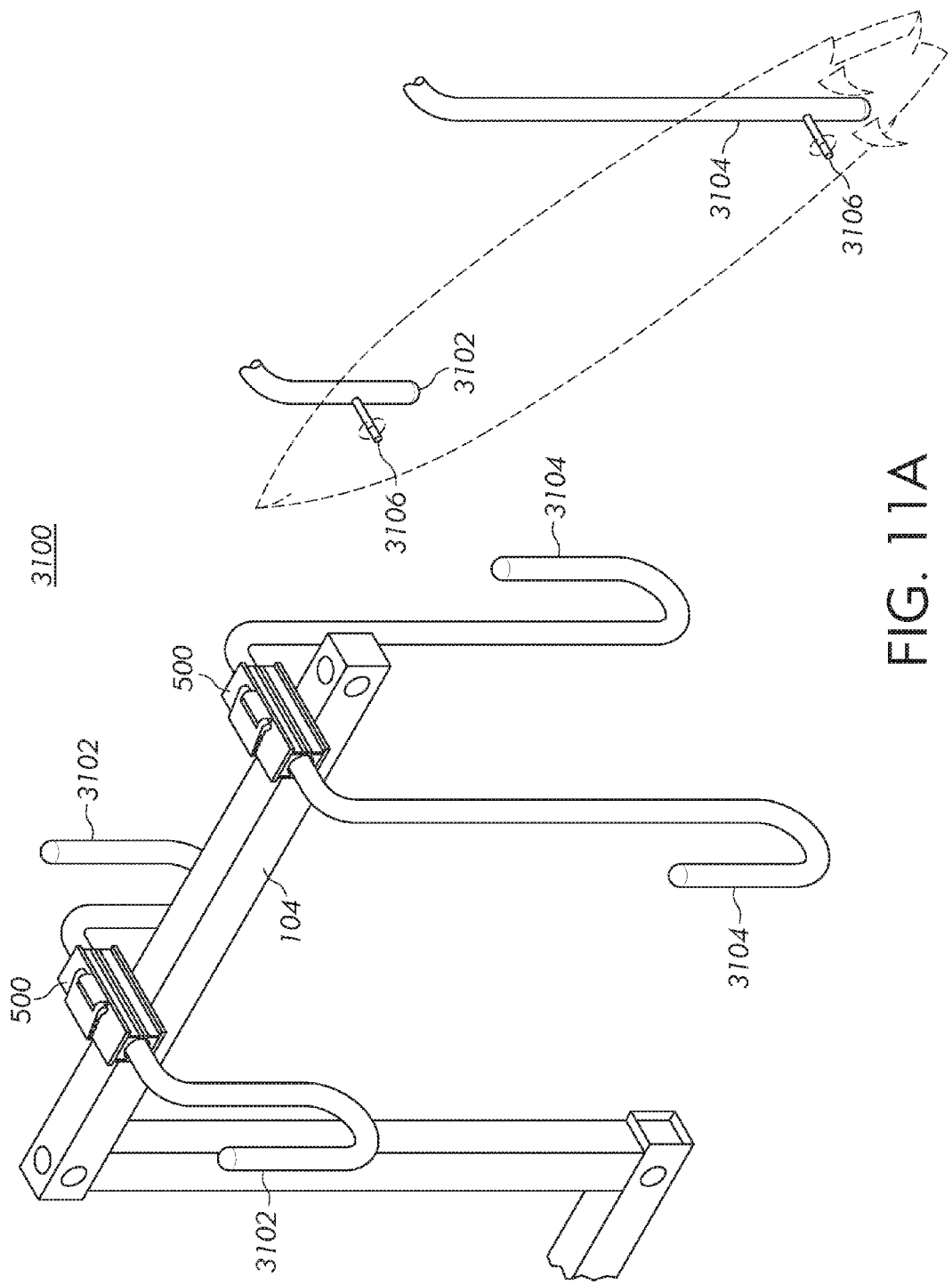
FIGS. 11A-C are views of an example embodiment of a board support device in accordance with the present invention.
Figure 11B:
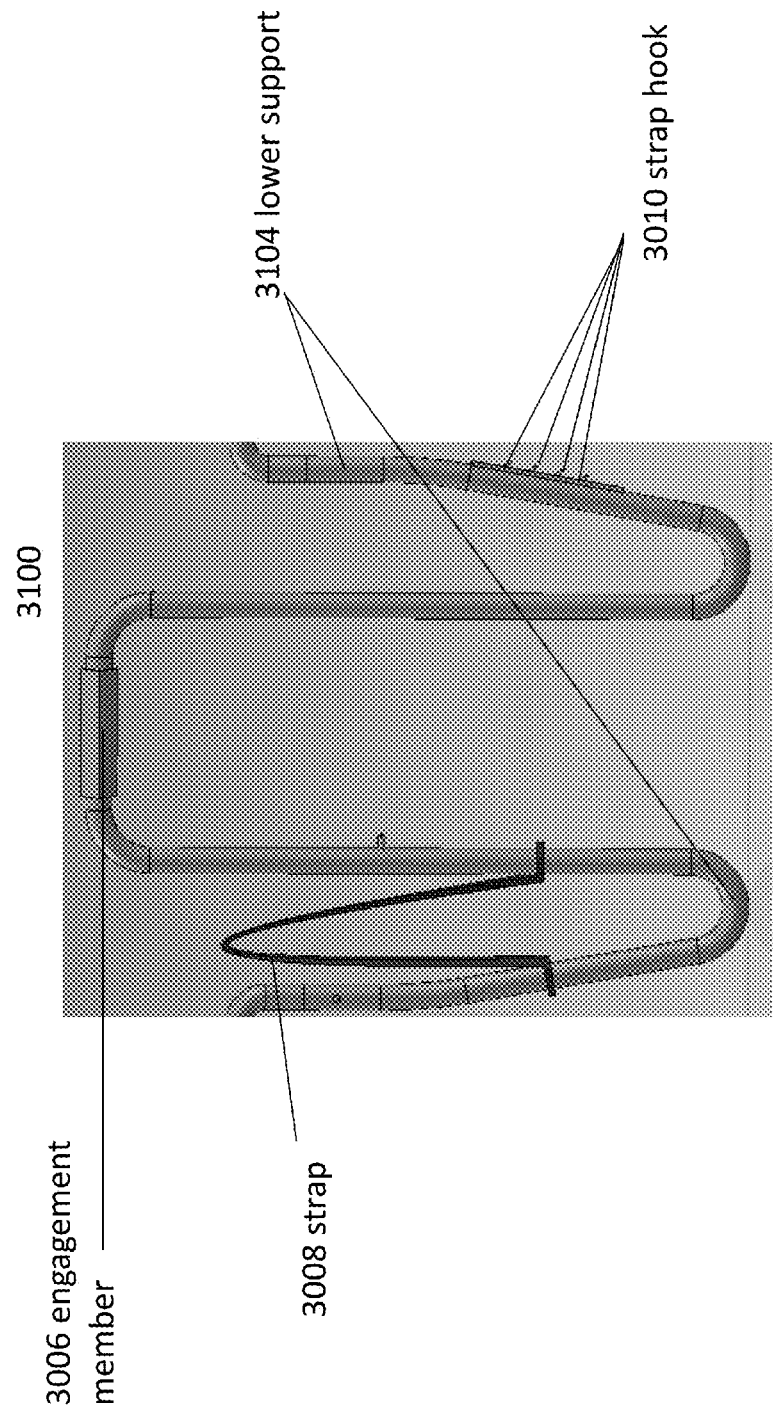
Figure 11C:
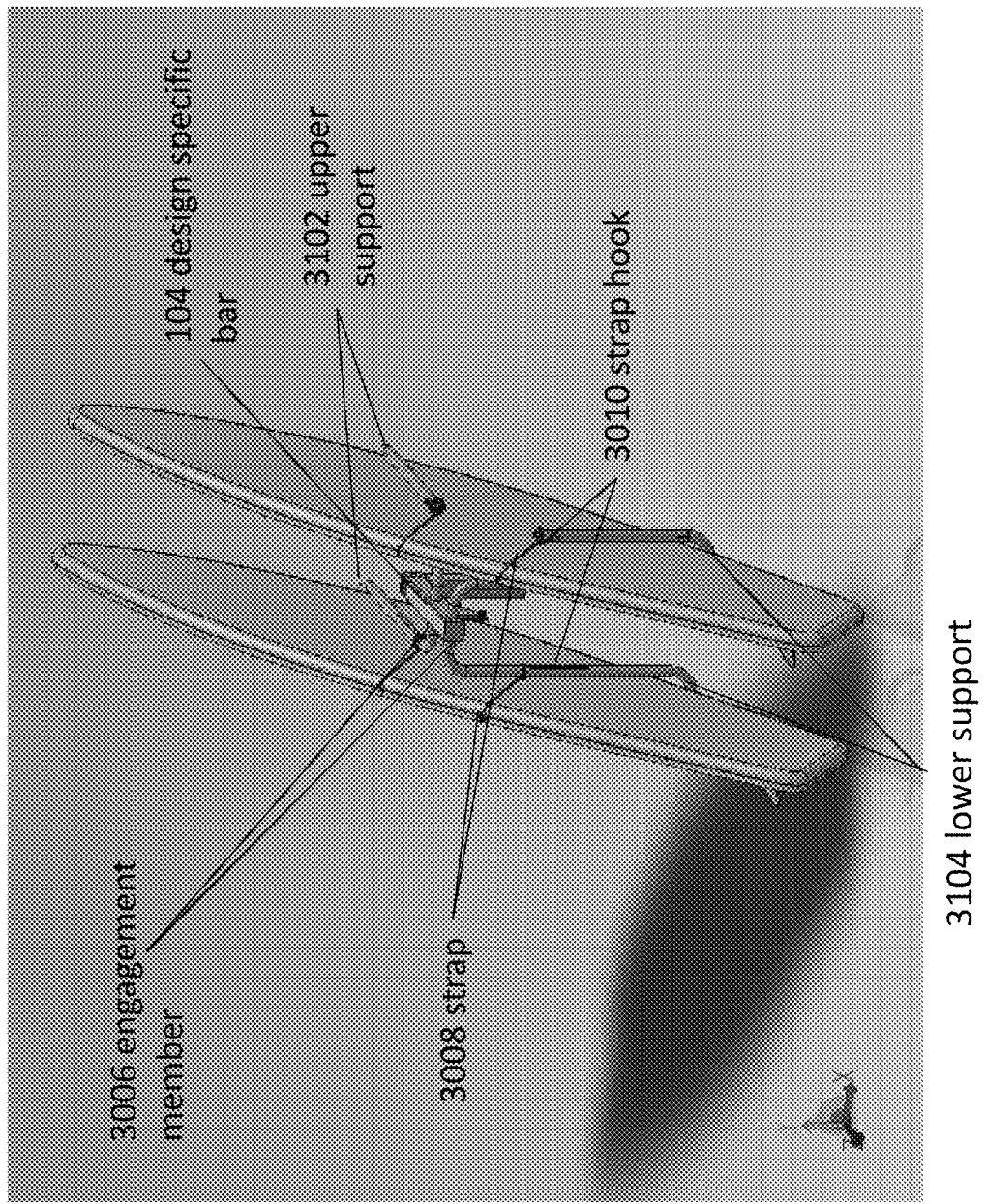

FIGS. 11A-C are views of an example embodiment of a board support device in accordance with the present invention.

FIG. 11A shows a typical embodiment (not to scale) of a beach carrier device for use with the transitional carrier bar devices disclosed herein. In its most basic form, the device is made of upper supports 3102 and lower supports 3104 designed to support surfboards at the rear of a vehicle. Engagement member 3006 locks in to cradle 500 on top of design specific bar 104.

Typical surfboards weigh around seven pounds are contemplated as typical cargo for beach carrier device. Other typical cargo may be surf, wake, boogie and other boards that are less than seven-eight feet long and have widths less than two feet.

Typically upper supports 3102 and lower supports 3104 are tubular members and have a generally "U" or "V" shape. Lower supports 3104 typically descend two feet from engagement member 3006 and may ascend the same distance after curving at the bottom.

In some embodiments upper and lower bars may be rotated about engagement members in order to better support boards. In such embodiments appropriate locations may be fixed by locking upper and lower bars into place using pins or other appropriate means.

In some embodiments support rods in a horizontal or semi-horizontal orientation may be provided in order to engage and lock upper and lower members in place with relation to each other and prevent torsion effects during transportation or movement.

Strap 3008's are provided in addition to numerous strap hook 3010's in order to assist in securing boards to the device. In some embodiments strap 3008 is elastic, in some embodiments it is rubber, in some embodiments it is other appropriate materials. In some embodiments strap 3008 may be particular shaped with boards in mind while in some embodiments it may have no particular board shape in mind.

In some embodiments, in supplemental or replacing strap hook 3010's may be a pointed end on the terminus of upper and lower support or another hooking mechanism to receive and secure strap 3008's. In these embodiments strap 3008 has a hole or holes at the end or along the length of the strap in order to engage the hook or pointed end. The hole or holes may be lined with metal and engage "V" shaped extensions of upper and lower supports in a saw-tooth manner to assist in tightening at different lengths and holding a supported board securely against upper and/or lower support tubing.

In some embodiments extensions may be required for a design specific bar to accommodate longer boards (such as those over seven feet in length) or cars with a high back end.

In some embodiments additional structures are provided such as additional straps with securing ends to provide support and/or stability to surfboard fins.

In some embodiments design specific bar may have integrated engagement member 3006's that are manufactured as part of design specific bars by welding, screwing, clasping, or other securing means.

FIG. 11A also shows an example of a surfboard with holes drilled through it and engagement peg 3106's attached to upper and lower supports and supporting the surfboard at the holes. In this embodiment the holes in the surfboard may be slidably opened or closed or may swing open or closed at a hinge. These holes are operable to be closed when the board is in use and open when transport of the board is necessary. In some embodiments the engagement pegs may be threaded and screwed into the boards. In some embodiments the pegs may extend through the board when the holes are open and a washer ring with a nut or other securing means may hold the board in place. The locking mechanism may be a pin mechanism that is operable to be released by pushing the pins in.

Figure 11D:
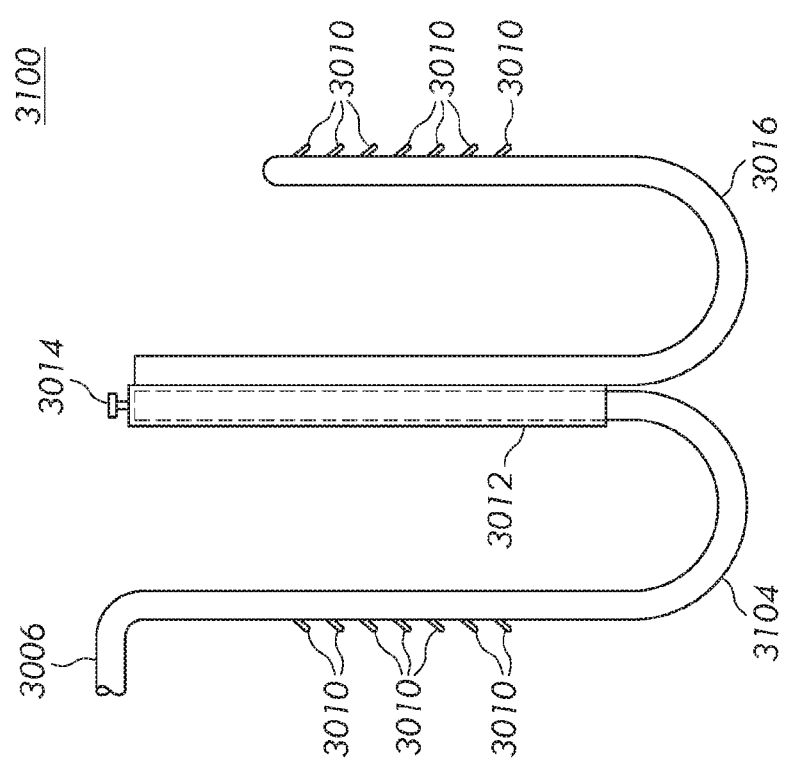
Figure 11E:
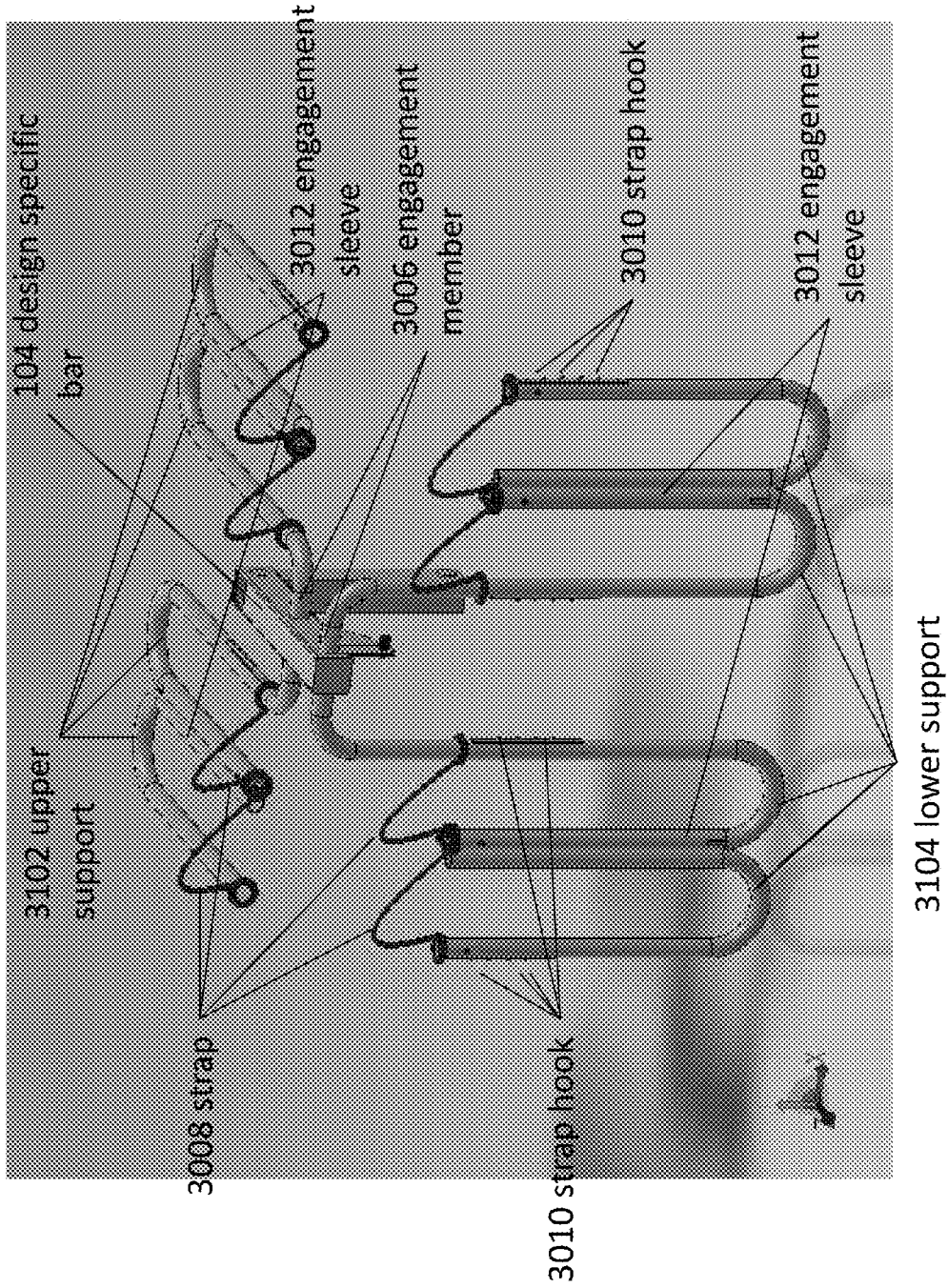

Turning to FIGS. 11D-F, views of example embodiments of board support device expansions in accordance with the present invention are shown.

In the example embodiment lower support 3104 is used as an example and operates and is configured as described above. In addition however, a secondary support 3016 may be attached to lower support 3104 using engagement sleeve 3012. Engagement sleeve 3012 slides over the outer arm of lower support 3104 and snugly secures secondary support 3016. In some embodiments an engagement pin 3014 may be used to further secure the connection.

In some embodiments "tongue-in-groove" notches at the top and bottom of the engagement sleeve and/or lower support extending arm are provided to prevent rotating.

Figure 11G:
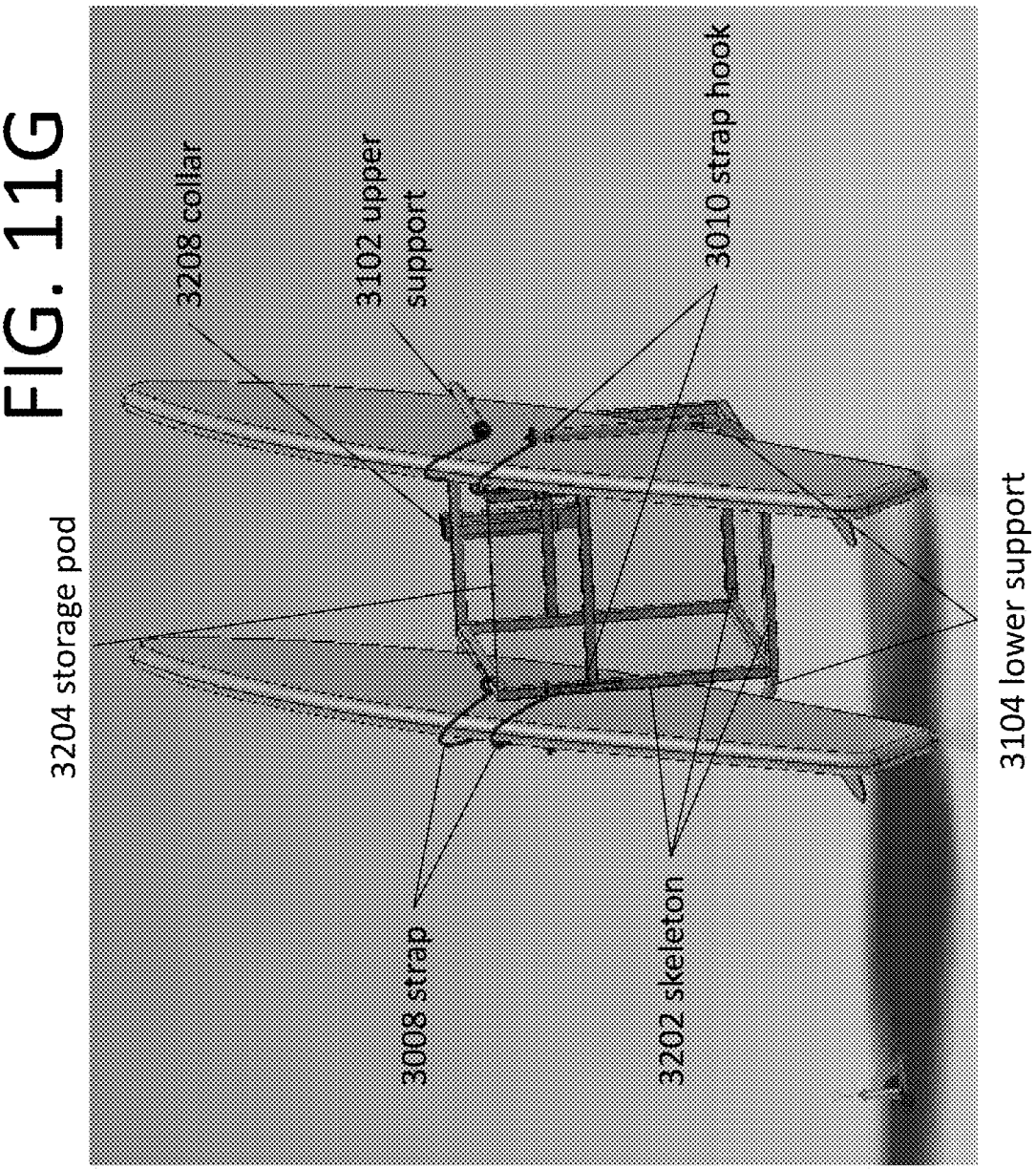
FIG. 11G is a view of an example embodiment of a "surf pod"—a combination board support device and storage pod in accordance with the present invention.

FIG. 11G is a view of an example embodiment of a "surf pod"—a combination board support device and storage pod in accordance with the present invention.

In the example embodiment, similar to the "golf pod" above, storage is provided for beach or other gear. As above, ventilation may be provided in some embodiments. In some embodiments lockable lids may be provided with associated hinges, clasps, and other members.

Figure 11H:
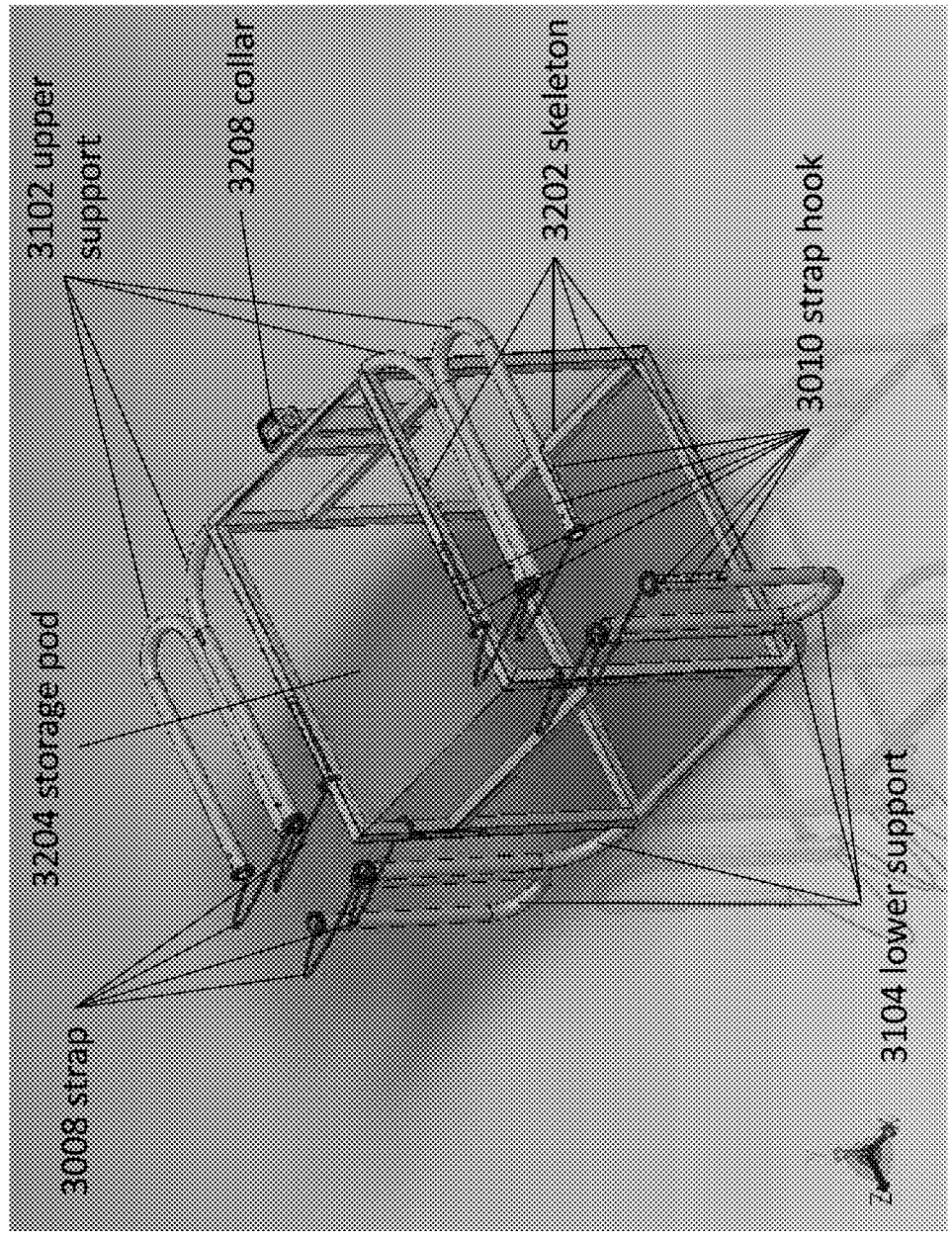
FIGS. 11H-I are views of an example embodiment of a "surf pod"—a combination board support device and storage pod with attached device expansions in accordance with the present invention.
Figure 11I:
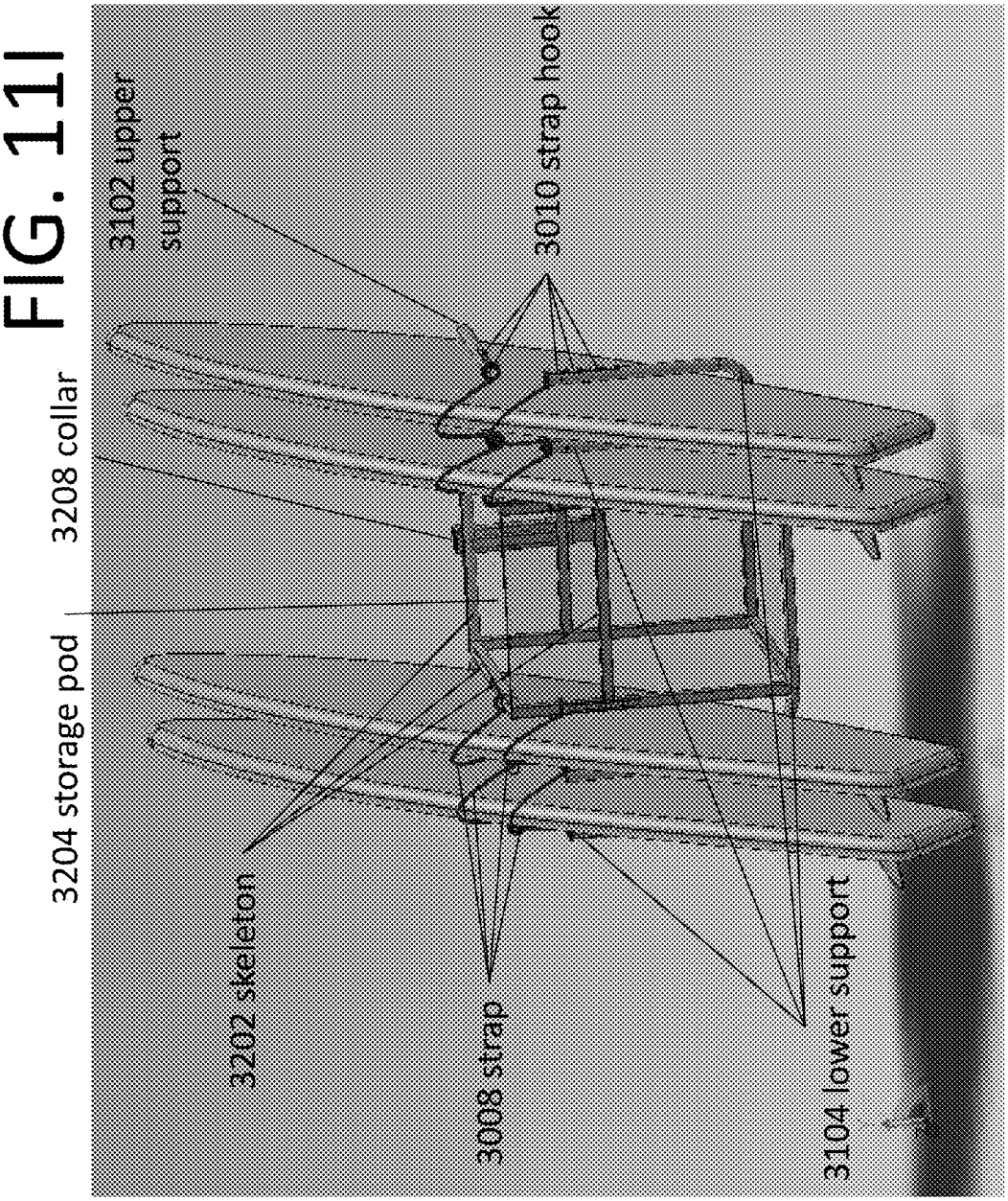

FIGS. 11H-I are views of an example embodiment of a "surf pod"—a combination board support device and storage pod with attached device expansions in accordance with the present invention.

Figure 11J:
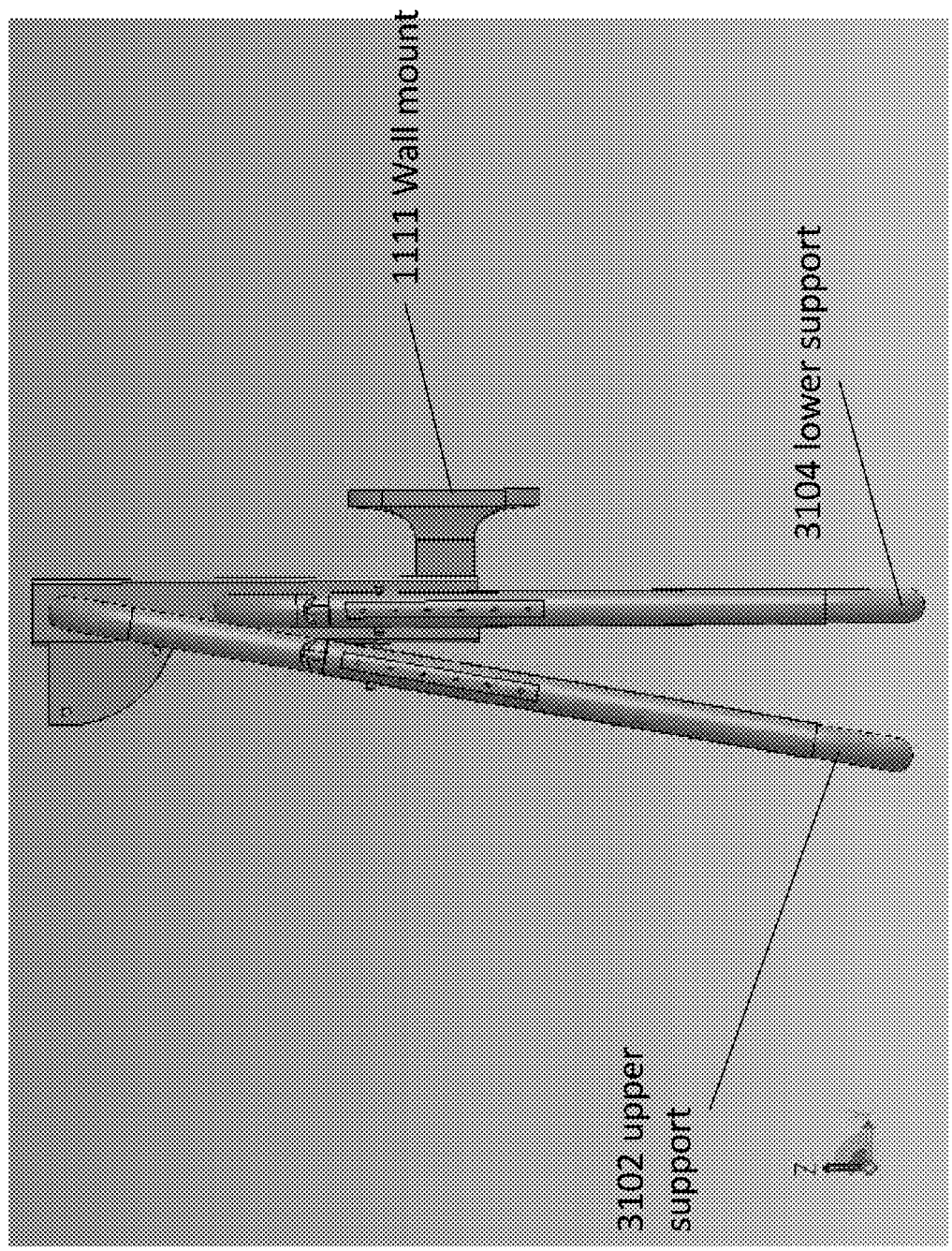
Figure 11K:
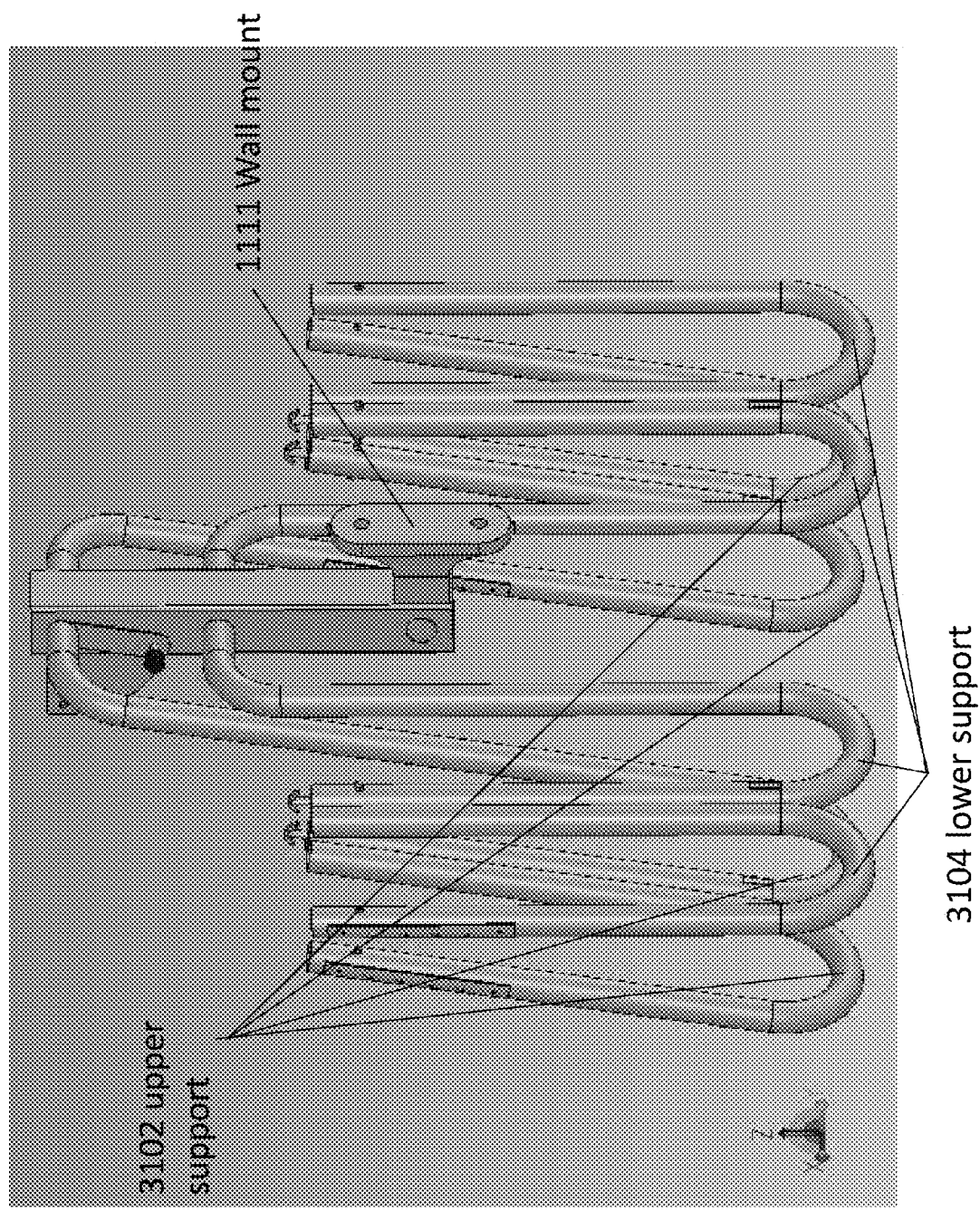

FIG. 11J-L are views of example embodiments of a collapsed surfboard storage device in accordance with the present invention.

In the example embodiments a design specific bar may have the engagement members that may be rotated ninety degrees so that a dedicated beach bar is created. This dedicated beach bar could then be mounted or stored on a wall easily and out of the way. In some embodiments upper and lower bars rotate in one direction, while in some embodiments upper and lower bars may rotate in opposite direction (and lock into place).

Provided in these drawings are wall mount 1111s that may be permanently or semi-permanently attached to a wall and a collar may be used to slide on or off wall mount 1111s.

In some board or "beach pod" embodiments a cradle or portion of the bar may rotate so that a surfboard may be held vertically.

Figure 12A:
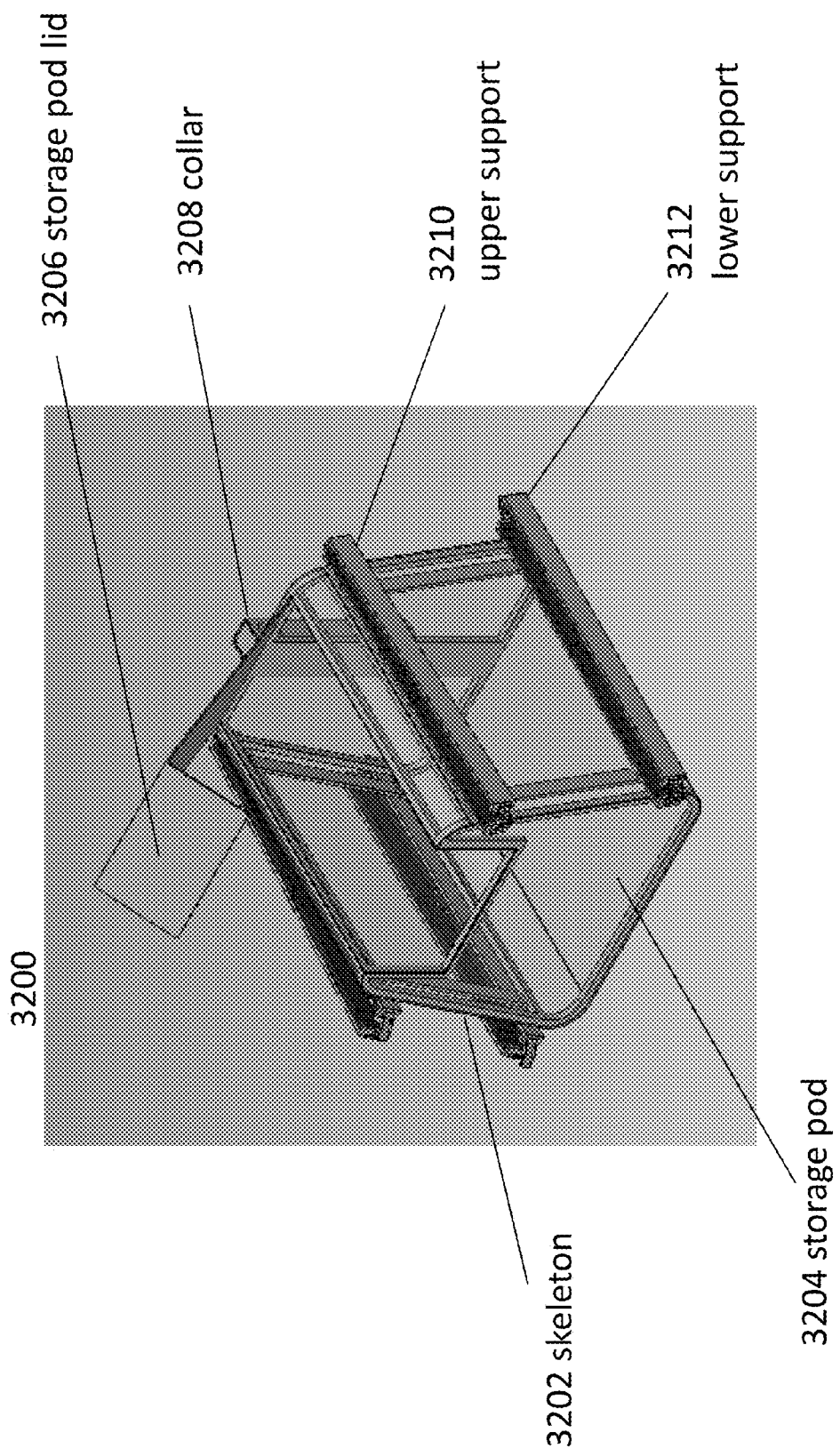
FIGS. 12A-C are views of example embodiments of "snow pods"—combination ski/snowboard support devices and storage pods in accordance with the present invention.
Figure 12B:
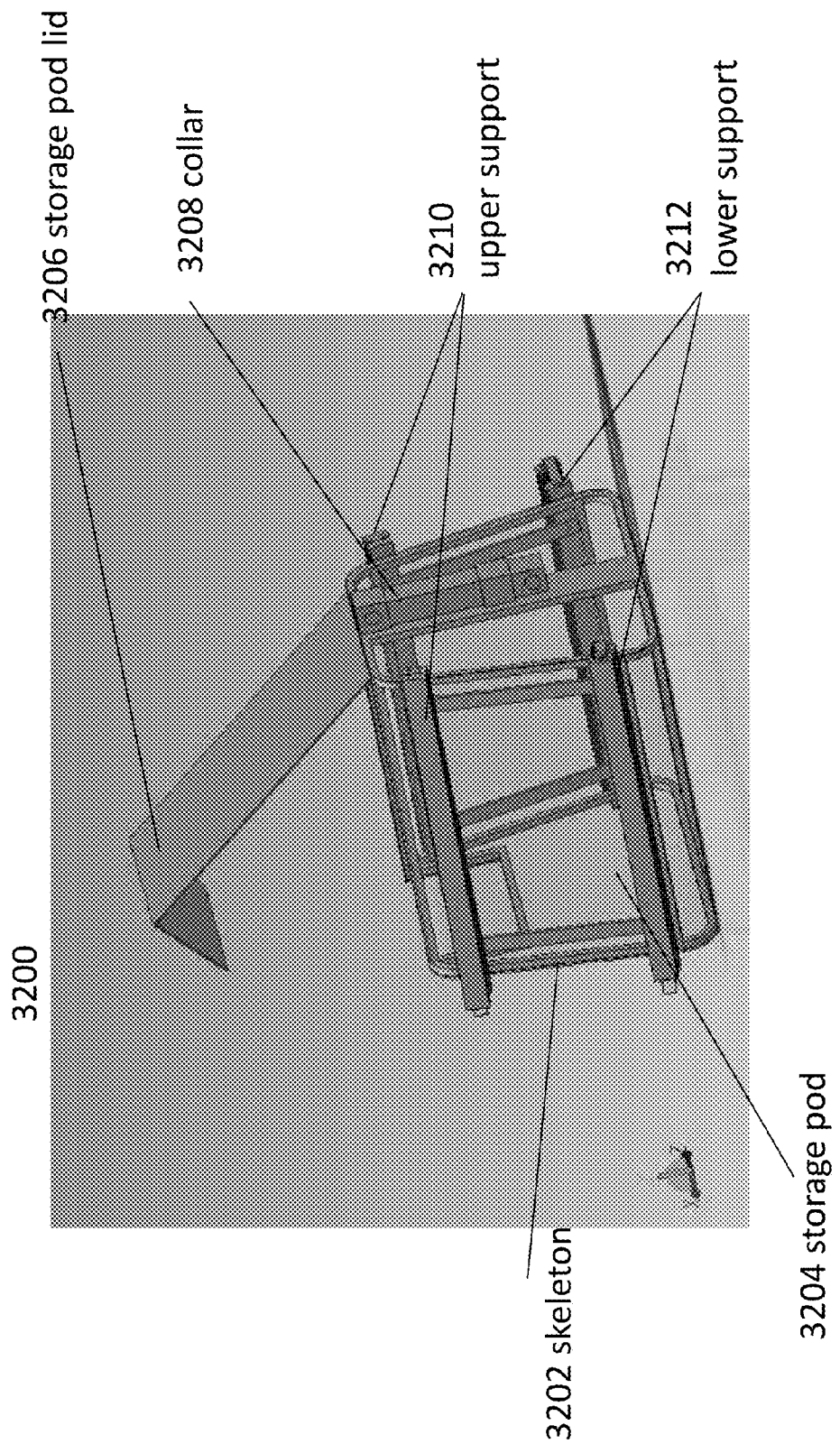
Figure 12C:
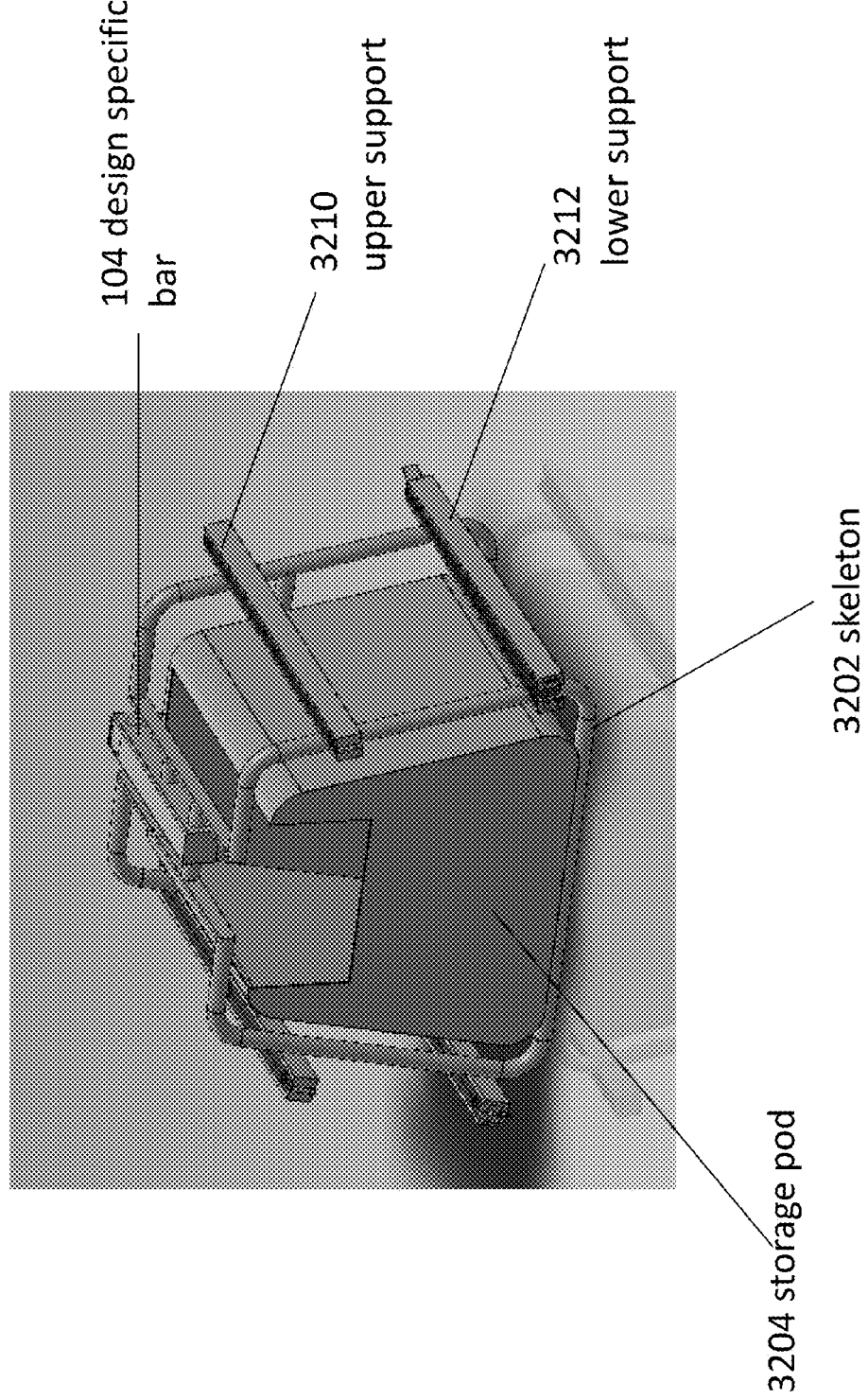
Figure 13A:
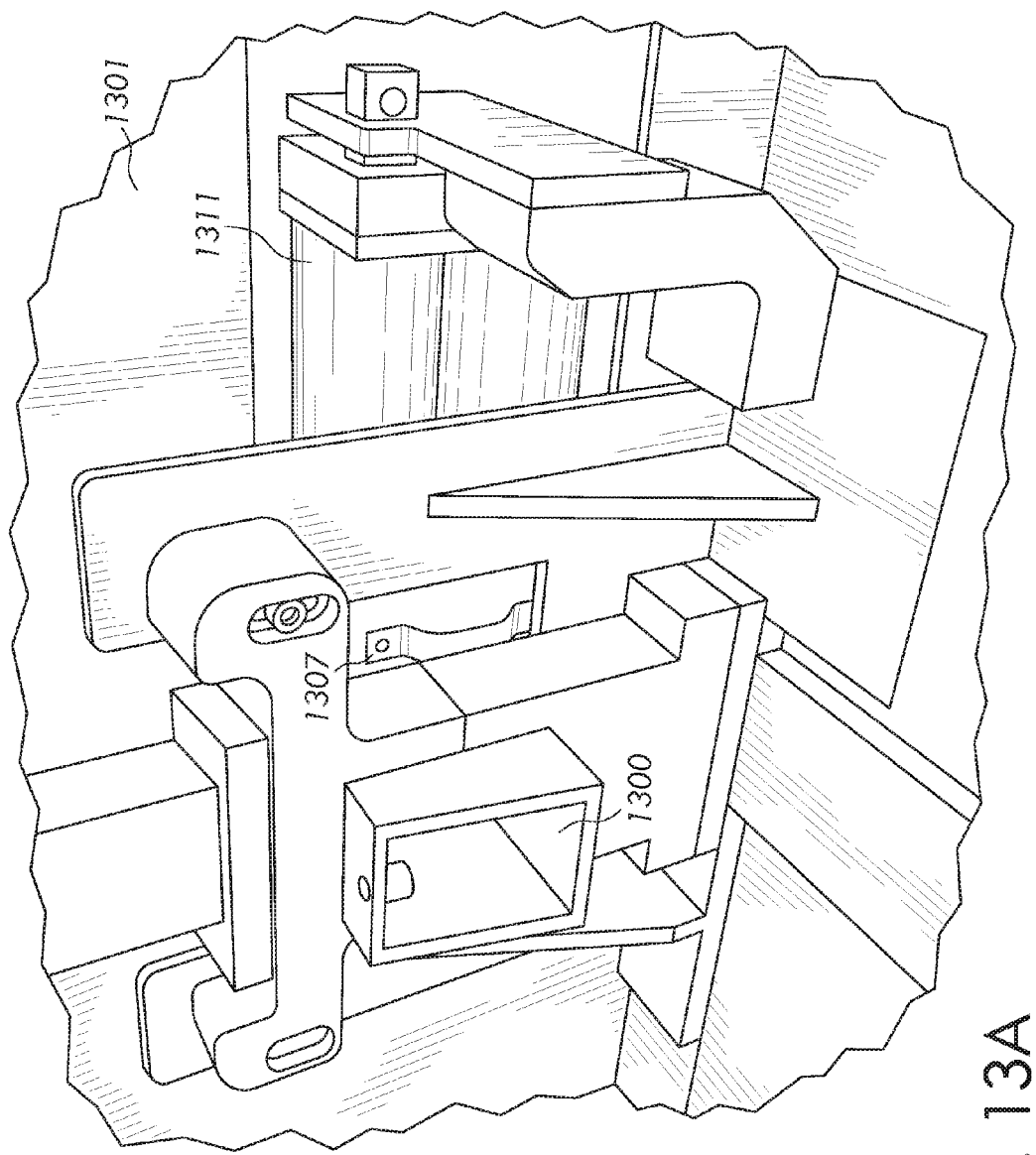
FIG. 13A is an interior view of an exemplary car emblem support device in accordance with the present invention.
Figure 13B:
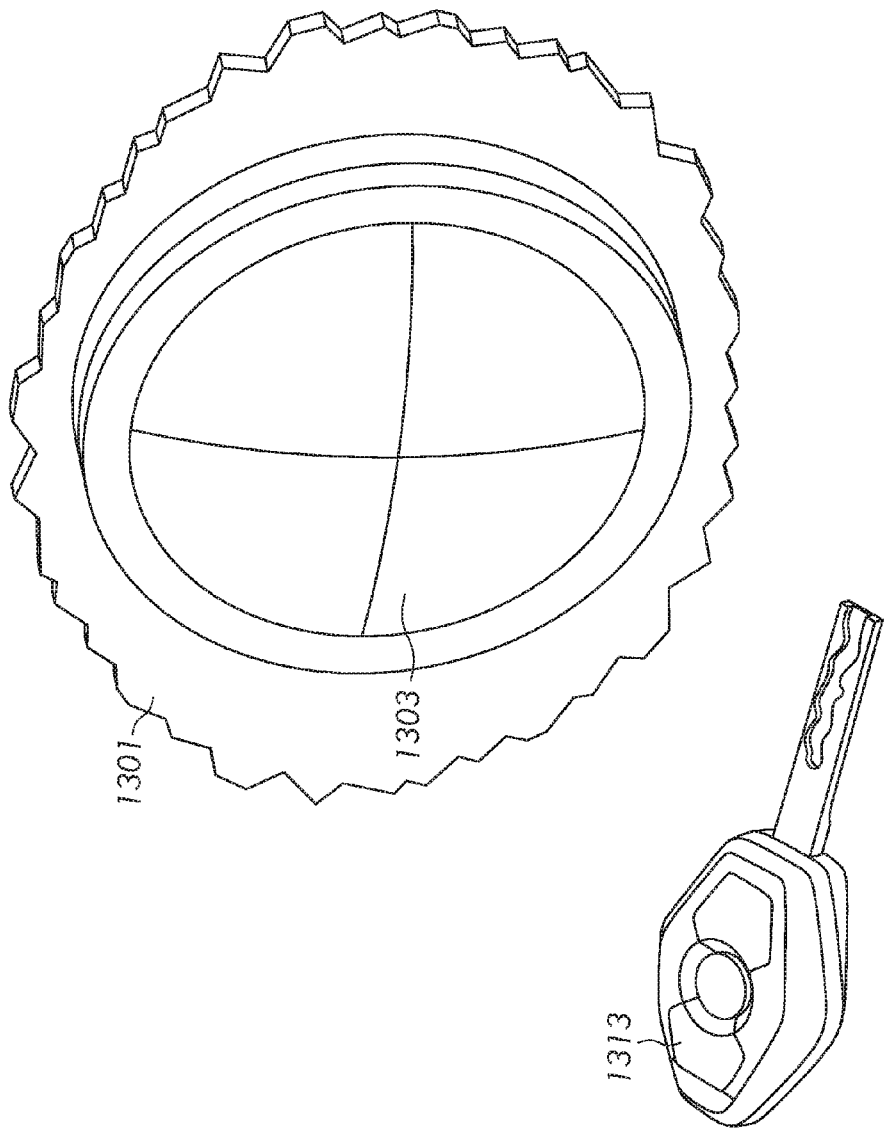
FIGS. 13B-D are exterior views of an exemplary car emblem support device in accordance with the present invention in closed, open and disengaged, and open and engaged configurations respectively.
Figure 13C:
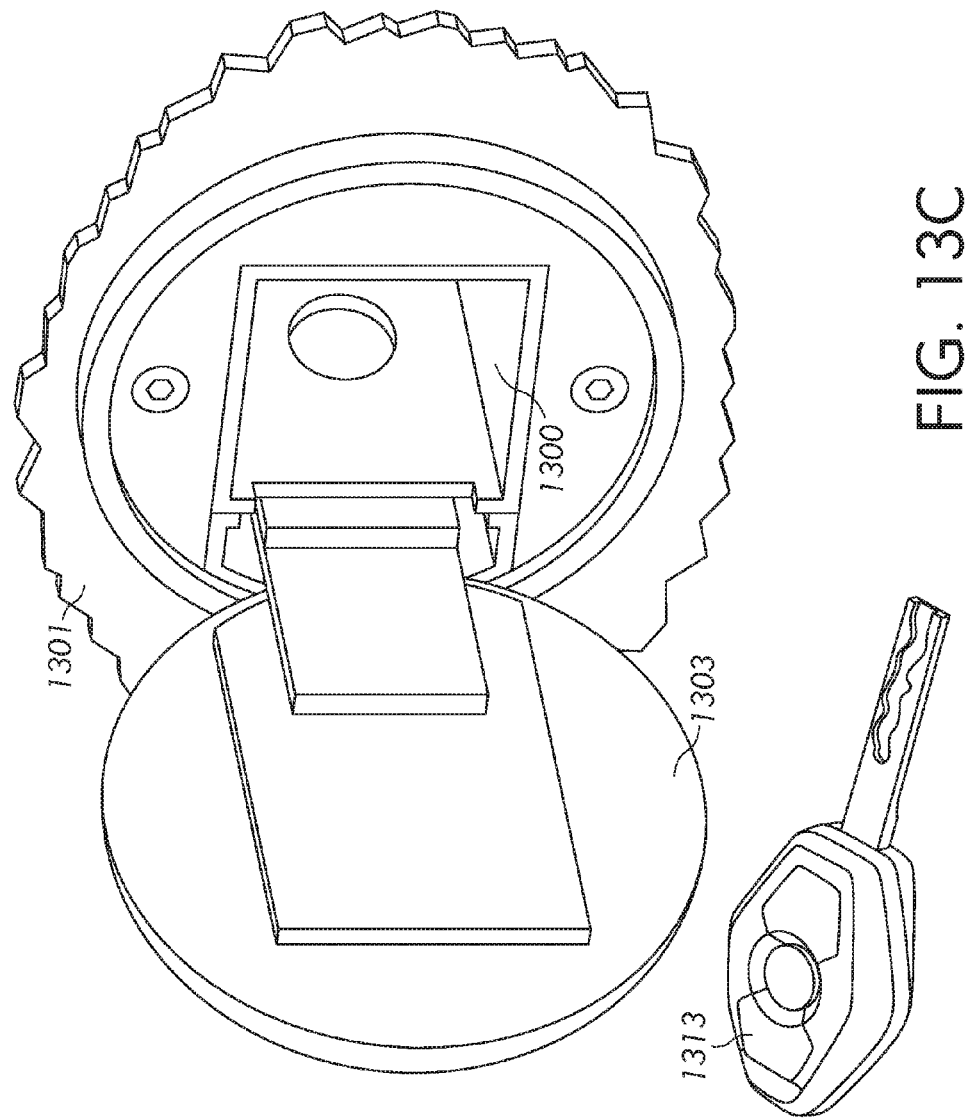
Figure 13D:
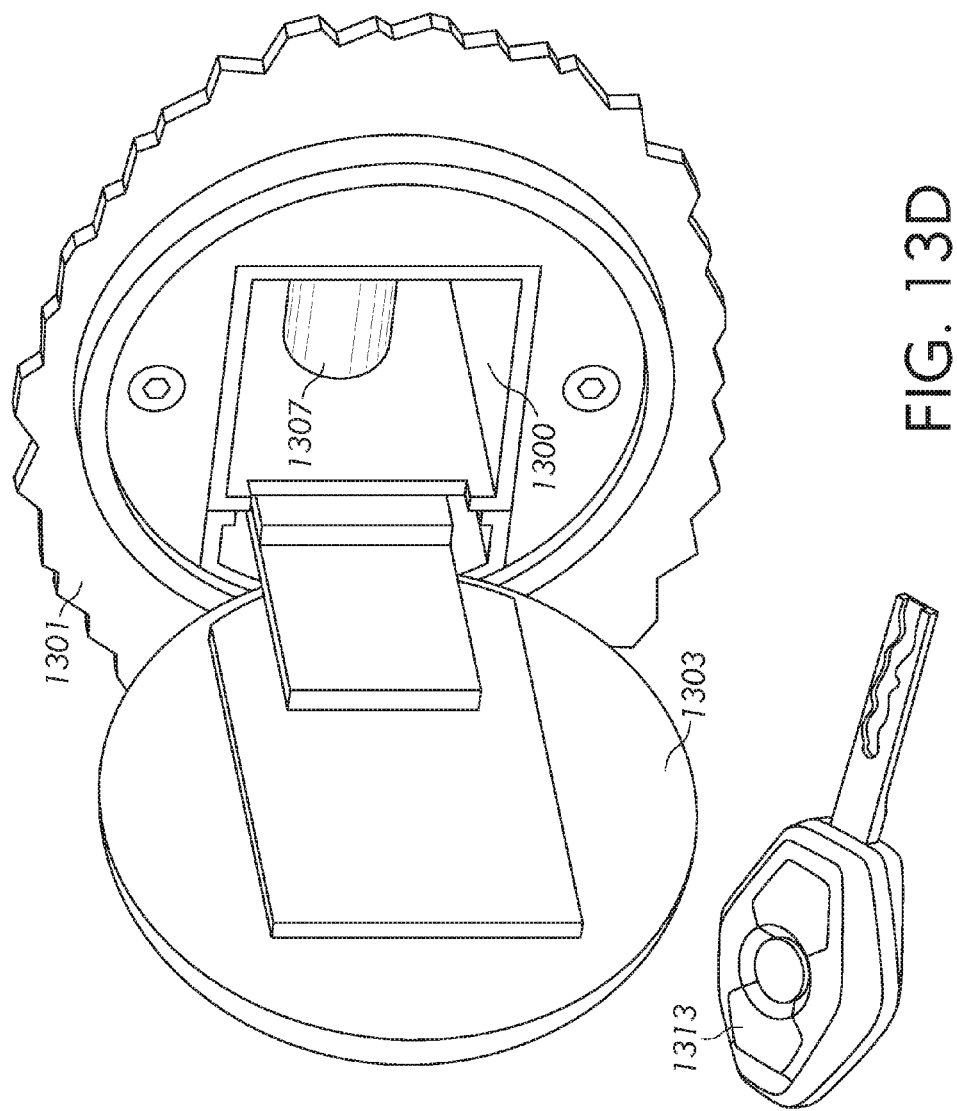
Figure 15A:
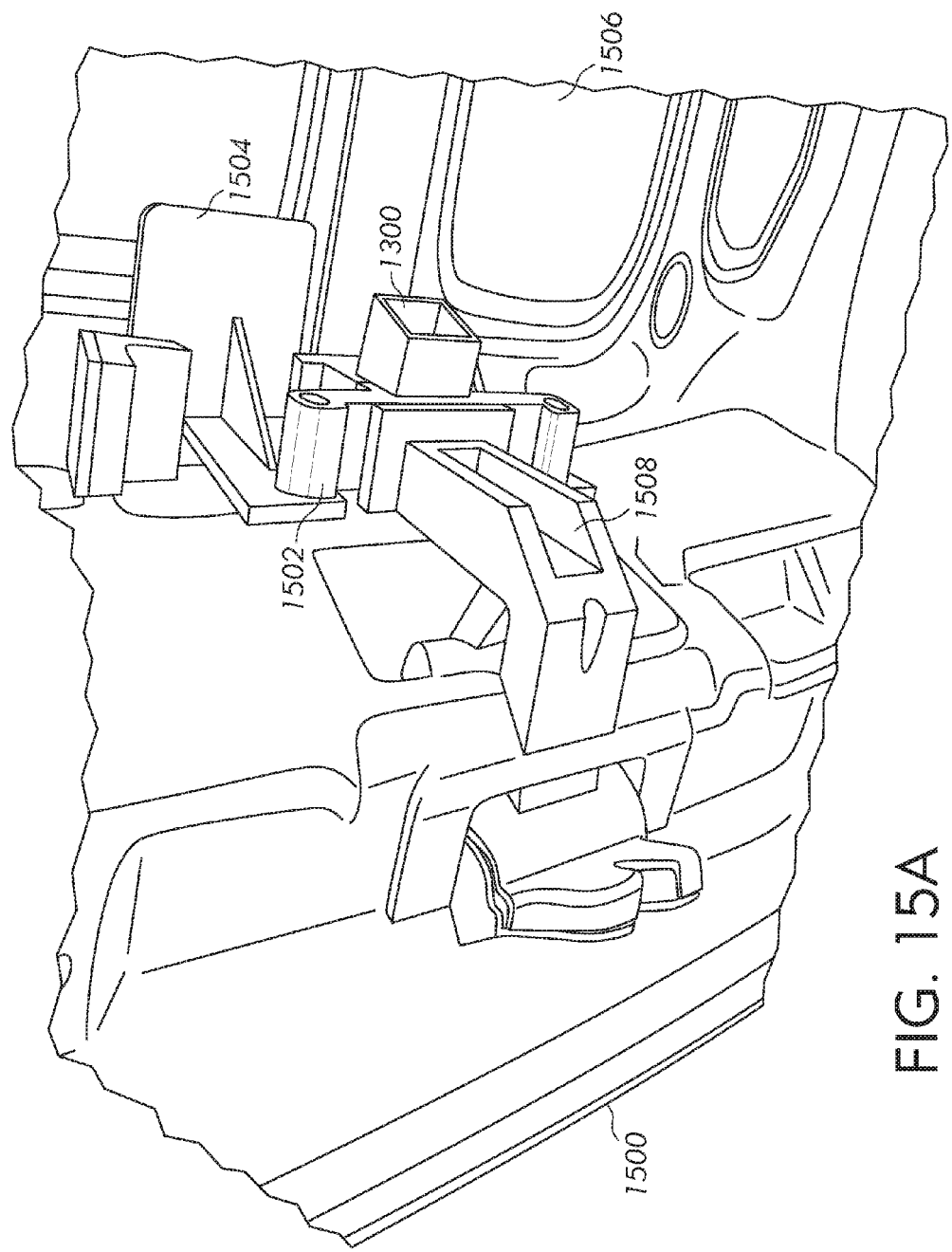
Figure 15B:
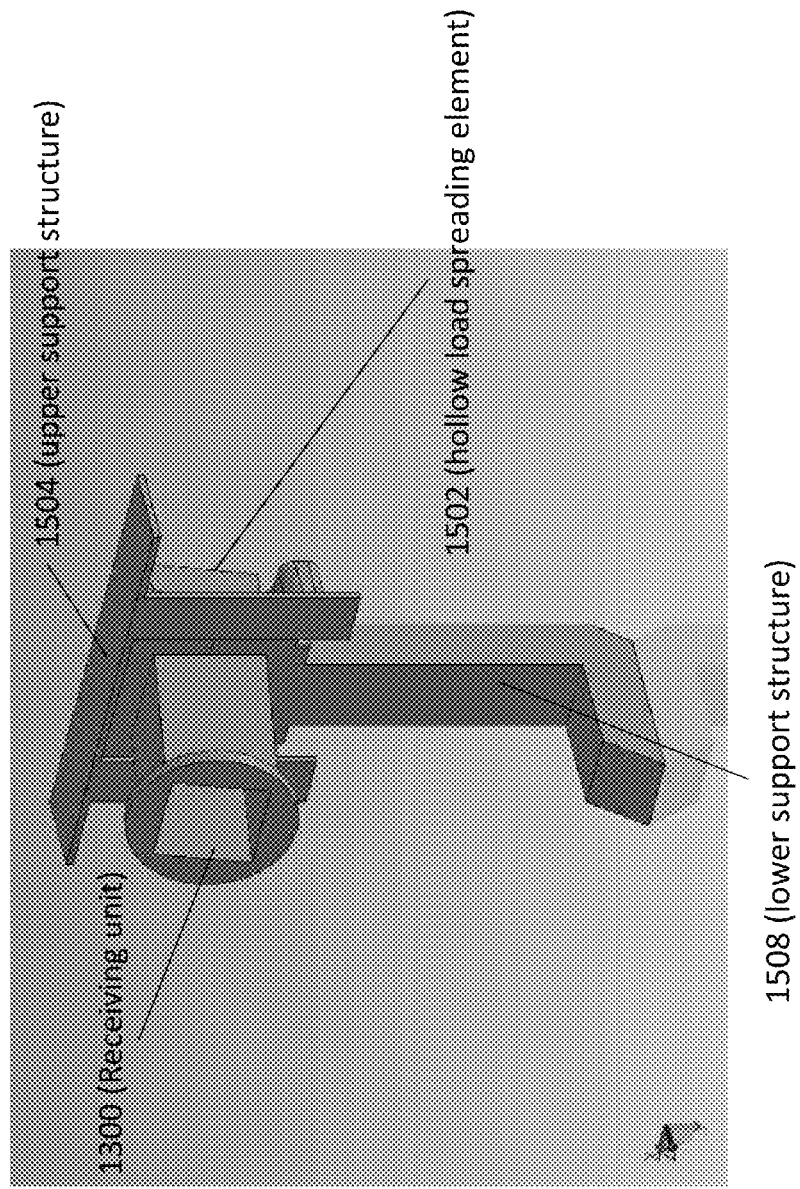
Figure 15C:
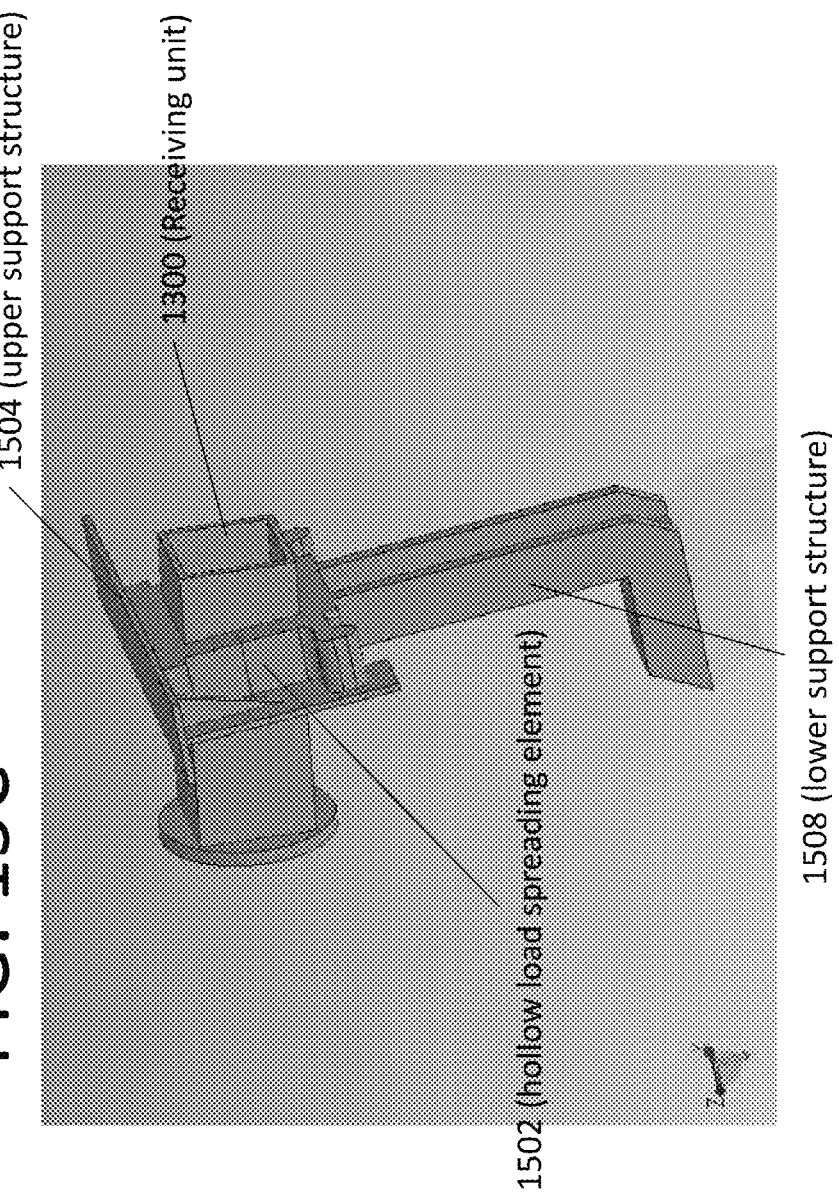
Figure 15D:
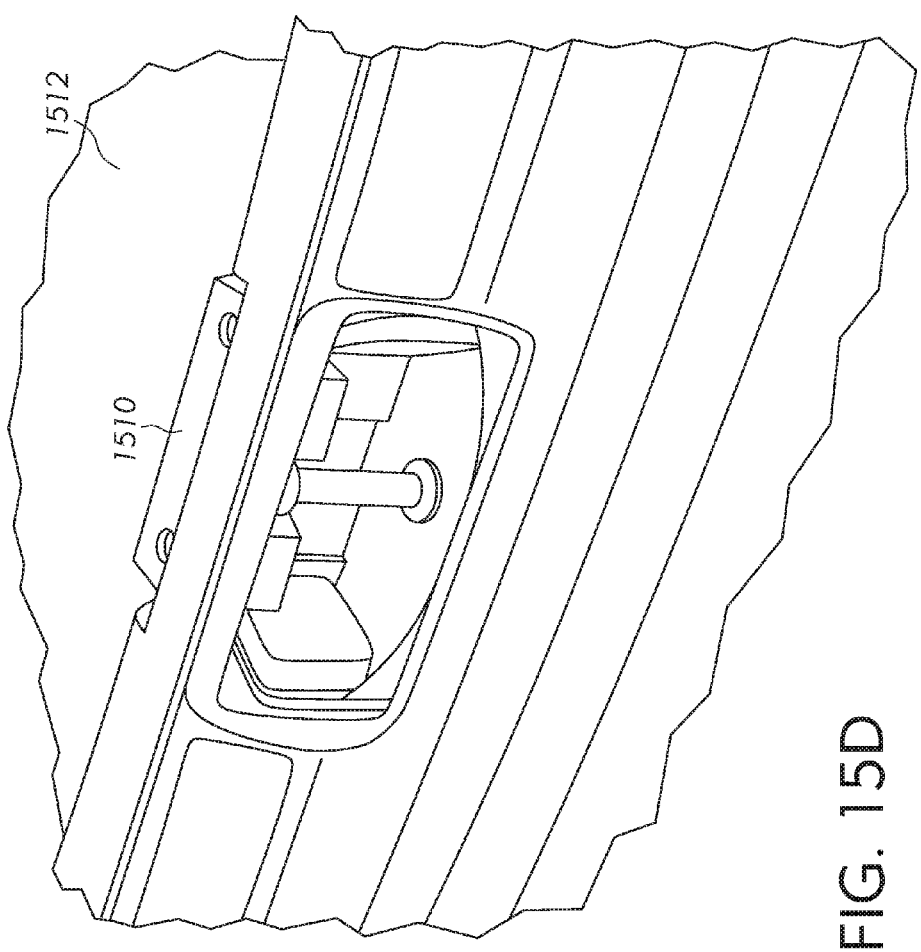
Figure 15E:
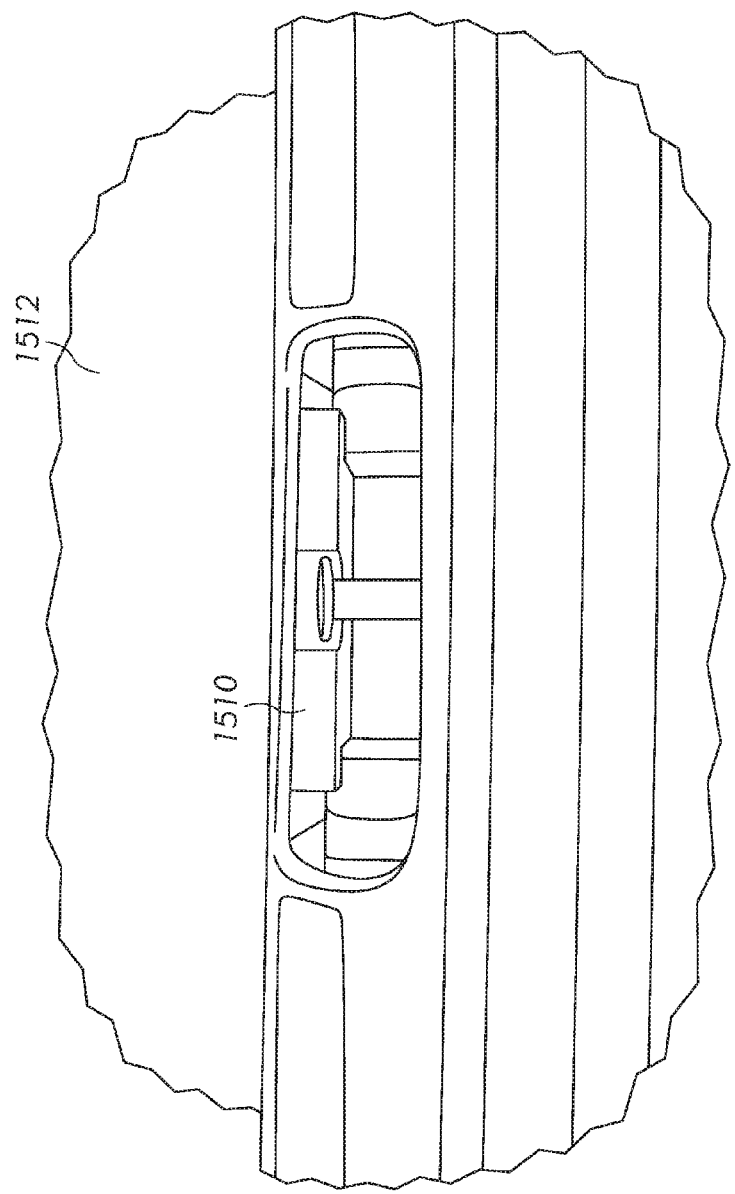

FIGS. 12A-C are views of example embodiments of "snow pods"—combination ski and/or snowboard support devices and storage pods in accordance with the present invention.

In general, these pods are similar to those described above and include upper support 3210's and lower support 3212's for ski's and/or snowboards. In some embodiments lower support may be closed at its bottom so that the bottom of the ski or snowboard rests within the component.

In many embodiments upper support 3210 opens at one end using a hinge and then clamps shut after the ski's or snowboards have been secured or inserted into lower support 3212.

In some embodiments storage pod lid 3206 may have a lock or locking mechanism that prevents unauthorized access and/or theft.

In the example embodiments shown in FIGS. 12A-B a collar 3208 allows for attachment to Tbar 2 (vertical member) of the transitional carrier devices as described previously. In the example embodiment shown in FIG. 12C a design specific bar 104 is provided. Numerous variations of these embodiments are contemplated.

In many embodiments two snowboards or sets of skis are supported on each side of the "snow pod." The pod itself is operable to store whatever gear a user may want to store. Typically this would include gloves, hats, mittens, helmets, beanies, sunglasses, visors, goggles, boots, shoes, or others. This helps avoid clutter within the vehicle and also provides an alternative for moving snow into the car where it may melt and dampen the car interior. As provided above, in many embodiments the storage pod 3204 may be ventilated.

In some embodiments of the invention the "snow pod" may have an internal skeleton 3202 that is integrated into the body of storage pod 3204. In some embodiments the "snow pod" may have an external skeleton that is located around storage pod 3204 but is not integrated as a part of storage pod 3204.

As a reference, 4.5 cubic feet are typically required to carry four ski boots and 2.4 cubic feet are required to carry four helmets. The "snow pod" may have dimensions of 2'×2'×2' or 8 cubic feet in order to accommodate these dimensions. Additionally, the weight of ski's with bindings is typically around seven pounds and ski boots is around eight pounds for a total of 15 pounds for one complete set and 60 pounds for four sets. The weight of a snowboard with bindings is typically around twelve pounds and snowboard boots are typically around five pounds for a total of 17 pounds per set and 68 pounds per four sets.

Storage

As mentioned above for many of the embodiments of the device, ease and simplicity of storage is a major improvement. As such, embodiments are designed to keep similar activity related objects together, such as snow equipment, golf equipment, beach equipment, and others described herein. In some embodiments of the invention the interior of storage pods may be pre-organized based on a particular activity. As such, there may be moveable walls, floors, boxes, or other interior components or containers with particular item storage in mind.

As an example, one embodiment of the invention is a baseball pod. A baseball pod may have elongated tubes for storing bats, boxes or compartments with baseballs in mind, storage for mitts, storage for batting gloves, sunflower seed pouch storage, cleat compartments, jersey or other clothing compartments, or storage for other equipment of customary or ancillary relation to the sport.

Storage pods contemplated in embodiments herein are not limited to sports or outdoor activities. In some embodiments a storage pod of wrapping supplies such as wrapping paper, bows, tape, scissors, or other equipment may be provided. In some embodiments tailgating equipment such as tongs, can coolers, cup holders, condiment holders, or others may be provided and in some embodiments even grills may be provided. Likewise coolers are contemplated in some embodiments. Home shopping party supplies may be stored in some specialized pods. In some embodiments commercial pods such as contractor toolboxes may be provided.

Storage pods may be installed in any rooms or locations necessary and may be of greatly varied size and construction. In some embodiments storage pods may open from the sides or bottom, may only have partial openings, and may include drawers, buttons, or other members.

Storage pods of many varieties may be paired with racks of differing dimensions in order to support large or oblong cargo.

Turning to FIGS. 13A, 13B, 13C, and 13D, car emblem support device 1301 is shown. Car emblem support device 1301 in the example embodiment includes locking mechanism 1311, spring loaded metal latch 1307, receiver unit 1300, remote 1313, and emblem 840. Locking mechanism 1311 is provided to lock transitional carrier bar device 200 in place and prevent removal without an appropriate key and/or keyless remote 1313.

Car emblem support device 1301 is an embodiment of a receiving unit for carrier system 1. In the example embodiment, car emblem support device 1301 is hidden behind car emblem 1303 when car emblem 840 is in the closed position.

Car emblem 840 is operable to open to reveal car emblem support device 1301, as shown in FIGS. 13A-13D and in the example embodiment car emblem 840 remains open when transitional carrier bar device 200 is engaged with car emblem support device 1301, as transitional carrier bar device 200 in the example embodiment is attached to the rear of vehicle in car emblem support device 1301. Car emblem 840 may also be removable in some embodiments. Car emblem 840 is opened in some embodiments manually via rotation but in other embodiments car emblem 840 may be opened by flipping or other operations and may be automatic and/or manually operated with servomotors and/or remote key 1313.

Locking mechanism 1311 secures transitional carrier bar device 200 in a fixed position. Locking mechanism 1311 engages spring loaded metal latch 1307 in the example embodiment. The movement of locking mechanism 1311 in some embodiments may be controlled manually by an operator moving the mechanism from an unlocked position to a locked position. Alternatively, the movement of locking mechanism 1311 may be controlled automatically by a servo mechanism with a wireless or remote key 1313.

In the example embodiment, spring loaded metal latch 1307 is a bolt in the shape of a cylinder with a circular cross-section. Alternatively, spring loaded metal latch 1307 may be a bolt which has numerous other cross-sectional profiles including oval, square, rectangle, pentagon, octagon, or any number of other shapes. The size of the bolt may also be thin and plate-like in some embodiments. Additionally, spring loaded metal latch 1307 may not have a uniform cross section along its entire length and may have grooves, holes, notches, ratchets, or others as required to lock transitional carrier bar 200 in place.

Although the example embodiment shows receiver 1300 as connected directly to car emblem support device 1301, in some embodiments car emblem support device 1301 may be located in a position which spans an area different from that shown in FIGS. 13A-13D. This may include the circumference of the trunk lid. In some of these embodiments additional support is used to engage opposing structures including fixed support rods which may extend to car emblem support device 1301 and/or trunk hinges. Additional support structures may have a post in hole construction.

Turning to FIGS. 14A-F, car emblem support device 1301 is shown in use with transitional carrier bar device 200. FIG. 14A shows the rear of vehicle with car emblem 840 in a closed position. FIG. 14B shows the rear of vehicle with car emblem 840 in an open position. FIG. 14C shows transitional carrier bar device 200 engaged in car emblem support device 1301. FIG. 14D shows transitional carrier bar device 200 in a collapsed configuration. FIG. 14E shows transitional carrier bar device with attached cradle 500, portrayed here as cradle device 500. FIG. 14F shows transitional carrier bar device 200 with attached cradle device 500 and bicycle cargo in operational configuration.

Transitional carrier bar device 200 in the example embodiment has a proximal end 106 of a male type which inserts into receiver 1300 of car emblem support device 1301 which is of a female type. Alternatively, transitional carrier bar device may have a proximal female end which receives the male end of a connector from the rear of the vehicle. Connection of transitional carrier bar device 200 and receiver 1300 is achieved with a locking mechanism 1311 which operates opening and closing of spring loaded metal latch 1307. In the example embodiment, after proximal end 106 of transitional carrier bar device 200 is inserted into receiver 1300 of car emblem support device 1301, spring loaded metal latch 1307 is engaged by locking mechanism 1311 and passes into and through latch-hole 108 to secure transitional carrier bar device 200. Other connections may be substituted or supplemented in other embodiments where appropriate, such as pins, locks, and others.

Transitional carrier bar device 200 in some embodiments includes additional elements such as vertical elements which help to alleviate sway or provide more support for cargo.

In the example embodiment, receiver 1300 is made of steel. However, alternative materials such as aluminum, titanium, or other composites, alloys, or pure metals may be used. Receiver 1300 is bolted in the example embodiment but may alternatively be welded, fastened or otherwise attached or affixed to vehicle in such location and configuration as to receive proximal end 106 of transitional carrier bar device 200.

Turning to FIGS. 15A through 15F, a secondary support structure 1500 is provided to supply additional support for receiving unit 1300. In the example embodiment secondary support structure 1500 is made of upper support structure 1504 and lower support structure 1508.

Secondary support structure 1500 may allow for transfer of some or all mechanical support for hollow load spreading element 1502 of receiving unit 1300 from one location to another. In an example embodiment, hollow load spreading element 1502 may be supported in the interior of wall 36 above or below by secondary support structure 1500. Secondary support structure 1500 extends upward as upper support structure 1504 to the stable under surface of trunk lid 1506 and/or downward as lower support structure 1508 to the stable upper surface lid deck 1512. At its terminus, upper support structure 1504 may fit into or rest against an installed terminal installation (not shown) and lower support structure 1508 may fit into or rest against an installed terminal installation 1510.

Terminal installation 1510 may be a plate which lower support structure 1508 rests against. Alternately, terminal installation 1510 may be a plate with holes, grooves or notches into which lower support structure 1508 fits snugly. Holes, grooves or notches may be made of the same material as plate or may be made of a different material. Alternately, holes, grooves or notches may be coated, covered, or otherwise provide separation between lower support structure 1508 and terminal installation 1510 in a closed position by use of another material such as rubber. Alternately, terminal installation 1510 may be a cup type structure that lower support structure 1508 fits inside. In the example embodiment, terminal installation 1510 is affixed to lid deck 1512 by screws but alternative fixations may be possible including brackets or others. For installations with a greater distance between receiving unit 1300 and trunk lid 1506, a similar terminal installation may be provided on the underside of trunk lid 1506 that may or may not be identical in size to terminal installation 1510.

FIG. 15F shows how a receiving unit may be oriented within the rear of a pickup truck vehicle.

Various horizontal and vertical reinforcing plates are used in various embodiments to provide additional support to the various portions of the invention as described above. In some embodiments these reinforcing plates are constructed of steel or other strong metals. Support in some embodiments requires engagement of the rear fascia of the vehicle and its various surfaces.

In various embodiments of the invention additional support may be provided against the surface which is providing the main support for the transitional carrier bar using additional components such as extensions of members or associated components with rubber or other "feet" so as to prevent damage to the surface.

In some embodiments transitional carrier bar device 200 and/or receiving unit 1300 have strategic breaking points, designed specifically to mechanically fail when undergoing massive mechanical stresses such as during a motor vehicle accident. This design helps to alleviate danger in some cases.

Transitional carrier bar device 200 in some embodiments is lightweight so that it does not contribute significantly to the weight of the vehicle. As such, it may generally be easily deployed by normal users.

In various embodiments different securing pieces or mechanisms may be used to provide additional securing ability to male-female or female-male connections such as pins, spring-pins, or others and may be manually operated or automatically operated with a remote.

In some embodiments locking mechanisms may be rotary locks such that pegs or other engaging mechanisms extend out of locking holes when a user rotates a lock in one direction (such as clockwise) and revert into locking holes when a user rotates a lock in the opposite direction (such as counter-clockwise). These are occasionally referred to as twist and lock mechanisms.

In some embodiments, the receiving unit may also attach to or extend from anywhere on the back, side, or front of the vehicle. This includes locations such as under a rear air foil, as part of the fascia often housing the light extending over a license plate area, under the fascia over a license plate area, from behind a license plate, along a rear panel just above the bumper, under a rear airfoil, from a side door, from a front grill, or others.

Concepts of the invention as described above can be used for cargo specific applications and/or general cargo requirements in various embodiments. Examples of cargo may include and are not limited to: bicycles, tricycles, unicycles, and other cycles with or without motors; wheelchairs; golf clubs; grocery/shopping bags; suitcases and other luggage; skis/poles; furniture; fishing poles and tackle; boots, shoes and other footwear; snowboards, surfboards, skateboards, wakeboards, skimboards, bodyboards, and other boards; coolers; barbecues and other tailgating equipment; signs/banners; strollers, carriages, and other child or baby transportation devices; boxes; storage systems including toolboxes, hobby boxes, sports storage boxes for balls or the like, miscellaneous storage, or other storage; and various other cargo. In some embodiments cargo may weigh between two-hundred and three hundred pounds and in other embodiments lighter and/or heavier cargo may be supported.

Concepts of the invention as described above are applicable in embodiments including motorized and non-motorized vehicles. Concepts which apply or refer to a vehicular bumper above generally apply to embodiments and locations of a vehicle where a vehicular bumper has traditionally and is commonly understood to exist. In vehicles in which the bumper may be in non-traditional locations such as at the top of the rear of the vehicle or other locations, the commonly understood bumper location is applicable to the embodiments above.

Concepts of the invention as described above can be integrated into the front of a vehicle, such as the front grill of a vehicle. Vehicles may include cars, trucks, three-wheel vehicles, motorcycles, recreational vehicles, buses, motor homes, vans, minivans, sport utility vehicles, carriages, trailers, and other vehicles. And, the concepts of the invention as described above can also be integrated into the side of a vehicle, such as a side of a truck bed, a side door, or a side of a trunk lid.

In many embodiments engaging pieces and mechanisms may have chamfered edges to ease engagement.

While embodiments of the present invention have been shown and described, various modifications may be made without departing from the spirit and scope of the present invention, and all such modifications and equivalents are intended to be covered.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A unified carrier cargo rack and storage system for a vehicle comprising:
   a receiver unit installed in the rear of the vehicle; and
   a modular carrier rack, wherein the carrier rack further comprises:
      a transitional carrier bar, having distal and proximal ends, wherein the proximal end is operable to engage the receiver unit and provide immobilization for cargo and the distal end is operable to engage a secondary bar or a cargo carrier bar, wherein a distal end of the secondary bar engages the cargo carrier bar and at a height sufficient to provide clearance from the ground for cargo;
      a cargo carrier bar operable to engage the secondary bar or the transitional carrier bar, wherein the cargo carrier bar is further operable to engage and immobilize cargo;
   wherein the carrier rack is lightweight and compactable such that the transitional carrier bar, secondary bar, and cargo carrier bar can be folded into a secure, telescopic arrangement.

2. The unified cargo carrier rack and storage system of claim 1, further comprising:
   a support structure within the rear of the vehicle wherein the support structure provides support for receiver unit.

3. The unified cargo carrier rack and storage system of claim 1, further comprising:
   a retractable standardized peg system coupled with the carrier bar system, wherein the standardized peg system is operable to engage cargo;
   the standardized peg system further comprising:
      a peg for engagably coupling with a peg receiver, the cargo peg receiver coupled to cargo such that in operation the cargo is stabilized at the center of mass of the cargo.

4. The unified cargo carrier rack and storage system of claim 1, further comprising:
   a cradle system operable to support and secure a bar of the cargo, wherein the cradle system is retractable into the cargo carrier bar, wherein the cradle system can be locked into place for support using a rotational locking mechanism and wherein securing a bar of the cargo includes engaging a screw clamping system.

5. The unified cargo carrier rack and storage system of claim 1, further comprising:
   a remote operated lock and key system operable to secure the receiver unit to the transitional carrier bar when engaged.

6. The unified cargo carrier rack and storage system of claim 1, wherein cargo further comprises:
   a storage pod for storing items, the storage pod operable to keep the items together after transportation using the cargo carrier bar; and
   detachable board carriers for securely transporting sporting boards, wherein the board carriers are attachable to one or more of a vehicle, a storage pod, and a carrier rack.

7. A method of using a unified cargo carrier rack and storage system to secure cargo comprising:
   providing a receiver unit installed in the rear of the vehicle;
   providing a modular carrier rack, the carrier rack further comprising:
      a transitional carrier bar, having distal and proximal ends, wherein the proximal end is operable to engage the receiver unit and provide immobilization for cargo and the distal end is operable to engage a secondary bar or a cargo carrier bar, wherein a distal end of the secondary bar engages the cargo carrier bar and at a height sufficient to provide clearance from the ground for cargo;
      providing a carrier bar operable to engage the secondary bar or the transitional carrier bar, wherein the carrier bar is further operable to engage and immobilize cargo; and
   wherein the carrier rack is lightweight and compactable such that the transitional carrier bar, secondary bar, and cargo carrier bar can be folded into a secure, telescopic arrangement.

8. The method of using the unified cargo carrier rack and storage system of claim 7, further comprising:
   providing a support structure within the rear of the vehicle wherein the support structure provides support for receiver unit.

9. The method of using the unified cargo carrier rack and storage system of claim 7, further comprising:
providing a retractable standardized peg mechanism coupled with the carrier bar system, wherein the standardized peg mechanism is operable to engage cargo;
the standardized peg mechanism further comprising:
a peg for engagably coupling with a peg receiver, the cargo peg receiver coupled to cargo such that in operation the cargo is stabilized at the center of mass of the cargo.

10. The method of using the unified cargo carrier rack and storage system of claim 7, further comprising:
providing a cradle system operable to support and secure a bar of the cargo, wherein the cradle is retractable into the cargo carrier bar, wherein the cradle can be locked into place for support using a rotational locking mechanism and wherein securing a bar of the cargo includes engaging a screw clamping mechanism.

11. The method of using the unified cargo carrier rack and storage system of claim 7, further comprising:
providing a remote operated lock and key system operable to provide security for the receiver unit to the transitional carrier bar when engaged.

12. The method of using the unified carrier rack and storage system of claim 7, wherein cargo further comprises:
a storage pod for storing items, the storage pod, operable to keep the items together after transportation using the cargo carrier bar; and
detachable board carriers for securely transporting sporting boards, wherein the board carriers are attachable to one or more of a vehicle, a storage pod, and a carrier rack.

13. A unified cargo carrier rack and storage device for a vehicle comprising:
a modular carrier rack, wherein the carrier rack further comprises: a transitional carrier bar, having distal and proximal ends, wherein the proximal end is operable to engage a receiver unit installed in the rear of a vehicle and provide immobilization for cargo and the distal end is operable to engage a secondary bar or a cargo carrier bar, wherein a distal end of the secondary bar engages the cargo carrier bar and at a height sufficient to provide clearance from the ground for cargo;
a carrier bar operable to engage the secondary bar or the transitional carrier bar, wherein the carrier bar is further operable to engage and immobilize cargo;
wherein the carrier rack is lightweight and compactable such that the transitional carrier bar, secondary bar, and cargo carrier bar can be folded into a secure, telescopic arrangement.

14. The unified cargo carrier rack and storage device of claim 13, wherein the receiver unit is supported by
a support device within the rear of the vehicle wherein the support device provides additional support for receiver unit.

15. The unified cargo carrier rack and storage device of claim 13, further comprising:
a retractable standardized peg coupled with the carrier bar device, wherein the standardized peg device is operable to engage cargo;
the standardized peg further comprising:
a peg for engagably coupling with a cargo peg receiver, the cargo peg receiver coupled to cargo such that in operation the cargo is stabilized at the center of mass of the cargo.

16. The unified cargo carrier rack and storage device of claim 13, further comprising:
a cradle device operable to support and secure a bar of the cargo, wherein the cradle device is retractable into the cargo carrier bar, wherein the cradle device can be locked into place for support using a rotational locking mechanism and wherein securing a bar of the cargo includes engaging a screw clamping device.

17. The unified cargo carrier rack and storage device of claim 13, further comprising:
a remote operated lock and key device operable to secure the receiver unit to the transitional carrier bar when engaged.

18. The unified cargo carrier rack and storage device of claim 13, wherein cargo further comprises:
a storage pod for storing items, the storage pod operable to keep the items together after transportation using the cargo carrier bar; and
detachable board carriers for securely transporting sporting boards, wherein the board carriers are attachable to one or more of a vehicle, a storage pod, and a carrier rack.

19. The unified cargo carrier rack and storage device of claim 13, further comprising:
a wired or wireless brake-light.

20. A unified cargo carrier rack and storage system for a vehicle comprising:
a carrier bar system, the carrier bar system further comprising:
a receiver unit installed in the rear of the vehicle;
a transitional carrier bar, having distal and proximal ends, wherein the proximal end is operable to engage the receiver unit and provide immobilization for cargo;
a cargo carrier bar operable to engage transitional carrier bar near the distal end of transitional carrier bar, wherein cargo carrier bar is further operable to engage and immobilize cargo;
wherein the carrier rack is lightweight and compactable into a secure, telescopic arrangement; and
a standardized peg system, the standardized peg system further comprising:
a standardized peg operable to secure cargo at a center of mass of the cargo, to the carrier bar system.

* * * * *